(12) United States Patent
Nonaka et al.

(10) Patent No.: US 9,241,112 B2
(45) Date of Patent: Jan. 19, 2016

(54) IMAGING APPARATUS, IMAGING METHOD AND COMPUTER-READABLE RECORDING MEDIUM

(71) Applicant: OLYMPUS IMAGING CORP., Shibuya-ku, Tokyo (JP)

(72) Inventors: Osamu Nonaka, Sagamihara (JP); Kunio Yamamiya, Sagamihara (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 14/330,679

(22) Filed: Jul. 14, 2014

(65) Prior Publication Data
US 2014/0320701 A1 Oct. 30, 2014

Related U.S. Application Data

(62) Division of application No. 13/222,485, filed on Aug. 31, 2011, now Pat. No. 8,810,691.

(30) Foreign Application Priority Data

Sep. 3, 2010 (JP) ................................. 2010-198310
Oct. 27, 2010 (JP) ................................. 2010-241321
Oct. 27, 2010 (JP) ................................. 2010-241322
Dec. 22, 2010 (JP) ................................. 2010-286513

(51) Int. Cl.
*H04N 5/262* (2006.01)
*H04N 5/232* (2006.01)
*H04N 5/272* (2006.01)

(52) U.S. Cl.
CPC ......... *H04N 5/2621* (2013.01); *H04N 5/23222* (2013.01); *H04N 5/23245* (2013.01); *H04N 5/23293* (2013.01); *H04N 5/262* (2013.01); *H04N 5/272* (2013.01)

(58) Field of Classification Search
CPC ............ H04N 5/2621; H04N 5/23222; H04N 5/23245; H04N 5/262
USPC ........................................................... 348/239
See application file for complete search history.

(56) References Cited

U.S. PATENT DOCUMENTS

2003/0043287 A1\* 3/2003 Kakiuchi et al. .............. 348/269
2007/0279512 A1 12/2007 Maruyama et al.
(Continued)

FOREIGN PATENT DOCUMENTS

JP 2000232609 A 8/2000
JP 2002300472 A 10/2002
(Continued)

OTHER PUBLICATIONS

Decision of a Patent Grant issued in corresponding Japanese Patent Application No. 2010-241321 on Mar. 4, 2014.
(Continued)

*Primary Examiner* — Paul Berardesca
(74) *Attorney, Agent, or Firm* — Volpe and Koenig, P.C.

(57) ABSTRACT

An imaging apparatus includes an imaging unit that captures a subject to generate image data of the subject; a display unit that displays the image; an image separating unit that separates a subject image and a background image from the image displayed; a special effect input unit that receives information related to special effects respectively applied to the subject image and the background image; a special effect image generating unit that generates a special effect image of each of the subject and background images by applying special effects corresponding to information received by the special effect input unit; a storing unit that stores special effect information for assigning an advisability corresponding to a combination of special effects which the special effect image generating unit applies to the subject image and the background image; and a synthetic image generating unit that generates a synthetic image using the generated special effect image.

8 Claims, 50 Drawing Sheets

| | | SPECIAL EFFECT | | | | | | T2 |
|---|---|---|---|---|---|---|---|---|
| | | MINIATURE | POP | FISH-EYE | SOFT | SEPIA | BLACK/WHITE | SKETCH |
| SHOOTING MODE | NORMAL | 5 | 5 | 5 | 5 | 5 | 5 | 5 |
| | PANORAMA | 3 | 5 | 0 | 3 | 5 | 5 | 4 |
| | SWING 3D | 3 | 5 | 0 | 2 | 3 | 4 | 1 |
| | 3D | 0 | 5 | 0 | 2 | 3 | 3 | 2 |
| | BACKGROUND BLURRING PROCESS | 0 | 5 | 3 | 2 | 5 | 5 | 0 |
| | HDR | 0 | 5 | 5 | 3 | 3 | 5 | 2 |
| | S STROBE | 0 | 5 | 5 | 1 | 4 | 5 | 5 |
| | SWING ART | 3 | 5 | 0 | 2 | 3 | 4 | 1 |

(56) References Cited

U.S. PATENT DOCUMENTS

2008/0212900 A1* 9/2008 Ogawa .................. 382/309
2010/0092151 A1* 4/2010 Miyakoshi .............. 386/68
2012/0086834 A1 4/2012 Adachi

FOREIGN PATENT DOCUMENTS

| JP | 2003092706 A | 3/2003 |
|---|---|---|
| JP | 2004147281 A | 5/2004 |
| JP | 2004-336343 | 11/2004 |
| JP | 2004-343662 | 12/2004 |
| JP | 2005-347886 | 12/2005 |
| JP | 2006-340070 A | 12/2006 |
| JP | 2007-116635 A | 5/2007 |
| JP | 2007-194917 | 8/2007 |
| JP | 2007-243598 | 9/2007 |
| JP | 2007-336522 A | 12/2007 |
| JP | 2009-054085 | 3/2009 |
| JP | 4321287 | 6/2009 |
| JP | 2009272846 A | 11/2009 |
| JP | 4464079 | 2/2010 |
| JP | 2010-050502 A | 3/2010 |
| JP | 2010-068098 A | 3/2010 |
| JP | 2012-060201 | 3/2012 |

OTHER PUBLICATIONS

Decision of a Patent Grant issued in corresponding Japanese Patent Application No. 2010-198310 on Mar. 10, 2014, consisting of 2 pp. (English translation provided.).

Office Action issued in corresponding Japanese Patent Application No. 2010-286513 and mailed on Jun. 3, 2014, consisting of 5 pp. (English translation provided).

Notice of Rejection mailed in corresponding Japanese Patent Application No. 2014-067162 on Feb. 17, 2015, consisting of 5 pp. (English translation provided).

Notice of Rejection mailed in corresponding Japanese Patent Application No. JP2014-093987 on Mar. 31, 2015, consisting of 3 pp. (English Translation Provided).

* cited by examiner

FIG.16

| | | BACKGROUND IMAGE | | | | | | | |
|---|---|---|---|---|---|---|---|---|---|
| | | NORMAL | POP | FISH-EYE | SOFT | SEPIA | BLACK/WHITE | SKETCH | MINIATURE |
| SUBJECT IMAGE | NORMAL | 5 | 4 | 1 | 5 | 5 | 4 | 4 | 1 |
| | POP | 4 | 5 | 1 | 3 | 4 | 4 | 3 | 1 |
| | FISH-EYE | 1 | 1 | 5 | 1 | 1 | 1 | 1 | 1 |
| | SOFT | 5 | 2 | 1 | 5 | 3 | 3 | 2 | 1 |
| | SEPIA | 4 | 2 | 1 | 4 | 5 | 5 | 2 | 1 |
| | BLACK/WHITE | 5 | 1 | 1 | 2 | 4 | 5 | 2 | 1 |
| | SKETCH | 4 | 1 | 1 | 1 | 3 | 3 | 5 | 1 |
| | MINIATURE | 1 | 1 | 1 | 1 | 1 | 1 | 1 | 5 |

| SHOOTING MODE | | SPECIAL EFFECT | | | | | | | |
|---|---|---|---|---|---|---|---|---|---|
| | | MINIATURE | POP | FISH-EYE | SOFT | SEPIA | BLACK/WHITE | SKETCH | |
| | NORMAL | 5 | 5 | 5 | 5 | 5 | 5 | 5 | |
| | PANORAMA | 3 | 5 | 0 | 3 | 5 | 5 | 4 | |
| | SWING 3D | 3 | 5 | 0 | 2 | 3 | 4 | 1 | |
| | 3D | 0 | 5 | 3 | 2 | 3 | 3 | 2 | |
| | BACKGROUND BLURRING PROCESS | 0 | 5 | 5 | 2 | 5 | 5 | 0 | |
| | HDR | 0 | 5 | 5 | 3 | 3 | 5 | 2 | |
| | S STROBE | 0 | 5 | 0 | 1 | 4 | 5 | 5 | |
| | SWING ART | 3 | 5 | 0 | 2 | 3 | 4 | 1 | T2 |

FIG.28

| | | BACKGROUND IMAGE T3 | | | | | | | |
|---|---|---|---|---|---|---|---|---|---|
| | | NORMAL | POP | FISH-EYE | SOFT | SEPIA | BLACK/WHITE | SKETCH | MINIATURE |
| SUBJECT IMAGE | NORMAL | 5 | 0 | 0 | 5 | 4 | 5 | 0 | 0 |
| | POP | 0 | 5 | 0 | 5 | 4 | 4 | 4 | 0 |
| | FISH-EYE | 0 | 0 | 5 | 0 | 0 | 0 | 0 | 0 |
| | SOFT | 5 | 4 | 0 | 5 | 5 | 3 | 1 | 0 |
| | SEPIA | 4 | 2 | 0 | 3 | 5 | 5 | 4 | 0 |
| | BLACK/WHITE | 5 | 2 | 0 | 3 | 1 | 5 | 5 | 0 |
| | SKETCH | 0 | 1 | 0 | 2 | 2 | 2 | 5 | 0 |
| | MINIATURE | 0 | 0 | 0 | 0 | 0 | 0 | 0 | 5 |

FIG.37

| | | SHOOTING MODE FOLLOWING CHANGE OF FRAME RATE | | | | | | | |
|---|---|---|---|---|---|---|---|---|---|
| | | FAST FORWARD 1 | FAST FORWARD 2 | FAST FORWARD 3 | NORMAL | 3D | SLOW MOTION 1 | SLOW MOTION 2 |
| | | 2 fps | 4 fps | 8 fps | 30 fps | 60 fps | 120 fps | 240 fps |
| SPECIAL EFFECT | MINIATURE | 1 | 2 | 2 | 1 | 0 | 0 | 0 |
| | POP | 1 | 2 | 2 | 2 | 2 | 1 | 1 |
| | FISH-EYE | 2 | 1 | 1 | 1 | 0 | 0 | 0 |
| | SOFT | 1 | 2 | 2 | 2 | 1 | 2 | 2 |
| | SEPIA | 1 | 2 | 2 | 2 | 1 | 2 | 2 |
| | BLACK/WHITE | 1 | 2 | 2 | 2 | 1 | 2 | 2 |
| | SKETCH | 1 | 1 | 2 | 1 | 0 | 1 | 1 |

| | | SHOOTING MODE | | | | | |
|---|---|---|---|---|---|---|---|
| | | PERSON | SPORT | SCENERY | NIGHT SCENE | MACRO | NIGHT SCENE & PERSON |
| SPECIAL EFFECT | POP ART | 0 | 2 | 2 | 1 | 2 | 1 |
| | FANTASTIC FOCUS | 2 | 1 | 2 | 2 | 2 | 2 |
| | ROUGH MONOCHROME | 2 | 2 | 2 | 1 | 2 | 1 |
| | TOY PHOTO | 1 | 1 | 2 | 0 | 1 | 0 |
| | DAY DREAM | 2 | 2 | 2 | 0 | 2 | 1 |
| | LIGHT TONE | 2 | 2 | 2 | 1 | 2 | 1 |
| | HDR | 2 | 0 | 1 | 2 | 1 | 2 |
| | SKETCH | 2 | 2 | 2 | 0 | 2 | 1 |
| | DRAMATIC TONE | 2 | 2 | 2 | 1 | 2 | 1 |

| SPECIAL EFFECT | SHOOTING MODE ||||||
| --- | --- | --- | --- | --- | --- | --- |
| | PERSON | SPORT | SCENERY | NIGHT SCENE | MACRO | NIGHT SCENE & PERSON |
| SHADING | 0 | 2 | 2 | 1 | 2 | 1 |
| CROSS | 2 | 1 | 2 | 2 | 2 | 2 |
| FRAME | 2 | 2 | 2 | 1 | 2 | 1 |
| NOISE | 1 | 1 | 2 | 0 | 1 | 0 |
| FLARE | 2 | 2 | 2 | 0 | 2 | 1 |
| BLUR | 2 | 2 | 2 | 1 | 1 | 1 |
| WHITE OUT | 2 | 0 | 1 | 2 | 2 | 2 |
| ILLUMINATION | 2 | 2 | 2 | 0 | 2 | 1 |
| OAP BUBBLE | 2 | 2 | 2 | 1 | 2 | 1 |

IMAGING APPARATUS, IMAGING METHOD AND COMPUTER-READABLE RECORDING MEDIUM

CROSS REFERENCE TO RELATED APPLICATIONS

This application is a division of U.S. patent application Ser. No. 13/222,485, filed Aug. 31, 2011, which claims the benefit of priority from Japanese Patent Application No. 2010-198310, filed on Sep. 3, 2010, Japanese Patent Application No. 2010-241321, filed on Oct. 27, 2010, Japanese Patent Application No. 2010-241322, filed on Oct. 27, 2010, and Japanese Patent Application No. 2010-286513, filed on Dec. 22, 2010, the entire contents of which are incorporated herein by reference.

BACKGROUND OF THE INVENTION

1. Field of the Invention

The present invention relates to an imaging apparatus, an imaging method and a computer-readable recording medium which capture an image of a subject and generate electronic image data.

2. Description of the Related Art

In recent years, imaging apparatuses such as digital cameras and digital videos are known to have a technique which meets various demands of consumers by applying special effects to image data obtained by capturing a subject. For example, a technique is known which can record shot image data by applying a special effect such as wipe or sepia to the shot image data (see, for example, Japanese Laid-open Patent Publication No. 2005-347886). This technique allows the user to select a desired special effect by displaying an image to which a special effect selected when the user is operating an effect switch for selecting a special effect is applied, on part of an image displayed on the display monitor.

Further, an imaging apparatus is known which captures the same subject a plurality of times, separates a subject image and a background image included in an image using a plurality of shot images and blurring process of the background image to synthesize the background image with the subject image again (see, for example, Japanese Patent No. 4321287).

SUMMARY OF THE INVENTION

An imaging apparatus according to an aspect of the present invention includes an imaging unit that captures an image of a subject to generate electronic image data of the subject; a display unit that displays the image corresponding to the image data; an image separating unit that separates a subject image and a background image from the image displayed on the display unit; a special effect input unit that receives information related to special effects respectively applied to the subject image and the background image separated by the image separating unit; a special effect image generating unit that generates a special effect images for each of the subject image and the background image by applying special effects corresponding to information received by the special effect input unit individually to the subject image and the background image; a storing unit that stores special effect information for assigning an advisability corresponding to a combination of special effects which the special effect image generating unit applies to the subject image and the background image; a synthetic image generating unit that generates a synthetic image using the special effect image generated by the special effect image generating unit; and a display control unit that controls the display unit to display the image. The special effect image generating unit applies a special effect to one of the subject image and the background image, and when the synthetic image generating unit synthesizes a special effect image to which the special effect is applied, with the other one of the subject image and the background image, the display control unit controls the display unit to display the synthesized synthetic image, and controls the display unit to display information related to a special effect which needs to be the subject image or the background image, in order from the highest advisability corresponding to a combination with a special effect applied immediately before, referring to special effect information stored in the storing unit.

An imaging apparatus according to another aspect of the present invention includes an imaging unit that captures an image of a subject to continuously generate electronic image data of the subject; an image data storing unit that stores the image data generated by the imaging unit; a display unit that displays the image corresponding to the image data generated by the imaging unit; a shooting mode setting unit that sets one of a plurality of shooting modes for which a frame rate of capturing suitable for each capturing scene is set in advance; a special effect input unit that receives information related to a special effect for the image generated at a frame rate of the shooting mode set by the shooting mode setting unit; a special effect image generating unit that generates a special effect image by applying to the image a special effect corresponding to information received by the special effect input unit; an advisability information storing unit that stores advisability information for assigning an advisability corresponding to a combination of a special effect which the special effect image generating unit applies to the image, and the frame rate of the shooting mode; and a display control unit that controls the display unit to display the image sequentially generated at the frame rate of the shooting mode set by the shooting mode setting unit, in a time sequence, and which controls the display unit to display information related to the special effect which the special effect image generating unit needs to apply to the image, in order from the highest advisability corresponding to a combination with the frame rate of the shooting mode set by the shooting mode setting unit, referring to the advisability information stored in the advisability information storing unit.

An imaging apparatus according to still another aspect of the present invention includes an imaging unit that captures an image of a subject to generate electronic image data of the subject; a display unit that can display the image corresponding to the image data generated by the imaging unit; a shooting mode setting unit that sets one of a plurality of shooting modes for which a condition of capturing suitable for each capturing scene is set in advance; a special effect input unit that receives information related to a special effect for the image generated by the imaging unit according to the shooting mode set by the shooting mode setting unit; a special effect image generating unit that generates a special effect image by applying to the image a special effect corresponding to information received by the special effect input unit; an advisability information storing unit that stores advisability information for assigning an advisability corresponding to a combination of a special effect which the special effect image generating unit applies to the image, and the shooting mode; and a display control unit that controls the display unit to display the image generated by the imaging unit according to the shooting mode set by the shooting mode setting unit, and which controls the display unit to display information related to the special effect which the special effect image generating unit needs to apply to the image, in order from the highest advisability corresponding to a combination with the shooting mode set by the shooting mode setting unit, referring to the advisability information stored in the advisability information storing unit.

An imaging method according to still another aspect of the present invention is executed by an imaging apparatus that captures an image of a subject to generate electronic image data of the subject, includes a display unit which displays an image corresponding to the generated image data, and that can apply a special effect to the image. The imaging method includes separating a subject image and a background image from the captured image; generating a special effect image by applying a special effect to one of the separated subject image and background image; generating a synthetic image by synthesizing the other one of the subject image and the background image, with the special effect image; and displaying the synthetic image, reading and referring to special effect information from a storing unit which stores the special effect information for assigning an advisability corresponding to a combination of special effects applied to the subject image and the background image, and displaying information related to a special effect which needs to be applied to the subject image or the background image, in order from the highest advisability corresponding to a combination with a special effect applied immediately before.

An imaging method according to still another aspect of the present invention is executed by an imaging apparatus that captures an image of a subject to generate electronic image data of the subject, includes a display unit which displays an image corresponding to the generated image data, and that can apply a special effect to the image. The imaging method includes setting in the imaging apparatus one of a plurality of shooting modes for which a frame rate of capturing suitable for each capturing scene is set in advance; receiving information related to a special effect for the image generated at a frame rate of the shooting mode; generating a special effect image by applying to the image a special effect corresponding to the received information; and displaying the image sequentially generated at the frame rate of the shooting mode in a time sequence, reading and referring to advisability information from an advisability storing unit which stores the advisability information for assigning an advisability corresponding to a combination of the special effect applied to the image and the frame rate of the shooting mode, and displaying information related to the special effect which needs to be applied to the image, in order from the highest advisability corresponding to a combination with the frame rate of the shooting mode.

An imaging method according to still another aspect of the present invention is executed by an imaging apparatus that captures an image of a subject to generate electronic image data of the subject, displays an image corresponding to the generated image data, and can apply a special effect to the image. The imaging method includes setting in the imaging apparatus one of a plurality of shooting modes for which a frame rate of capturing suitable for each capturing scene is set in advance; receiving an input of information related to a special effect for the image generated at a frame rate of the shooting mode; generating a special effect image by applying to the image a special effect corresponding to the received information; and displaying the image sequentially generated at the frame rate of the shooting mode in a time sequence, reading and referring to advisability information from an advisability storing unit which stores the advisability information for assigning an advisability corresponding to a combination of the special effect applied to the image and the frame rate of the shooting mode, and displaying information related to the special effect which needs to be applied to the image, in order from the highest advisability corresponding to a combination with the frame rate of the shooting mode.

A non-transitory computer-readable recording medium according to still another aspect of the present invention has an executable program stored thereon. The program instructs a processor of the imaging apparatus according to the present invention to perform the imaging method according to the present invention.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a view illustrating an example of a special effect information table stored by a special effect information storing unit included in an imaging apparatus according to the first embodiment of the present invention;

FIG. 26 is a view illustrating an example of a special effect information table stored by a special effect information storing unit included in an imaging apparatus according to the second embodiment of the present invention;

FIG. 28 is a view illustrating an example of a special effect information table stored by a special effect information storing unit included in an imaging apparatus according to the second embodiment of the present invention;

FIG. 37 is a view illustrating an example of an advisability information table stored by an advisability information storing unit of an imaging apparatus;

FIG. 47 is a view illustrating an example of an advisability information table stored by an advisability information storing unit of an imaging apparatus;

FIG. 56 is a view illustrating an example of an image displayed on a display unit of an imaging apparatus.

DETAILED DESCRIPTION OF THE PREFERRED EMBODIMENTS

First Embodiment

Figure 1:
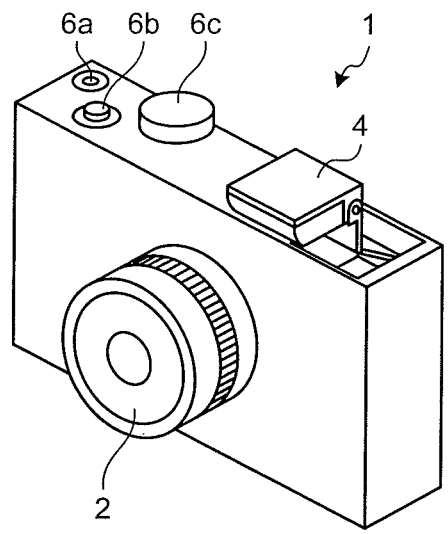
FIG. 1 is a block diagram illustrating a configuration of an imaging apparatus according to a first embodiment of the present invention.
Figure 2:
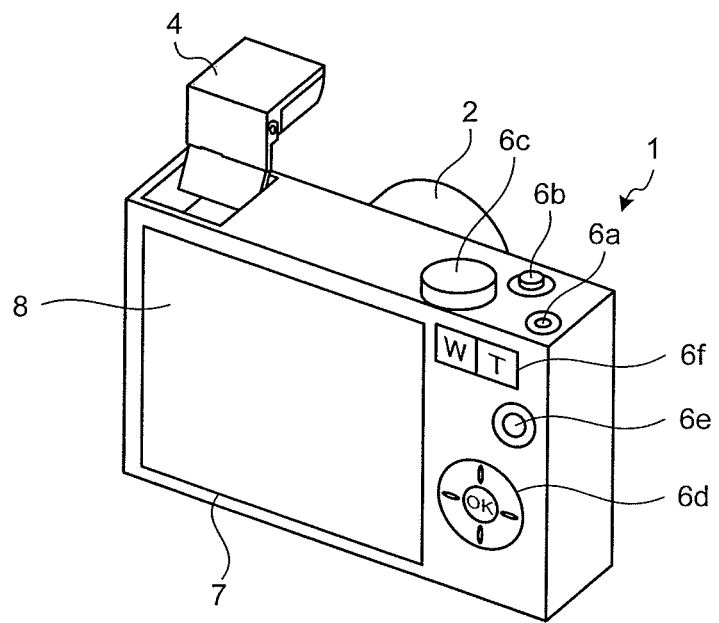
FIG. 2 is a perspective view illustrating a configuration of an imaging apparatus according to the first embodiment according to the present invention on a front surface side.
Figure 3:
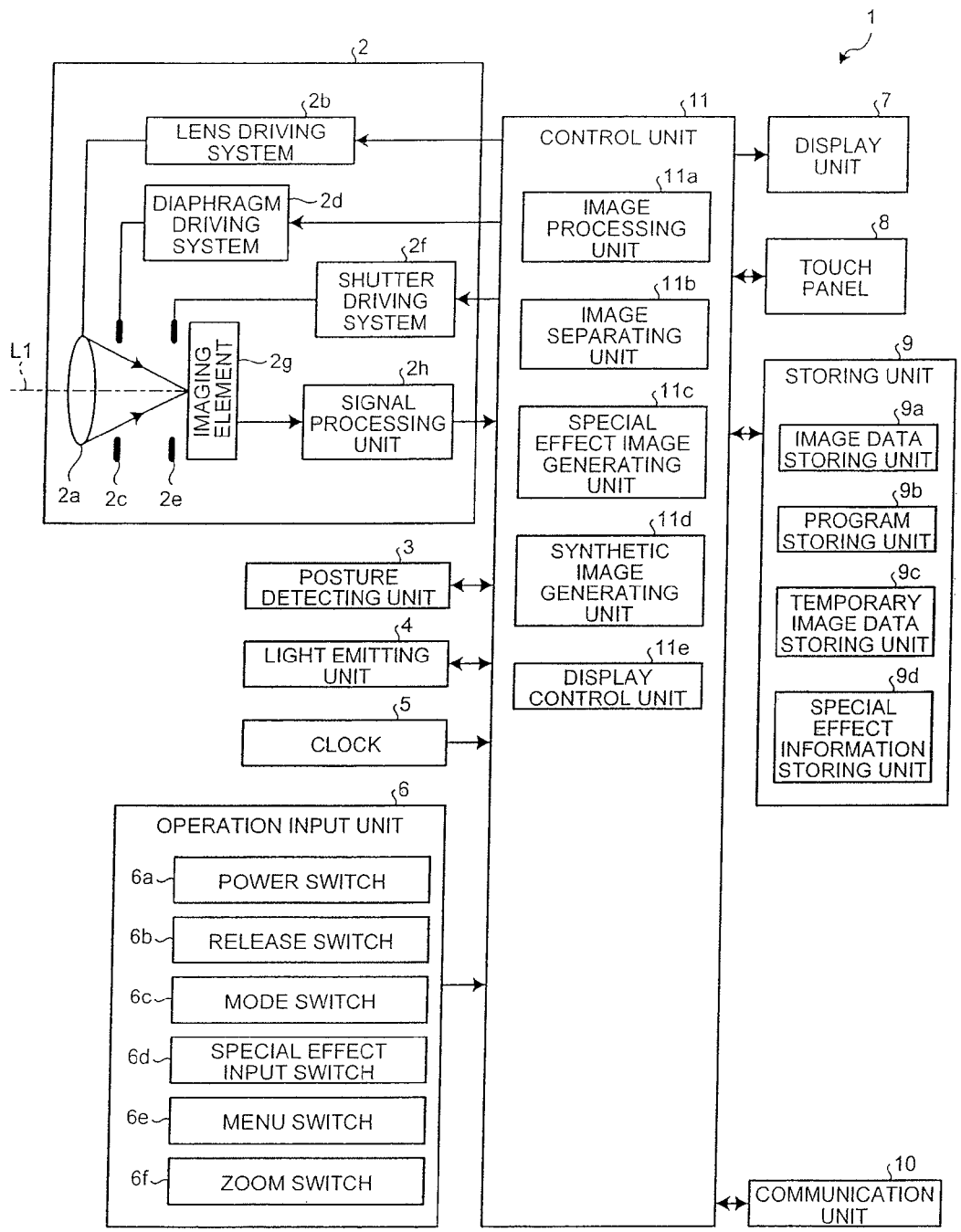
FIG. 3 is a perspective view illustrating a configuration of an imaging apparatus according to the first embodiment of the present invention on a back surface side.

FIG. 1 is view illustrating a configuration of an imaging apparatus according to a first embodiment on a side (front surface side) facing a subject. FIG. 2 is a view illustrating a configuration of an imaging apparatus according to the first embodiment on a side (back surface side) facing a user. FIG. 3 is a block diagram illustrating a configuration of an imaging apparatus according to the first embodiment of the present invention.

As illustrated in FIG. 1 to FIG. 3, an imaging apparatus 1 includes an imaging unit 2 which captures a subject and generates electronic image data of the shot subject; a posture detecting unit 3 which detects an acceleration of the imaging apparatus 1; a light emitting unit 4 which radiates light on a field-of-view area shot by the imaging unit 2; a clock 5 which has a decision function of a shooting date and a timer function; an operation input unit 6 which receives inputs of various pieces of information of the imaging apparatus 1; a display unit 7 which displays an image corresponding to image data generated by the imaging unit 2; a touch panel 8 which receives an input of a signal corresponding to a contact position from an outside; a storing unit 9 which stores various pieces of information including image data generated by the imaging unit 2; a communication unit 10 which performs transmission and reception to and from various databases through the Internet in mutual directions; and a control unit 11 which controls the operation of the imaging apparatus 1.

The imaging unit 2 has a lens unit 2a, a lens driving system 2b, a diaphragm 2c, a diaphragm driving system 2d, a shutter 2e, a shutter driving system 2f, an imaging element 2g and a signal processing unit 2h.

The lens unit 2a is formed with, for example, a focus lens or zoom lens, and condenses light from a predetermined field-of-view area. The lens driving system 2b is formed with, for example, a DC motor, and moves, for example, the focus lens or zoom lens of the lens unit 2a on an optical axis L1 to change, for example, a focus position and focus distance of the lens unit 2a.

The diaphragm 2c adjusts an exposure by limiting an incidence amount of light condensed by the lens unit 2a. The diaphragm driving system 2d has, for example, a stepping motor, and drives the diaphragm 2c.

The shutter 2e sets the state of the imaging element 2g to an exposure state or light blocking state. The shutter driving system 2f has, for example, a stepping motor, and drives the shutter 2e according to a release signal.

The imaging element 2g is realized by, for example, CCD (Charge Coupled Device) or CMOS (Complementary Metal Oxide Semiconductor) which receives and converts light condensed by the lens unit 2a into an electrical signal (analog signal), and outputs the converted electrical signal to the signal processing unit 2h.

The signal processing unit 2h applies signal processing such as amplification to the electrical signal outputted from the imaging element 2g, and then A/D converts the electrical signal into digital image data to output to the control unit 11.

The posture detecting unit 3 includes an acceleration sensor, and detects a posture state and/or motion of the imaging apparatus 1 by detecting the acceleration of the imaging apparatus 1. More specifically, the posture detecting unit 3 detects the posture of the imaging apparatus 1 based on the horizontal plane.

The light emitting unit 4 has, for example, a xenon lamp or LED (Light Emitting Diode). The light emitting unit 4 radiates strobe light of auxiliary light toward the field-of-view area of the imaging unit 2.

The clock 5 generates a time signal based on which the imaging apparatus 1 operates. By this means, the control unit 11 can set, for example, an acquisition time of image data and an exposure time of the imaging element 2g.

The operation input unit 6 includes a power switch 6a which switches a power state of the imaging apparatus 1 to an on state or off state; a release switch 6b which inputs a release signal for commanding to capture an image; a mode switch 6c which switches between various shooting modes of the imaging apparatus 1; a special effect input switch 6d which switches between various settings of the imaging apparatus 1 and receives an input of information related to a special effect; a menu switch 6e which makes the display unit 7 display information related to the various shooting modes of the imaging apparatus 1; and a zoom switch 6f which performs a zoom operation of the imaging unit 2.

The display unit 7 is formed using a display panel including, for example, liquid crystal or organic EL (Electro Luminescence). The display unit 7 displays an image corresponding to image data generated by the imaging unit 2. The display unit 7 adequately displays operation information of the imaging apparatus 1 and information related to shooting. Further, the display unit 7 displays a three-dimensional image (hereinafter, "3D image") corresponding to image data generated by the imaging unit 2. Generally, there is a parallax barrier scheme or lenticular lens scheme adopted in a display unit which displays a 3D image. With the first embodiment, both schemes are applicable to the display unit.

The touch panel 8 is overlaid and provided on a display screen of the display unit 7 (see FIG. 2). The touch panel 8 detects the position which the user contacts (touches) based on information displayed on the display unit 7, and receives an input of the operation signal corresponding to this contact position. Generally, there are a resistive type, a capacitance type and an optical type for a touch panel. With the present embodiment, all types are applicable to the touch panel. In addition, with the first embodiment, the touch panel 8 functions as one of the operation input unit 6.

The storing unit 9 includes an image data storing unit 9a which stores image data captured by the imaging unit 2; a program storing unit 9b which stores various programs executed by the imaging apparatus 1 and capturing programs according to the first embodiment; a temporary image data storing unit 9c which temporarily stores image data captured by the imaging unit 2 or various settings of the imaging apparatus 1; and a special effect information storing unit 9d which stores a special effect information table which assigns an advisability corresponding to a combination of special effects applied to a subject image and background image when special effects are applied. The storing unit 9 is provided inside the imaging apparatus 1 in a fixed manner, and is formed using a semiconductor memory such as a flash memory or RAM (Random Access Memory). In addition, the storing unit 9 may have a function of a storage medium interface which reads information stored in the storage medium while storing the information in a storage medium such as a memory card attached from an outside.

The communication unit 10 has a function of the communication interface, and performs transmission and reception to and from an external processing device such as a server (not illustrated) or personal computer through a network (not illustrated) in a mutual direction. The communication unit 10 acquires various items of program data of the imaging apparatus 1 and data related to a special effect information table by performing transmission and reception to and from the external processing device. In addition, the communication unit 10 is connected to the network through a cable or wireless LAN (Local Area Network).

The control unit 11 is formed with, for example, a CPU (Central Processing Unit). The control unit 11 reads a program from the program storing unit 9b of the storing unit 9 according to, for example, an operation signal from the operation input unit 6 to execute, and performs overall control of the operation of the imaging apparatus 1 by, for example, commanding each unit forming the imaging apparatus 1 or transferring data. The control unit 11 has an image processing unit 11a, an image separating unit 11b, a special effect image generating unit 11c, a synthetic image generating unit 11d and a display control unit 11e.

The image processing unit 11a applies various image processings to image data outputted from the signal processing unit 2h to output to the storing unit 9. More specifically, the image processing unit 11a applies processings such as edge enhancement, color correction and γ correction to image data outputted from the signal processing unit 2h.

The image separating unit 11b separates a subject image and background image from an image corresponding to image data generated by the imaging unit 2. More specifically, using the principle of common triangulation, the image separating unit 11b separates the subject image and background image, based on a parallax of two images corresponding to two items of data which are generated by the imaging unit 2 and in which one ends of respective field of views in left and right directions overlap each other.

The special effect image generating unit 11c generates a special effect image of each image by individually applying special effects corresponding to information received by the touch panel 8 as input, to the subject image and background image separated by the image separating unit 11b. More specifically, for example, the special effect image generating unit 11c applies, to image data, processing including one of a plurality of image processings, tone curve processing, blurring process, shading adding process, image synthesizing process, noise superimposing process, and chroma adjusting process. In addition, the special effect image generating unit 11c may generate a special effect image by applying a special effect to one image corresponding to image data generated by the imaging unit 2. Further, the special effect image generating unit 11c may continuously generate special effect images by sequentially applying special effects to image data continuously generated by the imaging unit 2.

The synthetic image generating unit 11d generates a synthetic image using the special effect image generated by the special effect image generating unit 11c. More specifically, the synthetic image generating unit 11d generates a synthetic image by synthesizing the subject image separated by the image separating unit 11b with the special effect image generated by applying a special effect to the background image by the special effect image generating unit 11c.

The display control unit 11e controls the display unit 7 to perform display. When the special effect image generating unit 11c applies a special effect to one of the subject image and background image, and the synthetic image generating unit 11d synthesizes the special effect image to which this special effect is applied, with the other one of the subject image and background image, the display control unit 11e controls the display unit 7 to display this synthesized synthetic image, and controls the display unit 7 to display information related to the special effect which needs to be applied to the subject image or background image, in order from the highest advisability corresponding to the combination with a special effect applied immediately before, referring to the special effect information table stored in the special effect information storing unit 9d. The display control unit 11e controls the display unit 7 to display information related to the special effects by means of icons. More specifically, the display control unit 11e controls the display unit 7 to display a special effect icon corresponding to special effect information in order from the highest advisability corresponding to the combination with the special effect applied immediately before, referring to the special effect information table.

Figure 4:
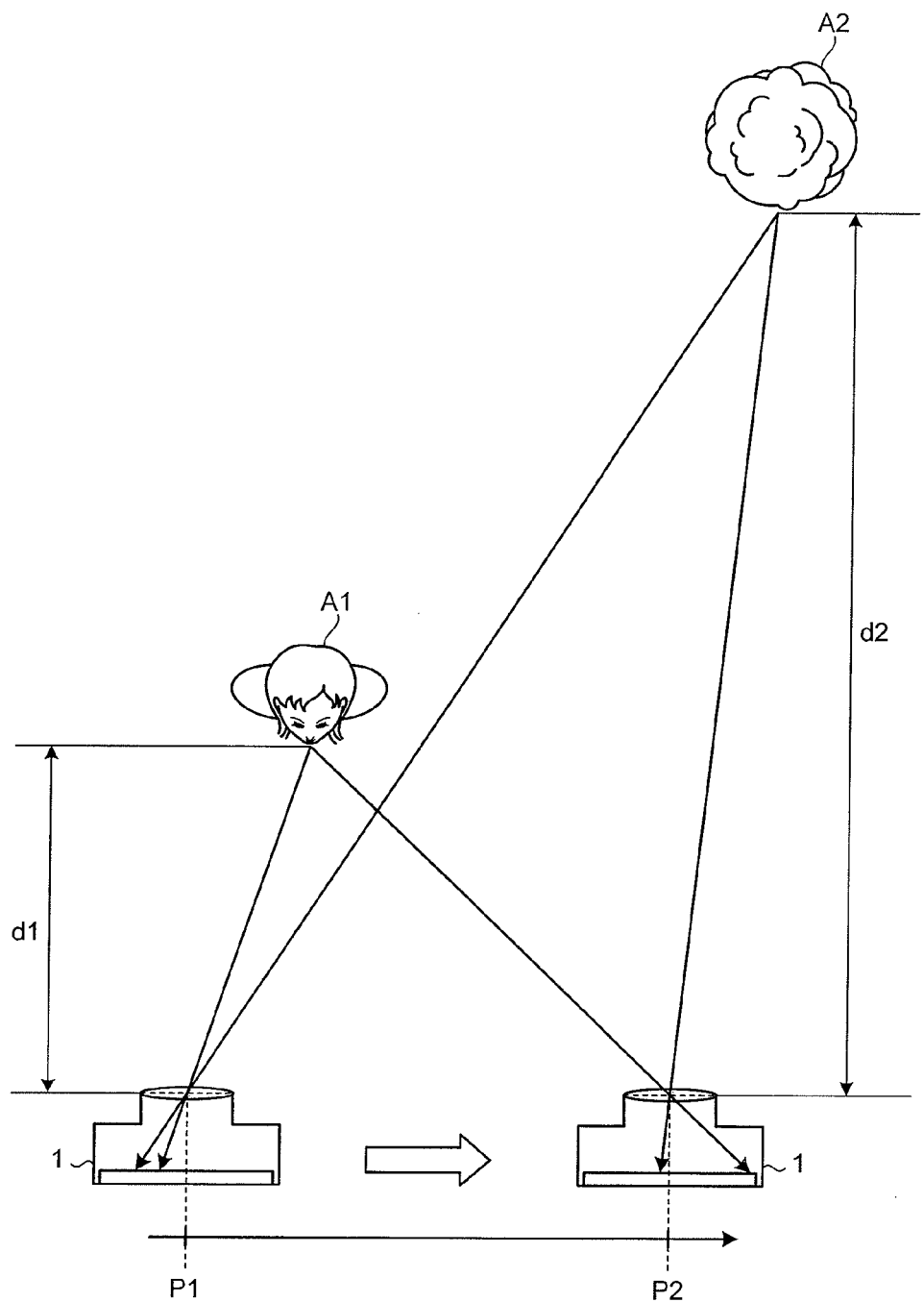
FIG. 4 is a schematic view illustrating a situation when an imaging unit included in an imaging apparatus according to the first embodiment of the present invention generates two items of image data in which one ends of the respective field of views in left and right directions overlap.
Figure 5:
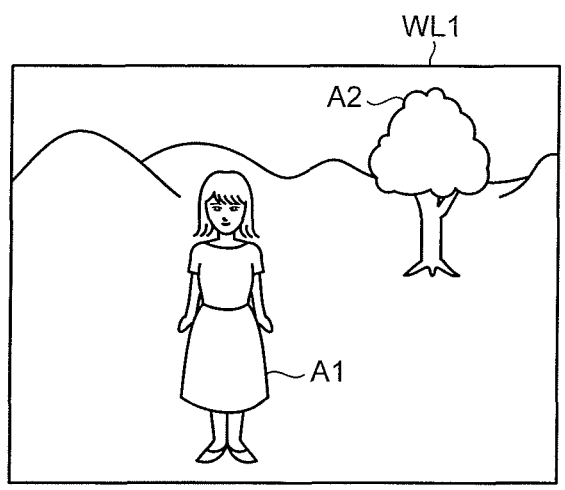
FIG. 5 is a view illustrating an example of an image corresponding to image data generated by the imaging unit under the situation illustrated in FIG. 4.
Figure 6:
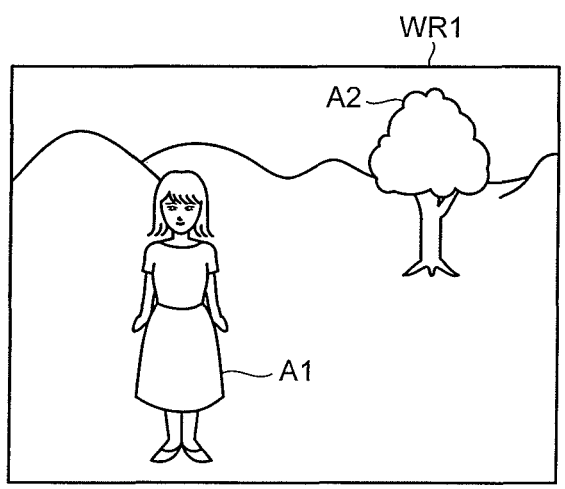
FIG. 6 is a view illustrating an example of an image corresponding to image data generated by the imaging unit under the situation illustrated in FIG. 4.
Figure 7:
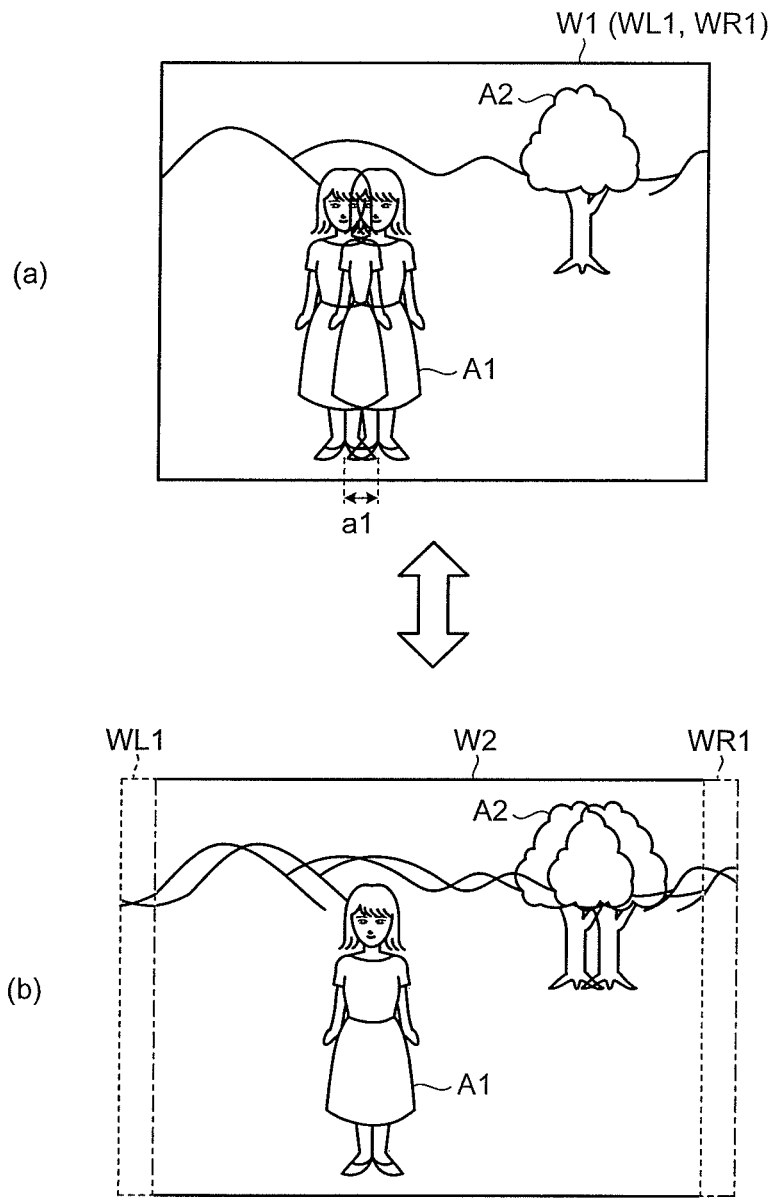
FIG. 7 is a view illustrating an example of an image on which the imaging unit virtually overlays images generated at different capturing positions under the situation illustrated in FIG. 4.

A situation will be described where, in the imaging apparatus 1 employing the above configuration, the image separating unit 11b separates an image generated by the imaging unit 2, into a subject image and background image. FIG. 4 is a schematic view illustrating a situation when the imaging unit 2 generates two items of image data in which one ends of the respective field of views in left and right directions overlap. FIG. 5 is a view illustrating an example of an image corresponding to image data generated by the imaging unit 2 at a capturing position P1 under the situation illustrated in FIG. 4. FIG. 6 is a view illustrating an example of an image corresponding to image data generated by the imaging unit 2 at a capturing position P2 under the situation illustrated in FIG. 4. FIG. 7 is a view illustrating an example of an image on which the imaging unit 2 virtually overlays images generated at different capturing positions under the situation illustrated in FIG. 4. In (a) of FIG. 7, an image W1 is obtained by overlaying images based on the background. Further, in (b) of FIG. 7, an image W2 is obtained by overlaying images based on the subject. In addition, in FIG. 4, the user moves the imaging apparatus 1 from the left side to the right side, and the imaging apparatus 1 continuously captures images in very short time intervals during this period of movement. Hence, there are a plurality of images between the image WL1 and image WR1 illustrated in FIG. 5 and FIG. 6.

As illustrated in FIG. 4, the imaging unit 2 continuously generates a plurality of items of image data having different field-of-view areas by capturing images of a subject A1 (distance d1) and a subject A2 (distance d2) having different distances from the imaging unit 2, at a plurality of capturing positions. More specifically, as illustrated in FIG. 5 and FIG. 6, the imaging unit 2 generates the image WL1 at the capturing position P1 in FIG. 4, and generates the image WR1 at the capturing position P2 in FIG. 4. As illustrated in FIG. 4, the distance d2 between the imaging unit 2 and subject A2 is longer than the distance d1 between the imaging unit 2 and subject A1, so that the areas of the subject A2 of the background nearly overlap. More specifically, as illustrated in (b) of FIG. 7, the areas of the subject A2 nearly overlap in the image W2. By contrast with this, as illustrated in (a) of FIG. 7, in the image W1, the areas of the subject A1 do not overlap, and there is a parallax a1 with respect of the subject A1.

Thus, as illustrated in (a) of FIG. 7, the image separating unit 11b specifies areas which overlap when the image WL1 and image WR1 are virtually overlaid, as a background image. Further, as illustrated in (b) of FIG. 7, the image separating unit 11b specifies an overlapping area as a subject image of the subject A1 by overlaying the image WL1 and image WR1 based on areas of the image WL1 and image WR1 having high brightnesses while moving the image WL1 and image WR1 in different directions.

Figure 8:
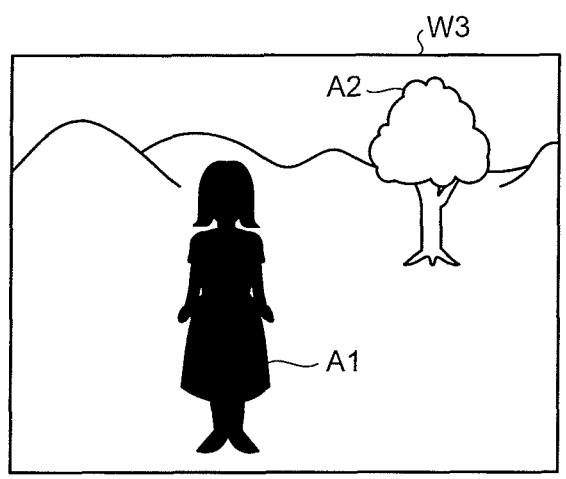
FIG. 8 is a view illustrating an example of a background image generated by an image separating unit included in an imaging apparatus according to the first embodiment of the present invention.
Figure 9:
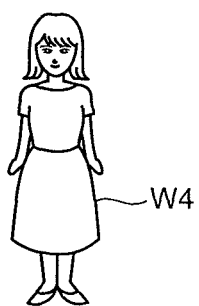
FIG. 9 is a view illustrating an example of a subject image generated by an image separating unit included in an imaging apparatus according to the first embodiment of the present invention.

By this means, as illustrated in FIG. 8 and FIG. 9, the image separating unit 11b can separate a background image W3 and a subject image W4 from the image corresponding to image data generated by the imaging unit 2. In addition, when the image WL1 and image WR1 virtually overlap based on the subject A1, the image separating unit 11b may specify a subject image by overlaying the image WL1 and image WR1 based on areas of the image WL1 and image WR1 having high contrasts.

Figure 10:
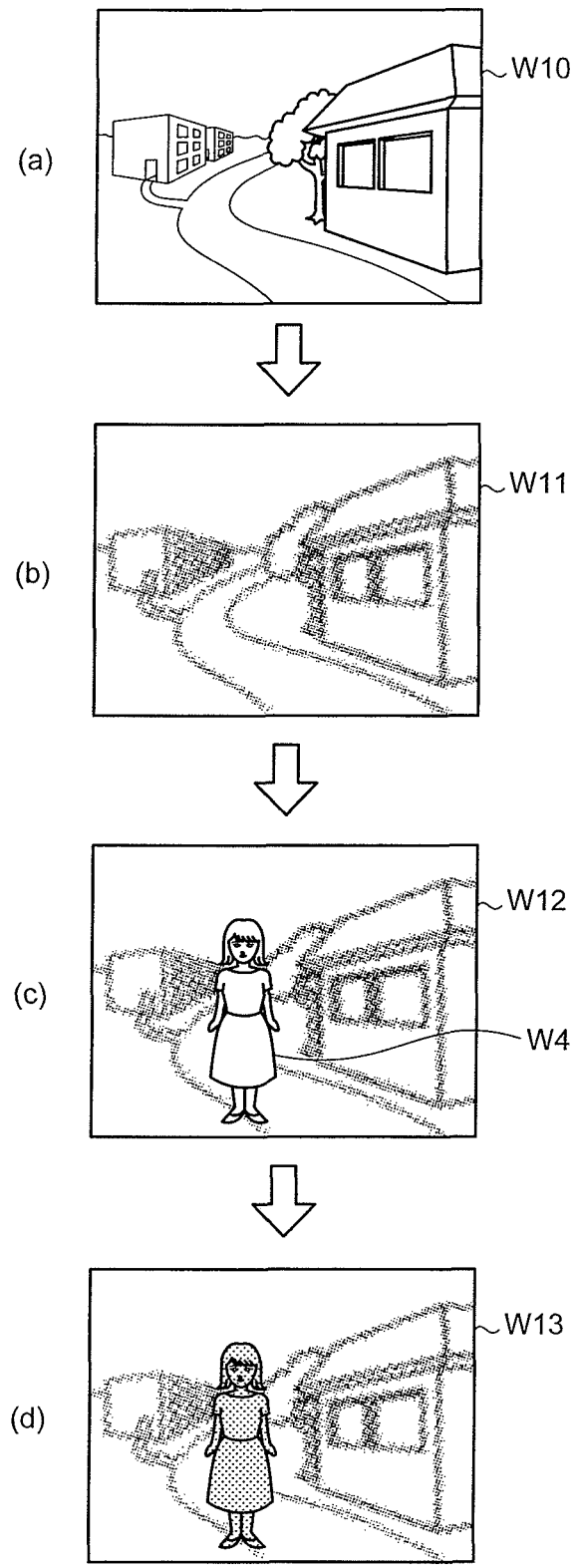
FIG. 10 is a schematic view describing an outline of processing of a special effect image generating unit and synthetic image generating unit included in an imaging apparatus according to the first embodiment of the present invention.

Next, an outline of processings of the special effect image generating unit 11c and the synthetic image generating unit 11d will be described. FIG. 10 is a schematic view describing the outline of the processings of the special effect image generating unit 11c and the synthetic image generating unit 11d.

As illustrated in FIG. 10, the special effect image generating unit 11c first applies a special effect set by the user such as "soft effect" (described below) to the background image W10 stored in the image data storing unit 9a to generate a special effect image W11 ((a)→(b) of FIG. 10). Then, the synthetic image generating unit 11d synthesizes the subject image W4 separated by the image separating unit 11b, with the special effect image W11 to generate a synthetic image W12 ((b)→

(c) of FIG. 10). Finally, the special effect image generating unit 11c applies a special effect set by the user such as "sepia effect" (described below) to the subject image W4 included in the synthetic image W12 to generate a synthetic image W13 ((c)→(d) of FIG. 10). By this means, the imaging apparatus 1 can generate a synthetic image obtained by applying special effects to the subject image and background image. In addition, in (a) to (d) of FIG. 10, the image to which "soft effect" is applied is gradation processed, and the image to which "sepia effect" is applied is shown with hatching.

Figure 11:
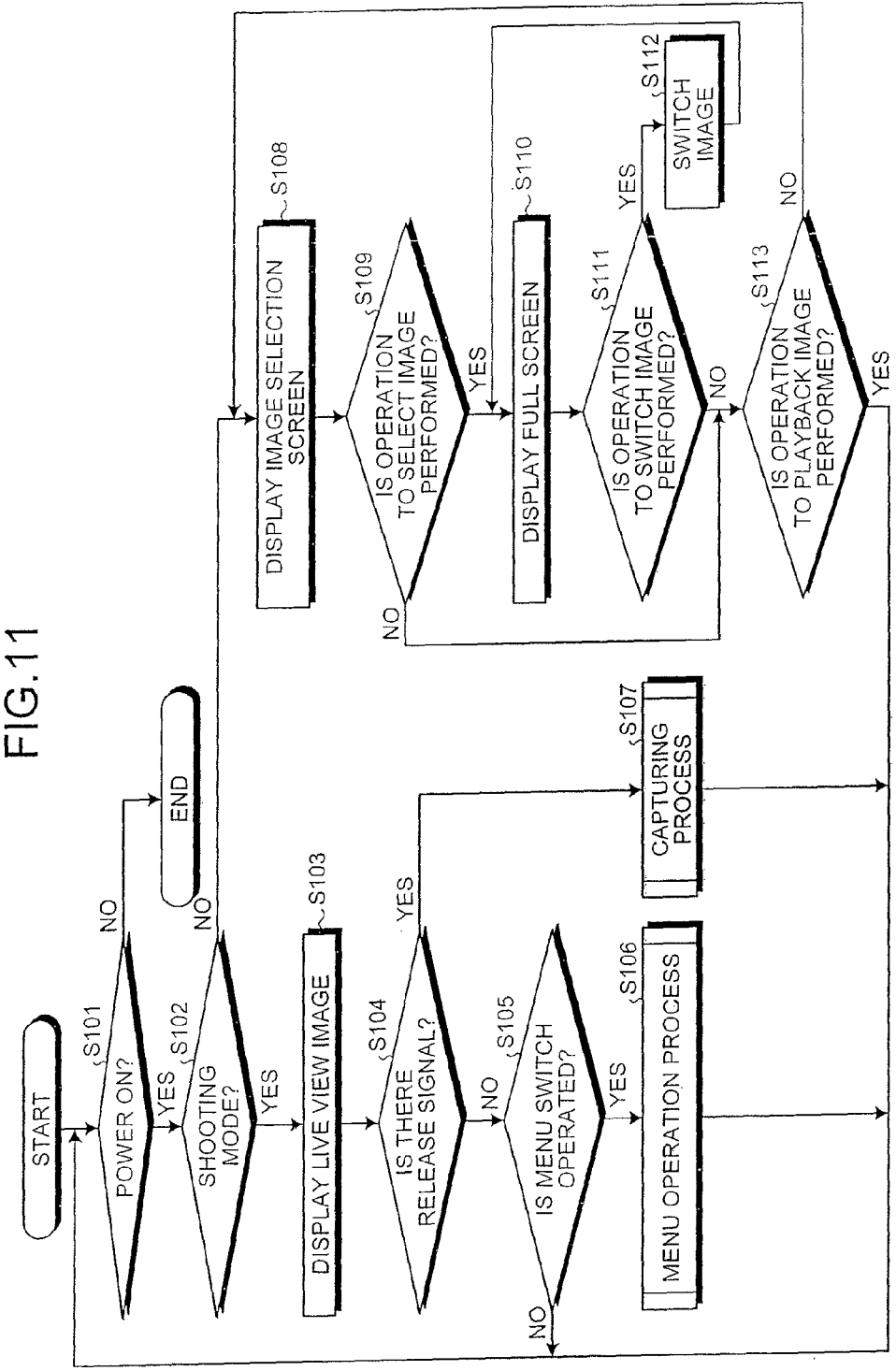
FIG. 11 is a flowchart illustrating an outline of processing performed by an imaging apparatus according to the first embodiment of the present invention.

Next, processing performed by the imaging apparatus 1 according to the first embodiment will be described. FIG. 11 is a flowchart illustrating an outline of processing performed by the imaging apparatus 1.

In FIG. 11, the control unit 11 first decides whether or not the power source of the imaging apparatus 1 is turned on (step S101). When the power source of the imaging apparatus 1 is turned on (step S101: Yes), the imaging apparatus 1 goes to step S102. By contrast with this, when the power source of the imaging apparatus 1 is not turned on (step S101: No), the imaging apparatus 1 finishes the processing.

Subsequently, the control unit 11 decides whether or not the imaging apparatus 1 is set to a shooting mode (step S102). When the imaging apparatus 1 is set to the shooting mode (step S102: Yes), the imaging apparatus 1 goes to step S103 (described below). By contrast with this, when the imaging apparatus 1 is not set to the shooting mode (step S102: No), the imaging apparatus 1 goes to step S108 (described below).

A case (step S102: Yes) will be described where, in step S102, the imaging apparatus 1 is set to the shooting mode. In this case, the display control unit 11e controls the display unit 7 to display live view images corresponding to image data continuously generated by the imaging unit 2 at constant and very small time intervals (step S103).

Subsequently, the control unit 11 decides whether or not a release signal for commanding to capture an image is inputted when the user operates the release switch 6b (step S104). When a release signal for commanding to capture an image is not inputted (step S104: No), the control unit 11 decides whether or not the user operates the menu switch 6e (step S105). When the user does not operate the menu switch 6e within a predetermined time, for example, within 30 seconds (step S105: No), the imaging apparatus 1 returns to step S101. By contrast with this, when the user operates the menu switch 6e (step S105: Yes), the imaging apparatus 1 executes menu operation process of setting a menu included in the shooting mode (step S106), and returns to step S101.

A case (step S104: Yes) will be described where, in step S104, a release signal for commanding to capture an image is inputted. In this case, the imaging apparatus 1 executes a process of capturing a subject (step S107), and returns to step S101.

A case (step S102: No) will be described where, in step S102, the imaging apparatus 1 is not set to the shooting mode. In this case, the display control unit 11e controls the display unit 7 to display an image selection screen which collectively displays a plurality of images stored in the image data storing unit 9a (step S108).

Subsequently, the control unit 11 decides whether or not the user touches the touch panel 8 to select an image on the image selection screen displayed on the display unit 7 (step S109). When the user does not select an image on the image selection screen (step S109: No), the imaging apparatus 1 goes to step S113 (described below). By contrast with this, when the user selects an image on the image selection screen (step S109: Yes), the display control unit 11e controls the display unit 7 to display the image selected by the user on the full screen (step S110), and the imaging apparatus 1 goes to step S111.

In step S111, whether or not the user performs an operation to switch the image is decided. When the user performs the operation to switch the image (step S111: Yes), the display control unit 11e switches the image currently displayed on the display unit 7 (step S112), and the imaging apparatus 1 returns to step S110. By contrast with this, when the user does not perform the operation to switch the image (step S111: No), the control unit 11 decides whether or not an operation to playback the image is performed (step S113). More specifically, the control unit 11 decides whether or not the imaging apparatus 1 is switched from a playback mode to the shooting mode when the user operates the mode switch 6c. When the user does not perform an operation to finish playing an image (step S113: No), the imaging apparatus 1 returns to step S108. By contrast with this, when the user performs the operation to finish playing back an image (step S113: Yes), the imaging apparatus 1 returns to step S101.

Figure 12:
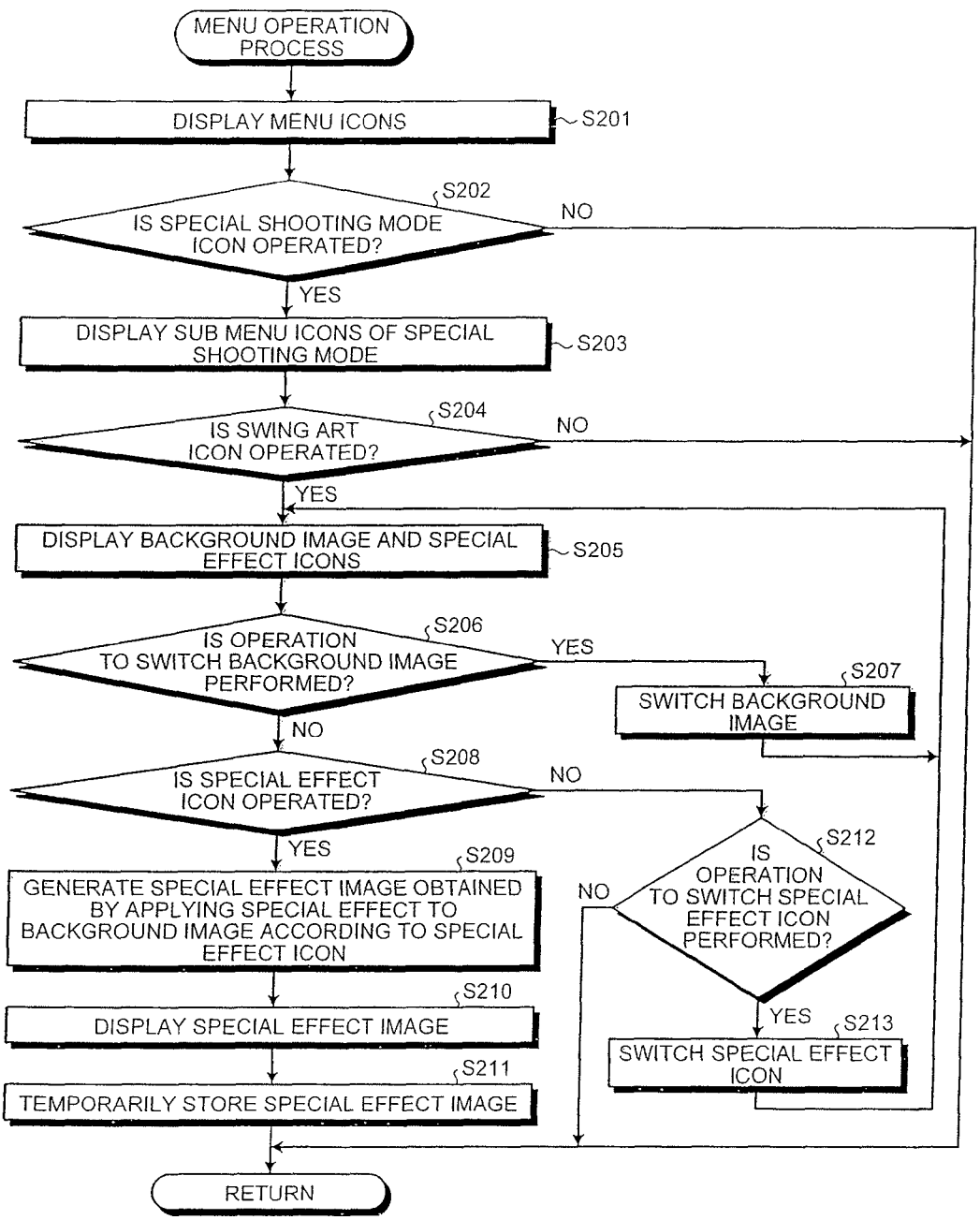
FIG. 12 is a flowchart illustrating an outline of menu operation process performed by an imaging apparatus according to the first embodiment of the present invention.

Next, menu operation process in step S106 in FIG. 11 will be described. FIG. 12 is a flowchart illustrating an outline of menu operation process.

Figure 13:
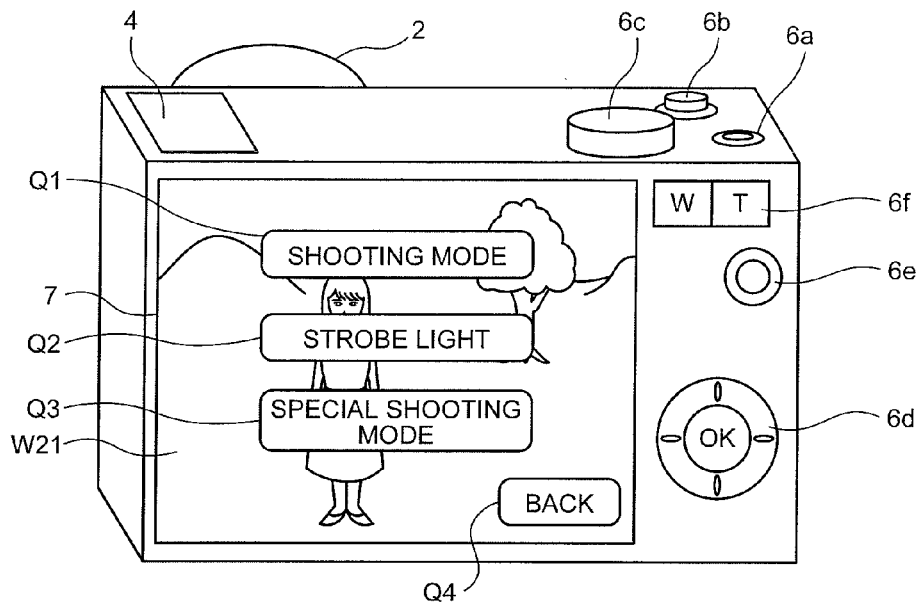
FIG. 13 is a view illustrating an example of an image displayed on a display unit included in an imaging apparatus according to the first embodiment of the present invention.

In FIG. 12, the display control unit 11e first controls the display unit 7 to display menu icons on the image displayed on the display unit 7 (step S201). More specifically, as illustrated in FIG. 13, the display control unit 11e displays a shooting mode icon Q1, a strobe light icon Q2, a special shooting mode icon Q3 and a back icon Q4 on an image W21 displayed on the display unit 7.

The shooting mode icon Q1 receives an input of a command signal for commanding the display unit 7 to display detailed parameters of an operation condition of the shooting mode. As the detailed parameters of the image capturing operation condition, parameters such as a shutter speed, exposure correction range, ISO sensitivity and aperture value are displayed.

The strobe light icon Q2 receives an input of a command signal for commanding the display unit 7 to display detailed parameters of a strobe light operation condition of strobe light (flash). As the detailed parameters of the strobe light operation condition, parameters such as automatic light emission, light emission prohibition, red-eye light emission and forced light emission are displayed.

The special shooting mode icon Q3 receives an input of a command signal for commanding the display unit 7 to display a submenu of the special shooting mode.

Subsequently, the control unit 11 decides whether or not the user operates the special shooting mode icon Q3 (step S202). More specifically, as illustrated in FIG. 13, when the user touches the special shooting mode icon Q3 displayed on the image W21 on the display unit 7, the control unit 11 decides whether or not the special shooting mode icon Q3 is operated according to the signal received by the touch panel 8 as input. When the user does not operate the special shooting mode icon Q3 within a predetermined time, for example, within 30 seconds (step S202: No), the imaging apparatus 1 returns to a main routine illustrated in FIG. 11. By contrast with this, when the user operates the special shooting mode icon Q3 (step S202: Yes), the imaging apparatus 1 goes to step S203.

Figure 14:
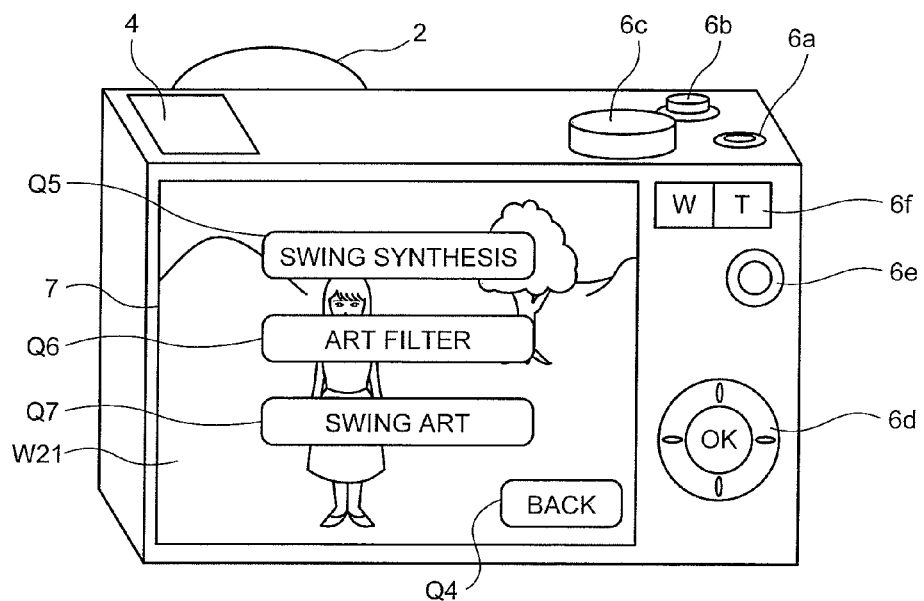
FIG. 14 is a view illustrating an example of an image displayed on a display unit included in an imaging apparatus according to the first embodiment of the present invention.

Then, the display control unit 11e displays submenu icons of the special shooting mode, on the image displayed on the display unit 7 (step S203). More specifically, as illustrated in FIG. 14, the display control unit 11e displays a swing synthesis icon Q5, an art filter icon Q6, a swing art icon Q7 and the back icon Q4, on the image W21 displayed on the display unit 7.

Hereinafter, various icons illustrated in FIG. 14 will be described. The swing synthesis icon Q5 receives an input of a command signal for setting the shooting mode of the imaging apparatus 1 to a swing synthesis shooting mode. The swing synthesis shooting mode refers to a shooting mode of generating a synthetic image by synthesizing one of a subject image or background image separated from an image captured by the image separating unit 11b, with the other image. The art filter icon Q6 receives an input of a command signal for setting the shooting mode of the imaging apparatus 1 to special effect capturing. The special effect capturing refers to a shooting mode of generating a special effect image by applying to the captured image a special effect set in the special effect image generating unit 11c by the user. The swing art icon Q7 receives an input of a command signal for setting the shooting mode of the imaging apparatus 1 to a swing art shooting mode. The swing art shooting mode refers to a shooting mode of generating a special effect image by applying a special effect set in the special effect image generating unit 11c by the user, to one of a subject image or background image separated from the image captured by the image separating unit 11b, and synthesizing this generated special effect image with the other image and generating a synthetic image.

Referring back to FIG. 12, in step S204, the control unit 11 decides whether or not the user operates the swing art icon Q7. More specifically, as illustrated in FIG. 14, when the user touches the swing art icon Q7 displayed on the image W21 on the display unit 7, the control unit 11 decides whether or not the swing art icon Q7 is operated according to the signal received by the touch panel 8 as input. When the user does not operate the swing art icon Q7 within a predetermined time (step S204: No), the imaging apparatus 1 returns to the main routine illustrated in FIG. 11. By contrast with this, when the user operates the swing art icon Q7 (step S204: Yes), the imaging apparatus 1 goes to step S205.

Figure 15:
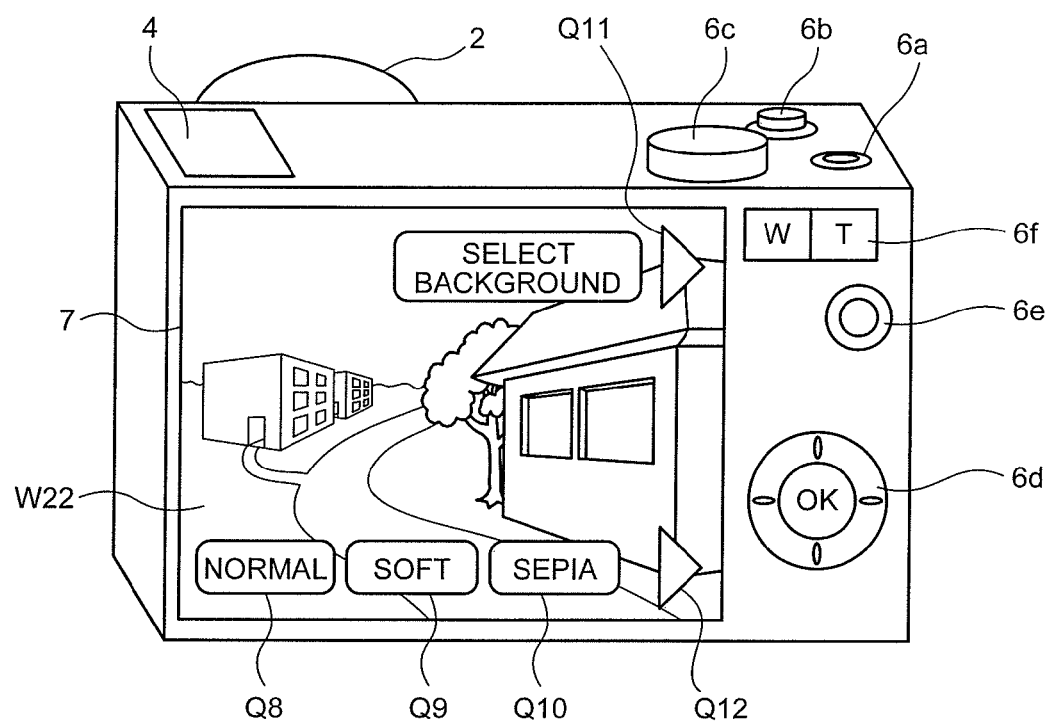
FIG. 15 is a view illustrating an example of an image displayed on a display unit included in an imaging apparatus according to the first embodiment of the present invention.

Subsequently, the display control unit 11e controls the display unit 7 to display a background image corresponding to image data stored in the image data storing unit 9a and a plurality of special effect icons (step S205). More specifically, as illustrated in FIG. 15, the display control unit 11e controls the display unit 7 to display the background image W22, and controls the display unit 7 to display a normal icon Q8, a soft icon Q9 and a sepia icon Q10 referring to a special effect information table stored in the special effect information storing unit 9d.

Meanwhile, a method of displaying special effect icons which the display control unit 11e controls the display unit 7 to display will be described with reference to FIG. 16. FIG. 16 is a view illustrating an example of the special effect information table stored by the special effect information storing unit 9d.

As illustrated in FIG. 16, in a special effect information table T1, special effects are written which are applicable to a subject image and background image. More specifically, the special effects which are applicable to the subject image include "normal", "pop", "fish-eye", "soft", "sepia", "black/white", "sketch" and "miniature". By contrast with this, the special effects which are applicable to the background include "normal", "pop", "fish-eye", "soft", "sepia", "black/white", "sketch" and "miniature".

Further, in the special effect information table T1, (0 to 5) are written for advisabilities which match combinations of special effects to generate a synthetic image by applying special effects to a subject image and background image. More specifically, when the special effect for the subject image is "normal", the advisability is "5" for the combination with a special effect of "normal", "soft" and "sepia" for the background. Further, the advisability is "4" for a combination with "pop", "black/white" and "sketch", and the advisability is "1" for a combination with "fish-eye" and "miniature".

That is, a higher numerical value of the advisability is set for a better combination of special effects. In addition, the numerical values illustrated in FIG. 16 are only examples and by no means limited to these, and a numerical value of the advisability may be changed by, for example, the special effect input switch 6d. Further, a lower numerical value of the advisability may be set for a better combination of special effects.

Thus, the display control unit 11e controls the display unit 7 to display special effect icons in order from the highest advisability of a combination with a special effect, referring to the special effect information table T1. For example, as illustrated in FIG. 15, when a special effect is not applied to the background image W22 currently displayed on the display unit 7 and the state of the background image W22 is "normal", the display control unit 11e controls the display unit 7 to display the normal icon Q8, soft icon Q9 and sepia icon Q10 as special effect icons. By this means, the imaging apparatus 1 can present, to the user, information which serves as a guide to select an optimal combination of special effects for the image currently displayed on the display unit 7.

Next, the special effects illustrated in FIG. 16 will be described respectively.

Normal refers to the state where the special effect image generating unit 11c applies no special effect.

Pop provides an effect of emphasizing a color impressively and colorfully. For example, processing of improving the hue and saturation of image data is performed.

Fish-eye provides an effect of finishing an image by distorting a line in an arc shape as if the line is captured using a fish-eye lens. For example, processing of changing image data to an image distorted by, for example, coordinate conversion is performed.

Soft provides an effect of finishing the entire image softly as if the image was captured using a soft focus lens. For example, processing of decreasing levels of contrast, gradation, synthesis and saturation of image data is performed.

Sepia provides an effect of finishing a sepia and monochrome image. For example, processing of decreasing levels of the white balance and tone curve is performed.

Black/white provides an effect of finishing a black and white image represented by a gray tone. For example, processing of decreasing the level of the white balance is performed.

Sketch provides an effect of finishing a sketchy image in which the profile is drawn by line drawing.

Miniature provides an effect of adjusting focus on the center of the screen and decreasing levels of contrast and blurring process in the surrounding such as upper and lower parts. More specifically, with miniature, shading adding process and image synthesizing process are performed.

Referring back to FIG. 12, in step S206, the control unit 11 decides whether or not the user performs an operation to switch the background image. More specifically, as illustrated in FIG. 15, the control unit 11 decides whether or not the user touches the image switch icon Q11 which receives an input of a command signal for commanding to switch to another background image. When the user performs the operation to switch the background image (step S206: Yes), the display control unit 11e controls the display unit 7 to switch the background image currently displayed on the display unit 7 to another background image stored in the image data storing unit 9a to display on the display unit 7 (step S207), and the imaging apparatus 1 returns to step S205. By contrast with this, when the user does not perform an operation to switch the background image (step S206: No), the imaging apparatus 1 goes to step S208.

Subsequently, the control unit 11 decides whether or not the user operates a special effect icon (step S208). More specifically, as illustrated in FIG. 15, the control unit 11 decides whether or not the user touches one of the normal icon Q8, soft icon Q9 and sepia icon Q10 displayed on the screen of the display unit 7. When the user operates a special effect icon (step S208: Yes), the special effect image generating unit 11c generates a special effect image by applying a special effect such as soft corresponding to the special effect icon touched by the user, to the background image currently displayed on the display unit 7 (step S209), and the display control unit 11e controls the display unit 7 to display the special effect image (see, for example, (b) of FIG. 10) (step S210).

Then, the control unit 11 controls the temporary image data storing unit 9c to temporarily store the special effect image currently displayed on the display unit 7 (step S211), and the imaging apparatus 1 returns to the main routine illustrated in FIG. 11.

A case (step S208: No) will be described where, in step S208, the user does not operate a special effect icon. In this case, the control unit 11 decides whether or not the user performs an operation to switch a special effect icon within a predetermined time (step S212). More specifically, as illustrated in FIG. 15, the control unit 11 decides whether or not the user touches the switch icon Q12 which receives an input of a command signal for commanding to switch to a special effect icon of the second highest advisability from the special effect icon currently displayed on the display unit 7. When the user does not perform the operation to switch a special effect icon within a predetermined period, for example, within 30 seconds (step S212: No), the imaging apparatus 1 returns to the main routine illustrated in FIG. 11. By contrast with this, when the user performs the operation to switch a special effect icon (step S212: Yes), the display control unit 11e controls the display unit 7 to switch the special effect icon to a special effect icon of the second highest advisability such as "pop", "black/white" or "sketch" to display, referring to the special effect information table T1 stored in the special effect information storing unit 9d (step S213), and the imaging apparatus 1 returns to step S205.

Figure 17:
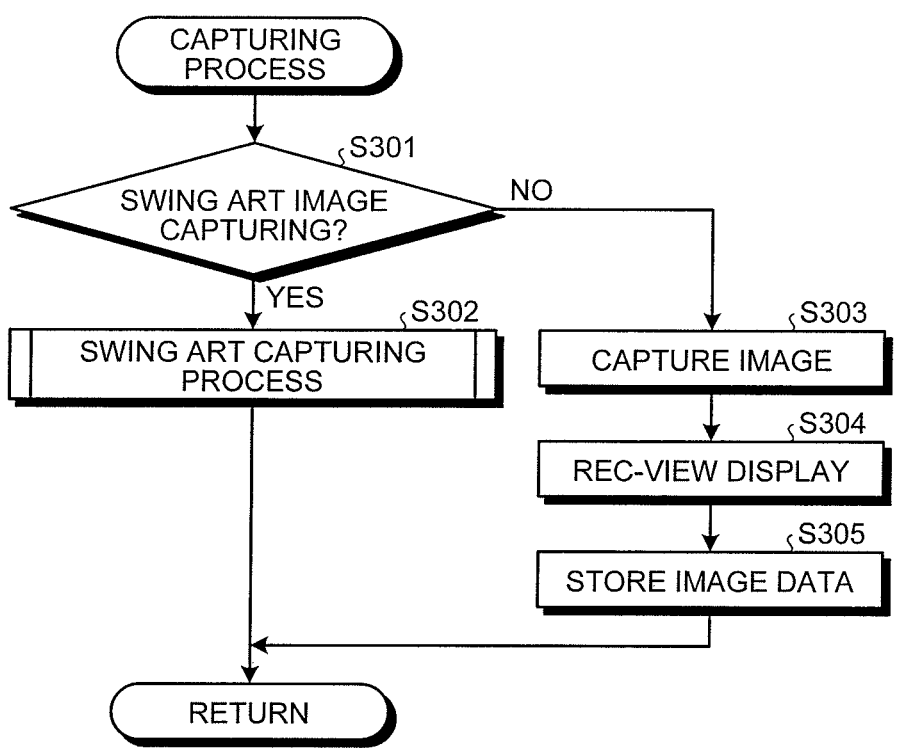
FIG. 17 is a flowchart illustrating an outline of capturing process performed by an imaging apparatus according to the first embodiment of the present invention.

Next, capturing process in step S107 in FIG. 11 will be described. FIG. 17 is a flowchart illustrating an outline of capturing process. In addition, a case will be described below where the shooting mode of the imaging apparatus 1 is set to swing art shooting.

As illustrated in FIG. 17, the control unit 11 first decides whether or not the shooting mode of the imaging apparatus 1 is set to swing art shooting (step S301). When the shooting mode of the imaging apparatus 1 is set to swing art shooting (step S301: Yes), the imaging apparatus 1 executes swing art capturing process of generating a synthetic image by applying special effects to a subject image and background image (step S302), and the imaging apparatus 1 returns to the main routine illustrated in FIG. 11.

A case (step S301: No) will be described where, in step S301, the shooting mode of the imaging apparatus 1 is not set to swing art shooting. In this case, the imaging apparatus 1 captures an image of the subject (step S303), and the display control unit 11e controls the display unit 7 to REC-view display an image corresponding to the captured image data (step S304).

Subsequently, the control unit 11 controls the image data storing unit 9a of the storing unit 9 to store the captured image data (step S305), and the imaging apparatus 1 returns to the main routine illustrated in FIG. 11. In addition, in step S305, compressed data (JPEG) and uncompressed data (RAW) may be stored together as image data. In this case, upon image synthesis described below, the user may select one of these items of image data. Further, the user may set various types of aspect ratios such as 4:3 and 16:9 for the background image, and select a desired aspect ratio depending on expression or the purpose.

Figure 18:
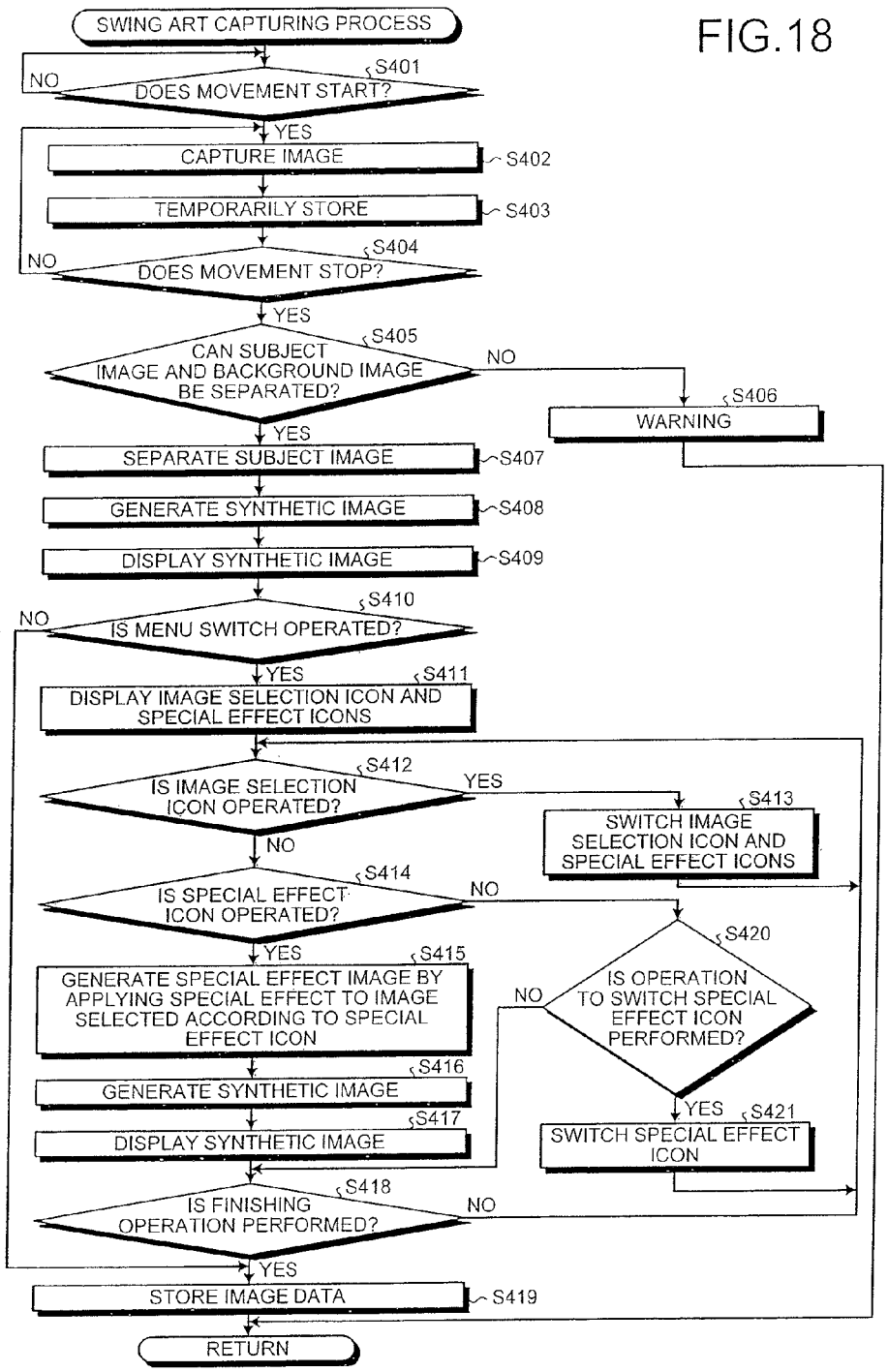
FIG. 18 is a flowchart illustrating an outline of swing art capturing process performed by an imaging apparatus according to the first embodiment of the present invention.

Next, swing art capturing process in step S302 in FIG. 17 will be described. FIG. 18 is a flowchart illustrating an outline of swing art capturing process.

In FIG. 18, the control unit 11 first decides whether or not the user starts moving the imaging apparatus 1 (step S401). More specifically, when the user moves the imaging apparatus 1, the control unit 11 decides whether or not the imaging apparatus 1 starts moving, based on the acceleration detected by the posture detecting unit 3 (see FIG. 4). When the imaging apparatus 1 does not start moving (step S401: No), the control unit 11 repeats this decision. By contrast with this, when the imaging apparatus 1 starts moving (step S401: Yes), the imaging apparatus 1 goes to step S402.

Subsequently, the imaging apparatus 1 continuously captures the subject in very short intervals (step S402), and the control unit 11 controls the temporary image data storing unit 9c of the storing unit 9 to temporarily store the captured images (step S403).

Then, the control unit 11 decides whether or not the imaging apparatus 1 stops moving (step S404). When the imaging apparatus 1 does not stop moving (step S404: No), the imaging apparatus 1 returns to step S402. By contrast with this, when the imaging apparatus 1 stops moving (step S404: Yes), the imaging apparatus 1 goes to step S405.

Subsequently, the control unit 11 decides whether or not the image separating unit 11b can separate a subject image and background image from a plurality of captured images (step S405). More specifically, the control unit 11 decides whether or not the image separating unit 11b can separate a subject image and background image from the captured images, based on the parallax of the subject included in a plurality of images, for example, adjacent images stored in the temporary image data storing unit 9c (see FIG. 7). When the image separating unit 11b cannot separate the subject image and background image from the captured images (step S405: No), the display control unit 11e controls the display unit 7 to display a warning that the subject image and background image cannot be separated from the captured images (step S406), and the imaging apparatus 1 returns to the main routine illustrated in FIG. 17.

A case (step S405: Yes) will be described where, in step S405, the image separating unit 11b can separate the subject image and background image from the captured images. In this case, the image separating unit 11b separates the subject image from the captured images (step S407), and the synthetic image generating unit 11d generates a synthetic image by synthesizing the subject image separated by the image separating unit 11b with a special effect image generated by the special effect image generating unit 11c (see, for example, (c) of FIG. 10) (step S408).

Subsequently, the display control unit 11e controls the display unit 7 to display the synthetic image generated by the synthetic image generating unit 11d (step S409), and the control unit 11 decides whether or not the user operates the menu switch 6e (step S410). When the user operates the menu switch 6e (step S410: Yes), the imaging apparatus 1 goes to step S411 (described below). By contrast with this, when the user does not operate the menu switch 6e within a predetermined time, for example, within 30 seconds (step S410: No), the imaging apparatus 1 goes to step S419 (described below).

Figure 19:
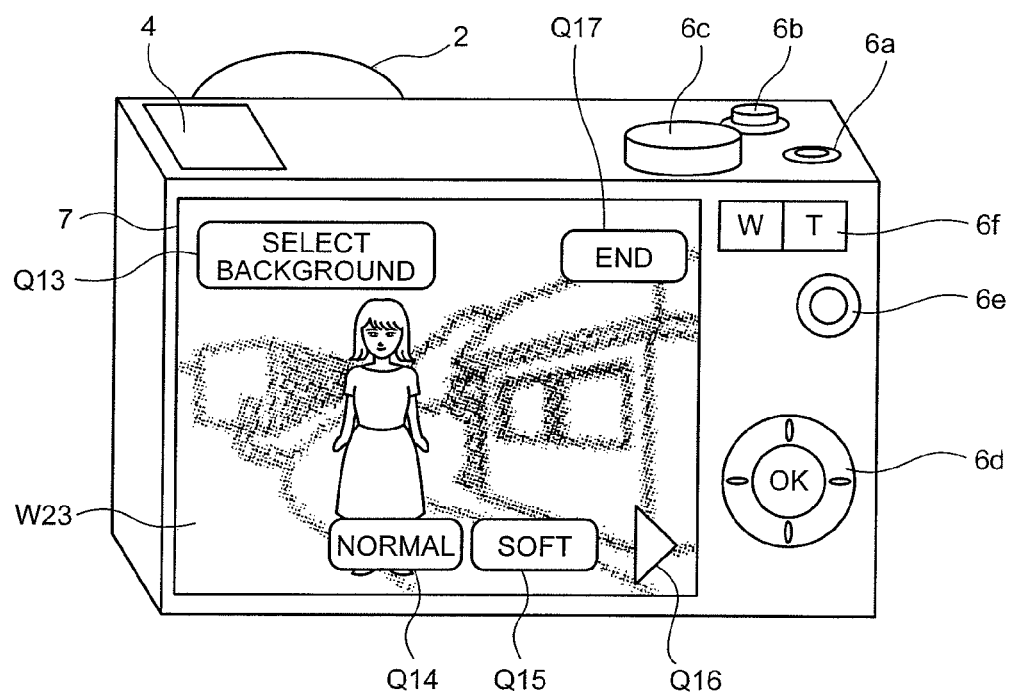
FIG. 19 is a view illustrating an example of an image displayed on a display unit included in an imaging apparatus according to the first embodiment of the present invention.

A case (step S410: Yes) will be described where, in step S410, the user operates the menu switch 6e. In this case, the display control unit 11e controls the display unit 7 to display an image selection icon and special effect icons on an image displayed on the display unit 7 (step S411). More specifically, as illustrated in FIG. 19, the display control unit 11e controls the display unit 7 to display a background selection icon Q13 for commanding to switch to a special effect icon of a special effect applied to the background image, on the synthetic image W23 displayed on the display unit 7. Further, referring to the special effect information table T1, the display control unit 11e controls the display unit 7 to display information related to a special effect which needs to be applied to the subject image, in order from the highest advisability corresponding to the combination with a special effect applied immediately before. For example, the display control unit 11e controls the display unit 7 to display a normal icon Q14 and a soft icon Q15 when the special effect which the special effect image generating unit 11c applies immediately before is "soft". Further, the display control unit 11e controls the display unit 7 to display a switch icon Q16 for receiving an input of a command signal for switching a special effect icon, and an end icon Q17 for receiving an input of a command signal for finishing swing art shooting.

Subsequently, the control unit 11 decides whether or not the user operates the image selection icon (step S412). More specifically, as illustrated in FIG. 19, the control unit 11 decides whether or not the user operates the background selection icon Q13. When the user operates the image selection icon (step S412: Yes), the display control unit 11e controls the display unit 7 to switch and display the image selection icon and special effect icons (step S413), and the imaging apparatus 1 returns to step S412. More specifically, the display control unit 11e controls the display unit 7 to display a subject icon (not illustrated) as the image selection icon, on the synthetic image W23 displayed on the display unit 7, and to display information related to a special effect which needs to be applied to the background image in order from the highest advisability corresponding to a combination with the special effect applied immediately before, referring to the special effect information table T1.

A case (step S412: No) will be described where, in step S412, the user does not operate the image selection icon. In this case, the control unit 11 decides whether or not the user operates the special effect icon (step S414). When the user operates the special effect icon (step S414: Yes), the special effect image generating unit 11c generates a special effect image by applying to the subject image a special effect corresponding to the special effect icon which the touch panel 8 receives as input in a contact area positioned on the display area of the special effect icon (step S415).

Subsequently, the synthetic image generating unit 11d generates a synthetic image using the special effect image generated by the special effect image generating unit 11c (step S416), the display control unit 11e controls the display unit 7 to display the synthetic image generated by the synthetic image generating unit 11d (step S417).

Then, the control unit 11 decides whether or not the user operates the end icon Q17 within a predetermined time (step S418). When the user does not operate the end icon Q17 within a predetermined time, for example, within 30 seconds (step S418: No), the imaging apparatus 1 returns to step S412. By contrast with this, when the user operates the end icon Q17 within a predetermined time (step S418: Yes), the control unit 11 controls the image data storing unit 9a to store image data corresponding to image currently displayed on the display unit 7 (step S419), and the imaging apparatus 1 returns to the main routine illustrated in FIG. 17.

A case (step S414: No) will be described where, in step S414, the user does not operate the special effect icon. In this case, the control unit 11 decides whether or not the user performs an operation to switch a special effect icon (step S420). More specifically, the control unit 11 decides whether or not the user operates the switch icon Q16 (see FIG. 19). When the user does not perform an operation to switch the special effect icon (step S420: No), the imaging apparatus 1 goes to step S418. By contrast with this, when the user performs an operation to switch the special effect icon (step S420: Yes), the display control unit 11e controls the display unit 7 to switch the special effect icon to a special effect icon of the second highest advisability to display, referring to the special effect information table T1 (step S421), and the imaging apparatus 1 returns to step S412. More specifically, the display control unit 11e controls the display unit 7 to display special effect icons "sepia" and "black/white" as the special effect icons of the second highest advisabilities.

According to the first embodiment described above, when the special effect image generating unit 11c applies a special effect to one of a subject image and background image, and the synthetic image generating unit 11d synthesizes this special effect image to which this special effect is applied, with the other one of the subject image and background image, the display control unit 11e controls the display unit 7 to display this synthesized synthetic image, and controls the display unit 7 to display information related to a special effect which needs to be applied to the subject image or background image, in order from the highest advisability corresponding to the combination with a special effect applied immediately before, referring to the special effect information table T1 stored in the special effect information storing unit 9d. Consequently, when a synthetic image is generated by applying special effects individually to two items of image data, it is possible to present, to the user, information which serves as a guide to select a combination of special effects.

Further, with the first embodiment, the display control unit 11e controls the display unit 7 to first display special effect icons of a combination of the highest advisability, so that it is possible to obtain a synthetic image by applying special effects to the subject image and background image, respectively without missing a chance to capture an image of the subject due to the user's operation of selecting the special effects.

Second Embodiment

Next, a second embodiment will be described. With the above first embodiment, the display control unit controls the display unit to display information related to a special effect which needs to be applied to a subject image or background image in order from the highest advisability corresponding to a combination with a special effect applied immediately before, referring to the special effect information table. By contrast with this, with the second embodiment, a special effect information storing unit stores a second special effect information table which assigns an advisability corresponding to a combination of a shooting mode which can be set in the imaging apparatus and a special effect applied to a subject image or background image, and, when the shooting mode is set according to an input from the input unit, the display control unit controls the display unit to display information related to a special effect in order from the highest advisability corresponding to a combination with a set shooting mode, referring to the second special effect information table. In addition, the imaging apparatus according to the second embodiment employs the same configuration as the imaging apparatus 1 according to the above first embodiment. Hence, with the second embodiment, a plurality of shooting modes will be described which are provided in the imaging apparatus 1 and are set respectively according to various capturing scenes.

First, a plurality of shooting modes will be described which are provided in the imaging apparatus 1 according to the second embodiment and which are set respectively according to various capturing scenes. The imaging apparatus 1 according to the second embodiment has shooting modes of normal image capturing, panorama shooting, swing 3D shooting, 3D shooting, HDR (High Dynamic Range) shooting and S strobe shooting. In addition, the above shooting modes are only examples, and are by no means limited to these.

Figure 20:
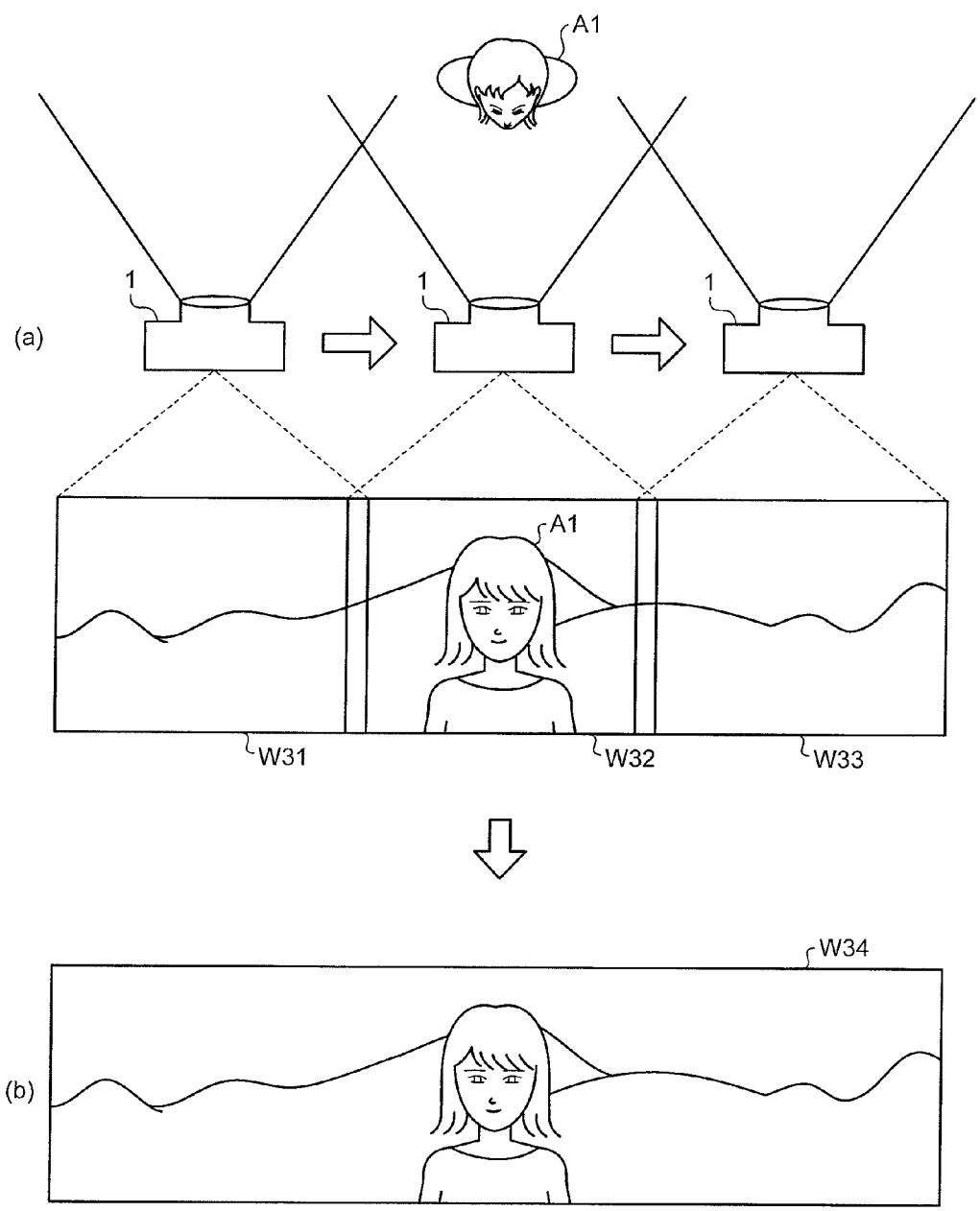
FIG. 20 is a schematic diagram describing a capturing method of panorama shooting according to a shooting mode performed by an imaging apparatus according to the second embodiment of a present invention.

FIG. 20 is a schematic diagram describing a capturing method of panorama shooting according to a shooting mode performed by the imaging apparatus 1. As illustrated in FIG. 20, when the user moves the imaging apparatus 1 from the left side to the right side, the imaging apparatus 1 generates a plurality of items of image data continuously captured at a plurality of capturing positions. More specifically, as illustrated in FIG. 20, the imaging apparatus 1 generates images W31 to W33 ((a) of FIG. 20). Then, the synthetic image generating unit 11d generates one panorama image W34 by overlaying and synthesizing ends of the images W31 to W33 in the lateral direction ((b) of FIG. 20). By this means, the user can obtain a panorama image W34 by capturing images while moving the imaging apparatus 1. In addition, in (a) of FIG. 20, typical three images W31 to W33 of a plurality of images generated by the imaging unit 2 are illustrated, and there are a plurality of images between the images W31 and W33.

Further, the imaging apparatus 1 can perform 3D shooting and swing 3D shooting in the shooting modes of the imaging apparatus 1 by capturing images while being moved by the user. 3D shooting refers to continuously capturing a subject while the user moves the imaging apparatus 1, and generating two items of image data in which one ends of the respective field of views in left and right directions overlap. More specifically, as illustrated in FIG. 20, by continuously capturing a subject A1 while being moved by the user from the left to the right, the imaging apparatus 1 generates two items of image data in which one ends of the respective field of views in the left and right directions overlap. By this means, the imaging apparatus 1 can generate three-dimensional images (hereinafter "3D image") which the user virtually recognizes. Further, swing 3D shooting refers to generating a special effect 3D image by applying a special effect to a captured 3D image. More specifically, the image separating unit 11b separates the subject image and background image from the 3D image, and the special effect image generating unit 11c generates a special effect image by applying special effects to the separated subject image and background image respectively. Then, the synthetic image generating unit 11d synthesizes the special effect images and generates a special effect 3D image. By this means, the imaging apparatus 1 can generate a special effect 3D image obtained by applying a special effect to a 3D image.

Figure 21:
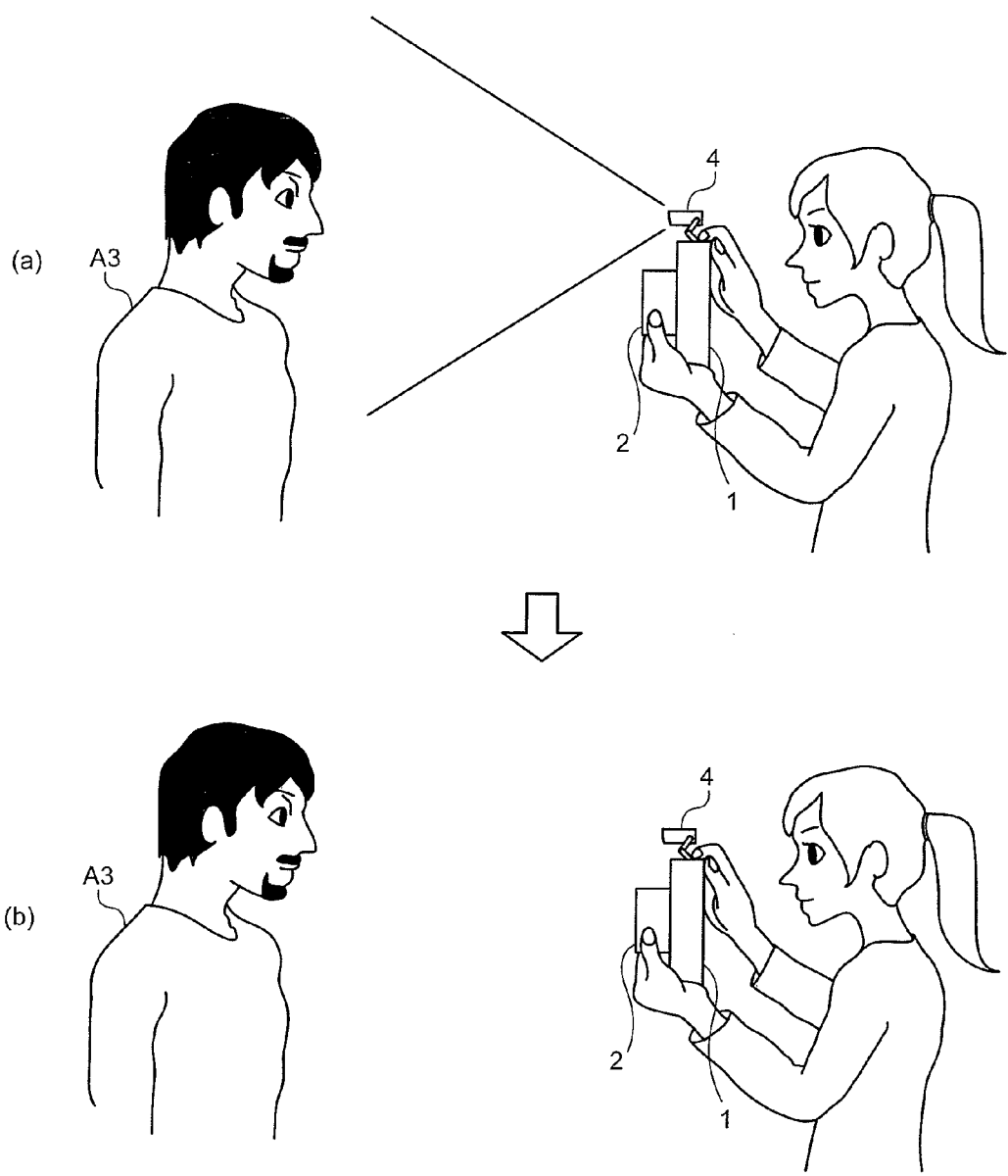
FIG. 21 is a schematic diagram describing a capturing method of HDR shooting according to a shooting mode performed by an imaging apparatus according to the second embodiment of the present invention.
Figure 22:
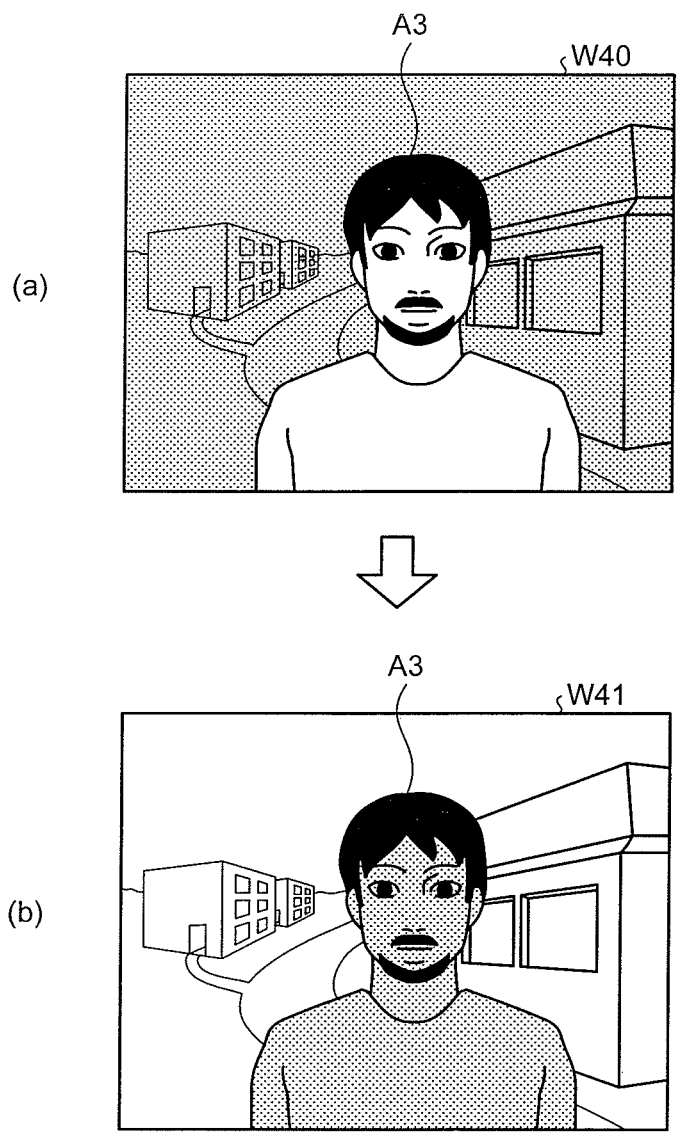
FIG. 22 is a view illustrating an example of an image generated by an imaging apparatus under the situation illustrated in FIG. 21.

FIG. 21 is a schematic diagram describing a capturing method of HDR shooting according to a shooting mode performed by the imaging apparatus 1. FIG. 22 is a view illustrating an example of an image generated by the imaging apparatus 1 under the situation illustrated in FIG. 21. In addition, in FIG. 22, an image W40 is generated by the imaging apparatus 1 under the situation illustrated in FIG. 21(a), and an image W41 is generated by the imaging apparatus 1 under the situation illustrated in FIG. 21(b). HDR shooting refers to synthesizing an image of an image having brightness for a dark portion and an image having brightness for a bright portion and expanding a reproduction area of the brightness in order to obtain an image of a large dynamic range.

As illustrated in FIG. 21, the imaging apparatus 1 first radiates light of the light emitting unit 4 on a subject A3, captures the subject A3 and generates the image W40 (FIG. 22(a)). Subsequently, the imaging apparatus 1 captures the subject A3 over an exposure time which is, for example, doubled compared to normal capturing, and generates the image W41 ((b) of FIG. 22).

Then, the image separating unit 11b separates the subject images and background images from the image W40 and image W41, based on the difference between the brightness value of the image W40 and brightness value of the image W41. More specifically, the image separating unit 11b specifies and separates as the subject image an area having the difference between the brightness value of the image W40 and brightness value of the image W41 equal to or more than a threshold.

By contrast with this, the image separating unit 11b specifies and separates as the background image an area having the difference between the brightness value of the image W40 and the brightness value of the image W41 less than a threshold.

Subsequently, the synthetic image generating unit 11d generates a synthetic image by synthesizing the subject image separated from the image W40 and the background image separated from the image W41 by the image separating unit 11b.

By this means, the imaging apparatus 1 can generate a synthetic image having optimal brightness value for the subject A3 and background.

Further, the imaging apparatus 1 can perform S strobe shooting of capturing an image by increasing strobe light emission compared to normal capturing, and background blurring capturing of blurring processing the background by increasing an aperture value compared to normal capturing. Meanwhile, S strobe refers to processing of synthesizing an image for which strobe light is emitted, and an image for which an exposure time is provided longer without emitting strobe light, preventing the background from becoming dark and reproducing the background and person correctly. Further, background blurring refers to processing of minimizing the change of the brightness of an image and decreasing the contrast.

Processing performed by the imaging apparatus 1 according to the second embodiment which has the above shooting modes will be described. The imaging apparatus 1 according to the second embodiment performs the same processing as in the above first embodiment (see FIG. 11) except menu operation process and capturing process. Hence, menu operation process performed by the imaging apparatus 1 according to the second embodiment will be described, and then capturing process performed by the imaging apparatus 1 according to the second embodiment will be described.

Figure 23:
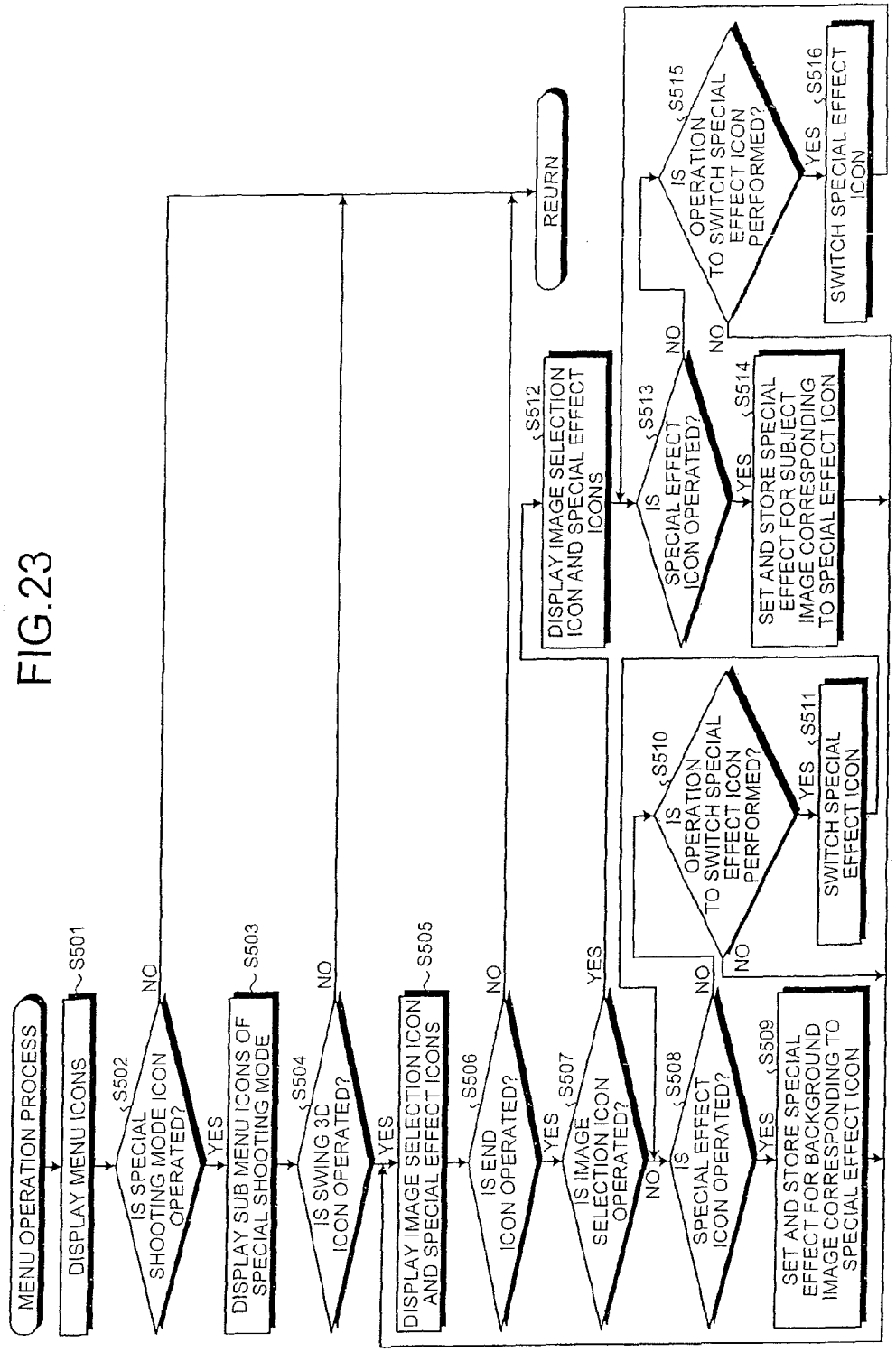
FIG. 23 is a flowchart illustrating an outline of menu operation process performed by an imaging apparatus according to the second embodiment of the present invention.

FIG. 23 is a flowchart illustrating an outline of menu operation process performed by the imaging apparatus 1 according to the second embodiment.

In FIG. 23, the display control unit 11e first controls the display unit 7 to display the menu icons (see FIG. 13) on the image displayed on the display unit 7 (step S501), and the control unit 11 decides whether or not the user operates the special shooting mode icon (step S502). When the user does not operate the special shooting mode icon within a predetermined time (step S502: No), the imaging apparatus 1 returns to the main routine illustrated in FIG. 11. By contrast with this, when the user operates the special shooting mode icon (step S502: Yes), the imaging apparatus 1 goes to step S503.

Figure 24:
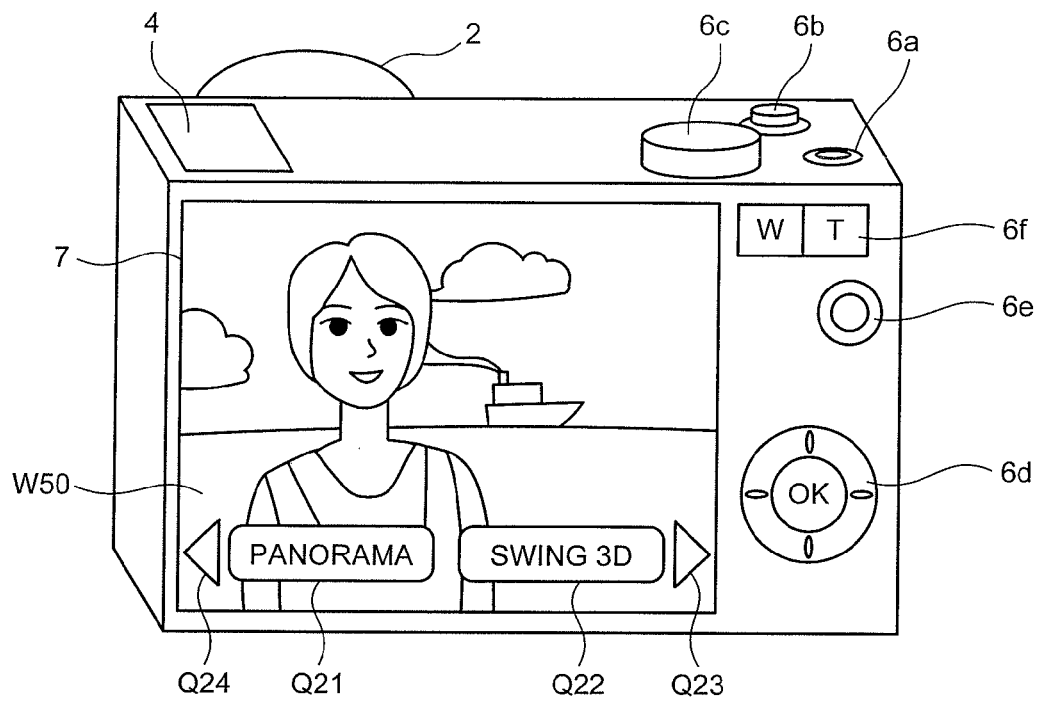
FIG. 24 is a view illustrating an example of an image displayed on a display unit included in an imaging apparatus according to the second embodiment of the present invention.

Subsequently, the display control unit 11e controls the display unit 7 to display submenu icons of the special shooting mode on the image displayed on the display unit 7 (step S503). More specifically, as illustrated in FIG. 24, the display control unit 11e controls the display unit 7 to display, for example, a panorama icon Q21 which receives an input of a command signal for commanding the setting of panorama shooting in the imaging apparatus 1 and a swing 3D icon Q22 which receives an input of a command signal for commanding the setting of swing 3D shooting in the imaging apparatus 1, on an image W50 displayed on the display unit 7. In addition, although, in FIG. 24, the submenu icons of the shooting mode are only the panorama icon Q21 and swing 3D icon Q22, the submenu icons are by no means limited to these. More specifically, when the user operates the switch icon Q23 or Q24 which receives an input of a command signal for commanding to switch the shooting mode, the display control unit 11e controls the display unit 7 to display another submenu icon, for example, a 3D shooting icon which receives an input of a command signal for commanding the setting of 3D shooting in the imaging apparatus 1.

Subsequently, the control unit 11 decides whether or not the user operates the swing 3D icon (step S504). When the user does not operate the swing 3D icon within a predetermined time (step S504: No), the imaging apparatus 1 returns to the main routine illustrated in FIG. 11. By contrast with this, when the user operates the swing 3D icon (step S504: Yes), the imaging apparatus 1 goes to step S505.

Figure 25:
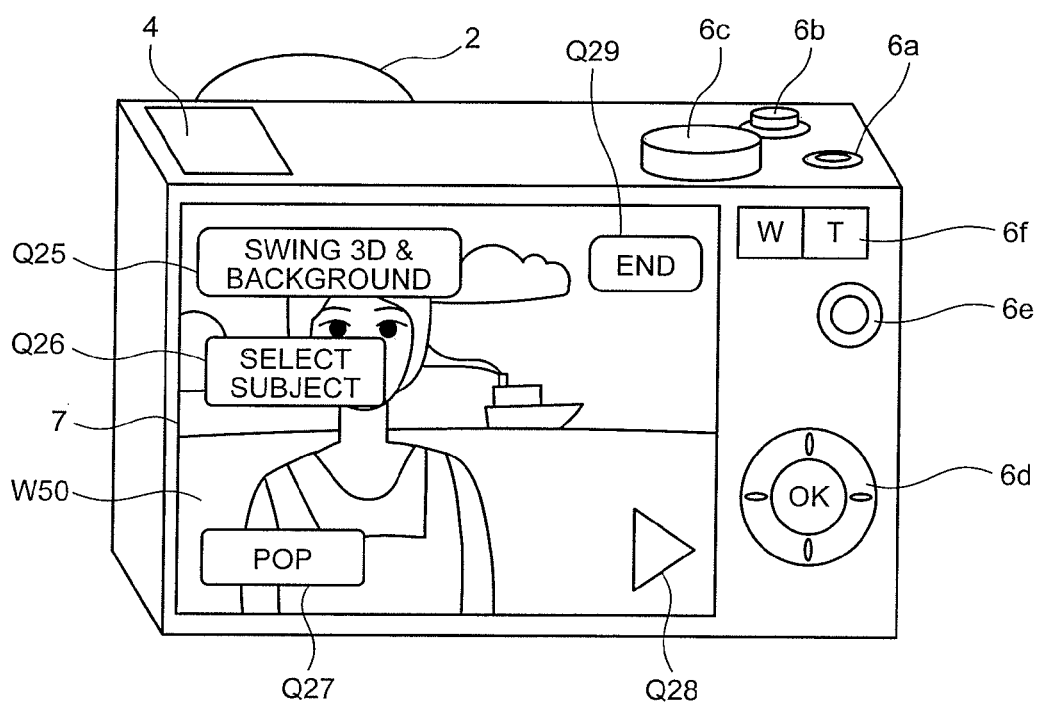
FIG. 25 is a view illustrating an example of an image displayed on a display unit included in an imaging apparatus according to the second embodiment of the present invention.

Then, the display control unit 11e controls the display unit 7 to display an image selection icon and special effect icons on the image displayed on the display unit 7 (step S505). More specifically, as illustrated in FIG. 25, the display control unit 11e controls the display unit 7 to display a subject selection icon Q26 as the image selection icon, and to display a pop icon Q27 as information related to a special effect in order from the highest advisability corresponding to the combination with the set shooting mode, referring to a second special effect information table stored in the special effect information storing unit 9d. In addition, in FIG. 25, the icon Q25 indicates information related to the current shooting mode of the imaging apparatus 1 set by the user and information of an image to which a special effect set by the user is applied.

Hereinafter, a method of displaying special effect icons which the display control unit 11e controls the display unit 7 to display will be described with reference to FIG. 26. FIG. 26 is a view illustrating an example of the second special effect information table stored by the special effect information storing unit 9d.

As illustrated in FIG. 26, in the special effect information table T2, special effects are written which are applicable to shooting mode which can be set in the imaging apparatus 1. More specifically, the special effects which are applicable to the shooting mode include "miniature", "pop", "fish-eye", "soft", "sepia", "black/white" and "sketch". Further, numerical values (0 to 5) are written for advisabilities corresponding to combinations of shooting modes which can be set in the imaging apparatus 1 and special effects applied to a subject image or background image. More specifically, when the shooting mode is "swing 3D", the advisability is "5" for "pop" of the special effect. Further, when the shooting mode is "swing 3D", the advisability is "0" for "fish-eye" of the special effect. The combination of this shooting mode and special effect having the advisability of "0" cannot provide a distinctive visual effect of a special effect for the captured image.

Thus, with the second embodiment, the display control unit 11e controls the display unit 7 to display special effect icons in order from the highest advisability with the shooting mode, referring to the second special effect information table T2 stored in the special effect information storing unit 9d. Further, the display control unit 11e controls the display unit 7 to display only icons of special effects which can be used in combination with shooting modes. That is, the display control unit 11e controls the display unit 7 not to display special effect icons having the advisability "0" of the shooting mode and special effect.

Referring back to FIG. 23, in step S506, the control unit 11 decides whether or not the user operates the end icon Q29 (see FIG. 25). When the user operates the end icon Q29 (step S506: Yes), the imaging apparatus 1 returns to the main routine illustrated in FIG. 11. By contrast with this, when the user does not operate the end icon Q29 (step S506: No), the imaging apparatus 1 goes to step S507.

Subsequently, the control unit 11 decides whether or not the user operates the image selection icon (step S507). More specifically, as illustrated in FIG. 25, the control unit 11 decides whether or not the subject selection icon Q26 which receives an input of a command signal for switching to the setting of a special effect applied to the subject image is operated. When the user does not operate the image selection icon (step S507: No), the control unit 11 decides whether or not the user operates the special effect icon (step S508). More specifically, as illustrated in FIG. 25, the control unit 11 decides whether or not the user operates the pop icon Q27. When the user operates the special effect icon (step S508: Yes), the control unit 11 sets the special effect for the background image according to the special effect icon operated by the user and stores this set setting content in the temporary image data storing unit 9c (step S509), and the imaging apparatus 1 returns to step S505.

A case (step S508: No) will be described where, in step S508, the user does not operate the special effect icon. In this case, the control unit 11 decides whether or not the user performs an operation to switch a special effect icon (step S510). More specifically, as illustrated in FIG. 25, the control unit 11 decides whether or not the user operates the switch icon Q28 which receives an input of a command signal for commanding to switch to a special effect icon of the second highest advisability from the special effect icon currently displayed on the display unit 7. When the user does not perform an operation to switch a special effect icon within a predetermined time (step S510: No), the imaging apparatus 1 returns to step S505. By contrast with this, when the user performs an operation to switch a special effect icon (step S510: Yes), the display control unit 11e controls the display unit 7 to switch a special effect icon of the second highest advisability such as a special effect icon of "black/white" to display, referring to the special effect information table T2 stored in the special effect information storing unit 9d (step S511), and the imaging apparatus 1 returns to step S508.

Figure 27:
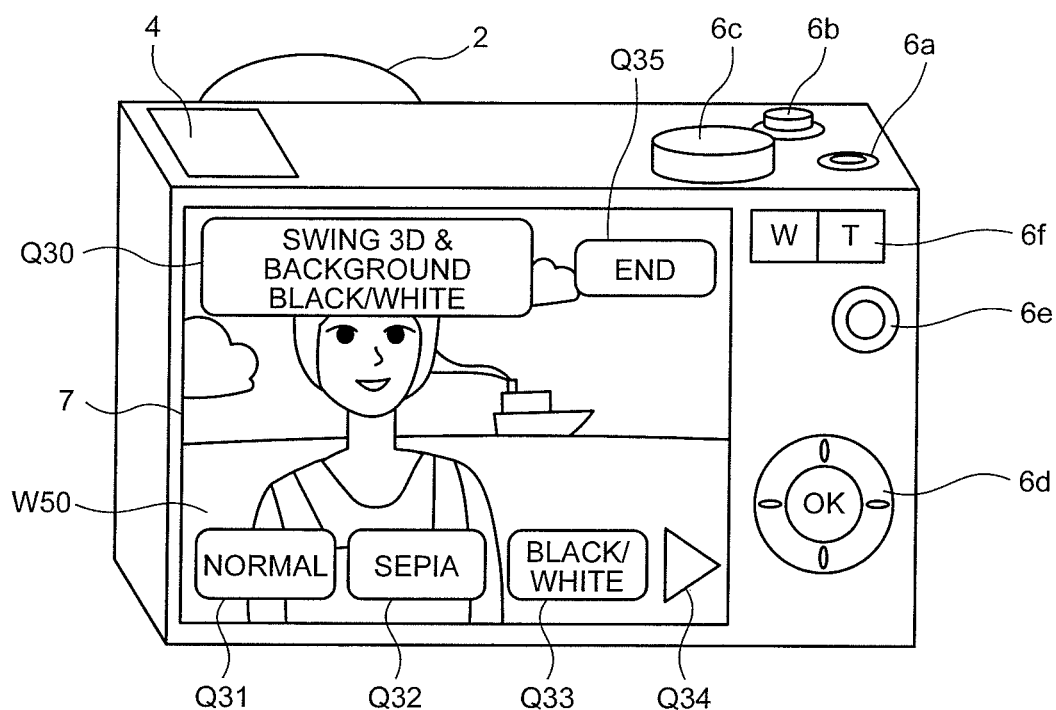
FIG. 27 is a view illustrating an example of an image displayed on a display unit included in an imaging apparatus according to the second embodiment of the present invention.

A case (step S507: Yes) will be described where, in step S507, the user operates the image selection icon. In this case, the display control unit 11e controls the display unit 7 to display the image selection icon and special effect icons on the image displayed on the display unit 7 referring to the special effect information table stored in the special effect information storing unit 9d (step S512). More specifically, as illustrated in FIG. 27, the display control unit 11e controls the display unit 7 to display an image selection icon Q30, and display a normal icon Q31, a sepia icon Q32 and a black/white icon Q33 referring to the special effect information table stored in the special effect information storing unit 9d. In addition, in FIG. 27, the image selection icon Q30 is added information of the current shooting mode of the imaging apparatus 1 set by the user and a special effect such as a black/white effect set in the background, and is displayed. By this means, the user can set a special effect applied to the subject image while checking the special effect set for the background image.

Hereinafter, a method of displaying special effect icons which the display control unit 11e controls the display unit 7 to display will be described with reference to FIG. 28. FIG. 28 is a view illustrating an example of a special effect information table stored by the special effect information storing unit 9d.

As illustrated in FIG. 28, in the special effect information table T3, special effects are written which are applicable to a subject image and background image, respectively. More specifically, in the special effect information table T3, numerical values (0 to 5) are written for advisabilities of combinations of special effects to generate a synthetic image by applying special effects to a subject image and background image, respectively. More specifically, when the special effect for the subject image is "normal", the advisability is "5" for "normal", "soft" and "black/white" of special effects for the background image. Further, the advisability is "4" for "sepia" and the advisability is "0" for "pop", "fish-eye", "sketch" and "miniature". The combination of special effects having the advisability of "0" cannot provide a distinct visual effect of a special effect for the captured image. Hence, with the second embodiment, the display control unit 11e controls the display unit 7 to display only icons of the special effects which can be used in combination, referring to the special effect information table T3 stored in the special effect information storing unit 9d. That is, the display control unit 11e controls (limits) the display unit 7 not to display special effect icons having the advisability of "0" for a combination of special effects. By this means, when special effects are set to the background image and subject image, respectively to generate a synthetic image, the user can reliably prevent an image from becoming unnatural.

Referring back to FIG. 23, in step S513, the control unit 11 decides whether or not the user operates the special effect icon. When the user operates a special effect icon (step S513: Yes), the control unit 11 sets a special effect of a subject image corresponding to the special effect icon operated by the user, and stores this set setting content in the temporary image data storing unit 9c (step S514), and the imaging apparatus 1 returns to step S505.

By contrast with this, when the user does not operate the special effect icon (step S513: No), the control unit 11 decides whether or not the user performs an operation to switch a special effect icon (step S515), and, more specifically, as illustrated in FIG. 27, the control unit 11 decides whether or not the user touches the switch icon Q34 which receives an input of a command signal for commanding to switch to a special effect icon of the second highest advisability from a special effect icon currently displayed on the display unit 7. When the user does not perform an operation to switch the special effect icon within a predetermined time (step S515: No), the imaging apparatus 1 returns to step S505. By contrast with this, when the user performs an operation to switch the special effect icon (step S515: Yes), the display control unit 11e controls the display unit 7 to switch the special effect icon of the second highest advisability such as the special effect icon of "pop" to display, referring to the special effect information table T3 stored in the special effect information storing unit 9d (step S516), and the imaging apparatus 1 returns to step S513.

Figure 29:
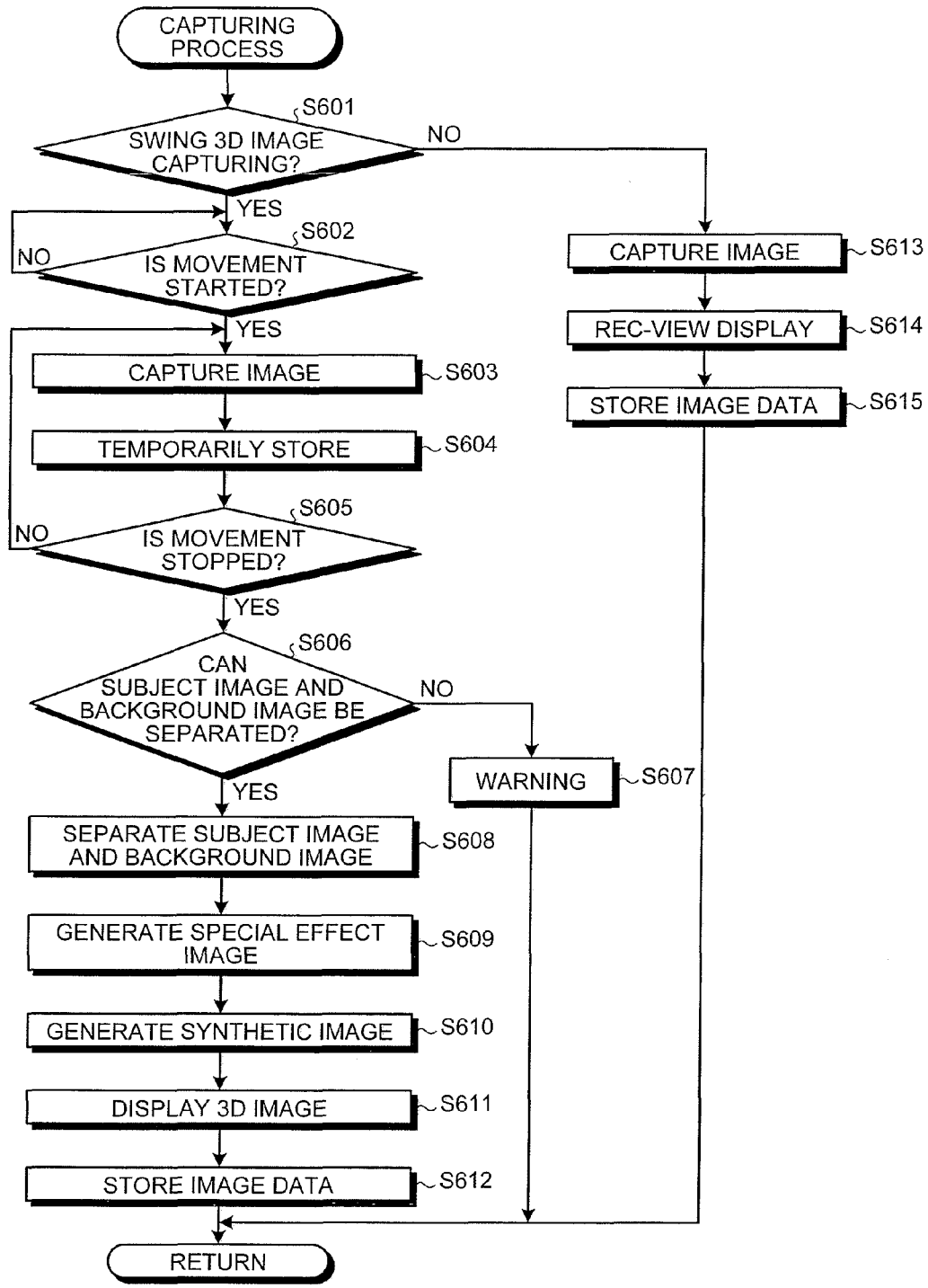
FIG. 29 is a flowchart illustrating an outline of capturing process performed by an imaging apparatus according to the second embodiment of the present invention.

Next, capturing process performed by the imaging apparatus 1 according to the second embodiment will be described. FIG. 29 is a flowchart illustrating an outline of capturing process. In addition, a case will be described below where the shooting mode of the imaging apparatus 1 is set to swing 3D shooting.

As illustrated in FIG. 29, the control unit 11 first decides whether or not the shooting mode of the imaging apparatus 1 is set to swing 3D shooting (step S601). When the shooting mode of the imaging apparatus 1 is set to swing 3D shooting (step S601: Yes), the control unit 11 decides whether or not the user starts moving the imaging apparatus 1 (step S602). When the imaging apparatus 1 does not start moving (step S602: No), the control unit 11 repeats this decision. By contrast with this, when the user starts moving the imaging apparatus 1 (step S602: Yes), the imaging apparatus 1 goes to step S603.

Subsequently, the imaging apparatus 1 continuously captures images at very short time intervals (step S603), and the control unit 11 controls the temporary image data storing unit 9c to temporarily store the captured images (step S604).

Then, the control unit 11 decides whether or not the imaging apparatus 1 stops moving (step S605). When the imaging apparatus 1 does not stop moving (step S605: No), the imaging apparatus 1 returns to step S603. By contrast with this, when the imaging apparatus 1 stops moving (step S605: Yes), the imaging apparatus 1 goes to step S606.

Subsequently, the control unit 11 decides whether or not the image separating unit 11b can separate a subject image and background image from a plurality of captured images (step S606). When the image separating unit 11b cannot separate the subject image and background image from a plurality of captured images (step S606: No), the display control unit 11e controls the display unit 7 to display a warning that the subject image and background image cannot be separated from the captured images (step S607), and the imaging apparatus 1 returns to the main routine illustrated in FIG. 11.

A case (step S606: Yes) will be described where, in step S606, the image separating unit 11b can separate a subject image and background image from the captured images. In this case, the image separating unit 11b separates the subject image and background image from the captured images (step S608), and the special effect image generating unit 11c generates a special effect image by applying set special effects to the subject image and background image stored in the temporary image data storing unit 9c (step S609).

Figure 30:
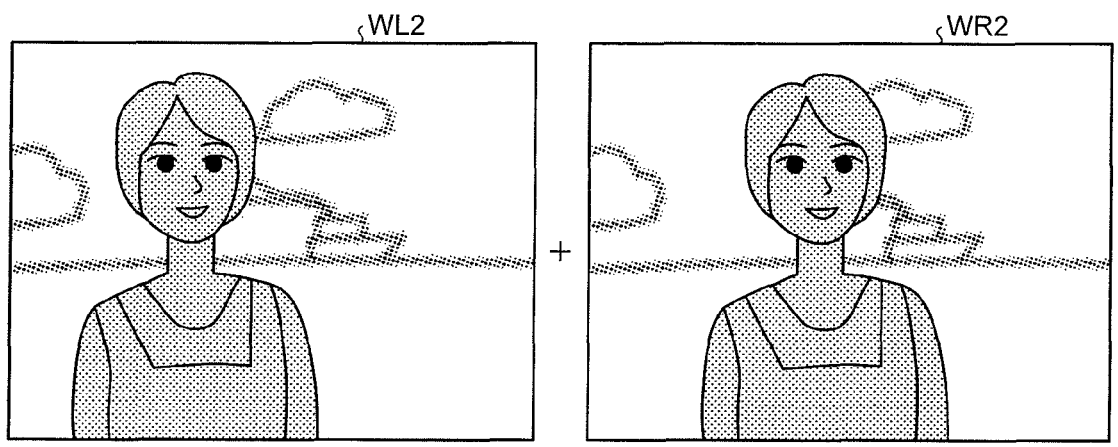
FIG. 30 is a view illustrating an example of a synthetic image generated by a synthetic image generating unit included in an imaging apparatus according to the second embodiment of the present invention.

Subsequently, the synthetic image generating unit 11d generates a synthetic image by synthesizing special effect images of the respective subject image and background image generated by the special effect image generating unit 11c (step S610), and the display control unit 11e controls the display unit 7 to display a 3D special effect image using the synthetic image generated by the synthetic image generating unit 11d (step S611). More specifically, as illustrated in FIG. 30, the display control unit 11e controls the display unit 7 to display a 3D image using two items of image data of a synthetic image WL2 and synthetic image WR2. By this means, the user can virtually see the 3D image obtained by applying special effects to the subject image and background image.

Then, the control unit 11 controls the image data storing unit 9a to store the image currently displayed on the display unit 7 (step S612), and the imaging apparatus 1 returns to the main routine illustrated in FIG. 11.

A case (step S601: No) will be described where, in step S601, the shooting mode of the imaging apparatus 1 is not set to swing 3D shooting. In this case, the imaging apparatus 1 captures the subject (step S613), and the display control unit 11e controls the display unit 7 to REC-view display the captured image (step S614).

Then, the control unit 11 controls the image data storing unit 9a to store the captured image (step S615), and the imaging apparatus 1 returns to the main routine illustrated in FIG. 11.

According to the above described second embodiment, the special effect information storing unit 9d stores the second special effect information table T2 which assigns the advisability corresponding to a combination of the shooting mode which can be set in the imaging apparatus 1 and special effect applied to the subject image or background image, and, when the shooting mode is set according to an input from the touch panel 8, the display control unit 11e controls the display unit 7 to display information related to a special effect in order from the highest advisability corresponding to the combination with the set shooting mode, referring to the second special effect information table T2. By this means, when the user performs capturing using the shooting mode and special effect in combination, it is possible to present, to the user, information which serves a guide to select the combination of the shooting mode and special effect.

Further, according to the second embodiment, the display control unit 11e controls the display unit 7 to display only special effect icons corresponding to special effects which can be used in combination with shooting modes. By this means, when capturing an image using a shooting mode and special effect in combination, the user can reliably prevent images to capture from becoming unnatural.

In addition, although, with the above second embodiment, the user moves the imaging apparatus 1 to generate two items of image data in which one ends of respective field of views in the left and right directions overlap, for example, it is possible to generate two items of image data in which one ends of respective field of views in the left and right directions overlap by forming an imaging unit with two optical systems.

First Modification of First and Second Embodiments

Further, with the first and second embodiments, the display control unit 11e may control the display unit 7 to emphasize and display a special effect icon in order from the highest advisability of a combination with a special effect according to a display mode of a changed color and/or size, referring to the special effect information table stored in the special effect information storing unit 9d. By this means, the user can intuitively select an optimal combination of special effects based information which serves as a guide to select a combination of special effects.

Second Modification of First and Second Embodiments

Further, although, with the first and second embodiments, the synthetic image generating unit 11d synthesizes special effect images obtained by respectively applying special effects to a subject image and background image separated by the image separating unit 11b, for example, the synthetic image generating unit 11d may generate a synthetic image by generating two special effect images by applying special effects to, for example, an image (for example, compressed data, uncompressed data, or compressed data or uncompressed data classified per aspect ratio) stored in the image data storing unit 9a and an image immediately after an image is captured by multiple exposures and synthesizing these two generated special effect images.

Third Modification of First and Second Embodiments

Further, although, with the first and second embodiments, the posture detecting unit 3 detects the posture state of the imaging apparatus 1, the posture detecting unit 3 may receive an operation signal of a touch operation of switching various shooting modes or various settings of the imaging apparatus 1 by detecting an acceleration produced when the user taps the display screen of the display unit 7, and output this operation signal to the control unit 11.

Fourth Modification of First and Second Embodiments

Further, with the first and second embodiments, it is possible to update or rewrite the special effect information table stored in the special effect information storing unit 9d by the connecting communication unit 10 to an external processing device such as a personal computer or server. By this means, the display control unit 11e can display special effect icons according to the advisability which takes into account a combination of newly added special effects and shooting modes. Further, by storing advisabilities of combinations of newly added special effects and shooting modes in a storage medium such as a memory card which is attachable to the storing unit 9, the control unit 11 may acquire the advisability from the storage medium and store the advisability in the special effect information storing unit 9d to update or rewrite a special effect information table.

Third Embodiment

Next, a third embodiment will be described. An imaging apparatus according to the third embodiment differs from the above embodiments in configurations of the control unit and storing unit. Further, the imaging apparatus according to the third embodiment differs from the above embodiments in the operation of the imaging apparatus. Hence, hereinafter, the configurations of the storing unit and control unit of the imaging apparatus according to the third embodiment will be described, and then the operation of the imaging apparatus according to the third embodiment will be described. In addition, the same components will be assigned the same reference numerals in the drawings.

Figure 31:
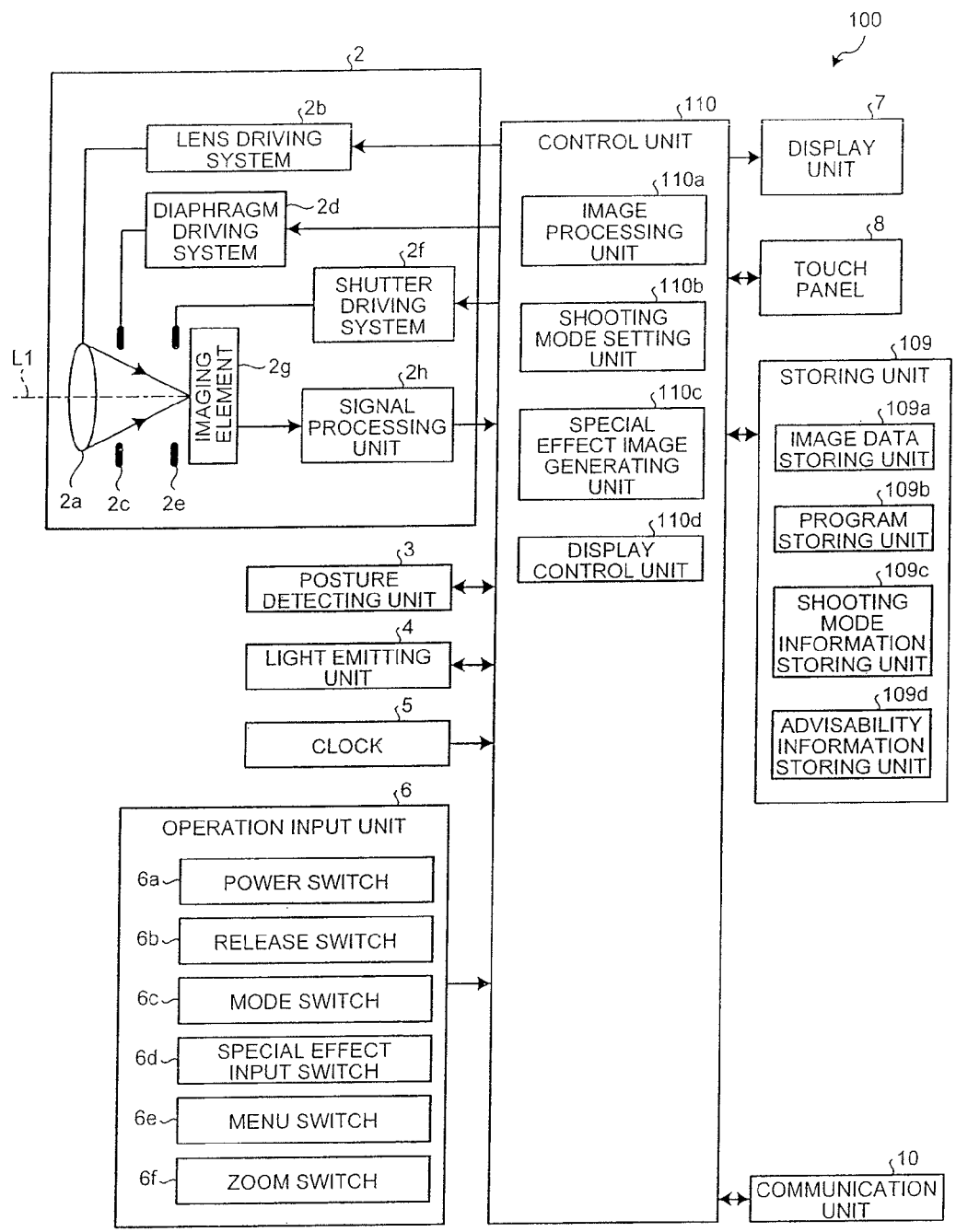
FIG. 31 is a block diagram illustrating a configuration of an imaging apparatus according to a third embodiment of the present invention.

FIG. 31 is a block diagram illustrating a configuration of the imaging apparatus according to the third embodiment. As illustrated in FIG. 31, an imaging apparatus 100 has the imaging unit 2, the posture detecting unit 3, the light emitting unit 4, the clock 5, the operation input unit 6, the display unit 7, the touch panel 8, the communication unit 10, a storing unit 109 and a control unit 110.

The storing unit 109 is provided inside the imaging apparatus 1 in a fixed manner, and is formed using, for example, a semiconductor memory such as a flash memory or RAM. The storing unit 109 has: an image data storing unit 109a which stores image data continuously captured by the imaging unit 2; a program storing unit 109b which stores various programs executed by the imaging apparatus 1 and capturing programs according to one embodiment; a shooting mode information storing unit 109c which stores information related to shooting modes for which frame rates of capturing suitable for each capturing scene are set; and an advisability information storing unit 109d which stores an advisability information table which assigns an advisability corresponding to a combination of special effects and a frame rate of the shooting mode when a special effect is applied to an image. In addition, the storing unit 109 may have a function of a storage medium interface which reads information stored in the storage medium while storing the information in a storage medium such as a memory card attached from an outside.

The control unit 110 is formed with, for example, a CPU. The control unit 110 reads a program from the program storing unit 109b of the storing unit 109 according to, for example, an operation signal from the operation input unit 6 to execute, and performs overall control of the operation of the imaging apparatus 100 by, for example, commanding each unit forming the imaging apparatus 100 or transferring data. The control unit 110 has an image processing unit 110a, a shooting mode setting unit 110b, a special effect image generating unit 110c and a display control unit 110d.

The image processing unit 110a applies various image processings to image data outputted from the signal processing unit 2h to output to the storing unit 109. More specifically, the image processing unit 110a applies processings such as edge enhancement, color correction and γ correction to image data outputted from the signal processing unit 2h.

The shooting mode setting unit 110b sets one of a plurality of shooting modes for which a frame rate of capturing suitable for each capturing scene is set in advance. More specifically, the shooting mode setting unit 110b sets the shooting mode of the imaging apparatus 100 from a plurality of shooting modes stored in the shooting mode information storing unit 109c based on an operation signal inputted from, for example, the mode switch 6c or the menu switch 6e.

The special effect image generating unit 110c generates a special effect image by applying special effect corresponding to information received by the touch panel 8 as input, to an image corresponding to image data generated by the imaging unit 2. More specifically, the special effect image generating unit 110c generates a special effect image by applying to image data continuously generated by the imaging unit 2 a special effect obtained by using various optical filters such as a color conversion filter or contrast adjustment filter in the front surface of the lens unit 2a of the imaging unit 2, or the same effect as a special obtained by using a shooting lens for a specific use such as a fish-eye lens or a tilt-shift mechanism attached shooting lens. For example, the special effect image generating unit 110c applies, to image data, processing including one of a plurality of image processings, tone curve process, blurring process, shading adding process, image synthesizing process, noise superimposing process, and saturation adjusting process. In addition, the special effect image generating unit 110c may generate a special effect image by applying two or more special effects of different effects to image data generated by the imaging unit 2. Further, the special effect image generating unit 110c may generate a special effect image by applying a special effect corresponding to an operation signal inputted from the special effect input switch 6d, to an image corresponding to image data generated by the imaging unit 2.

The display control unit 110d controls the display unit 7 to perform display. The display control unit 110d controls the display unit 7 to display in time sequences the images sequentially generated at a frame rate of the shooting mode set by the shooting mode setting unit 110b, and controls the display unit 7 to display information related to a special effect which the special effect image generating unit 110c needs to apply to the images, in order from the highest advisability corresponding to a combination with the frame rate of the shooting mode, referring to the advisability information table stored in the advisability information storing unit 109d. Further, the display control unit 110d controls the display unit 7 to display information related to special effects by means of icons. More specifically, the display control unit 110d controls the display unit 7 to display special effect icons corresponding to special effects in order from the highest advisability corresponding to the combination with the frame rate of the shooting mode, referring to the advisability information table.

Figure 32:
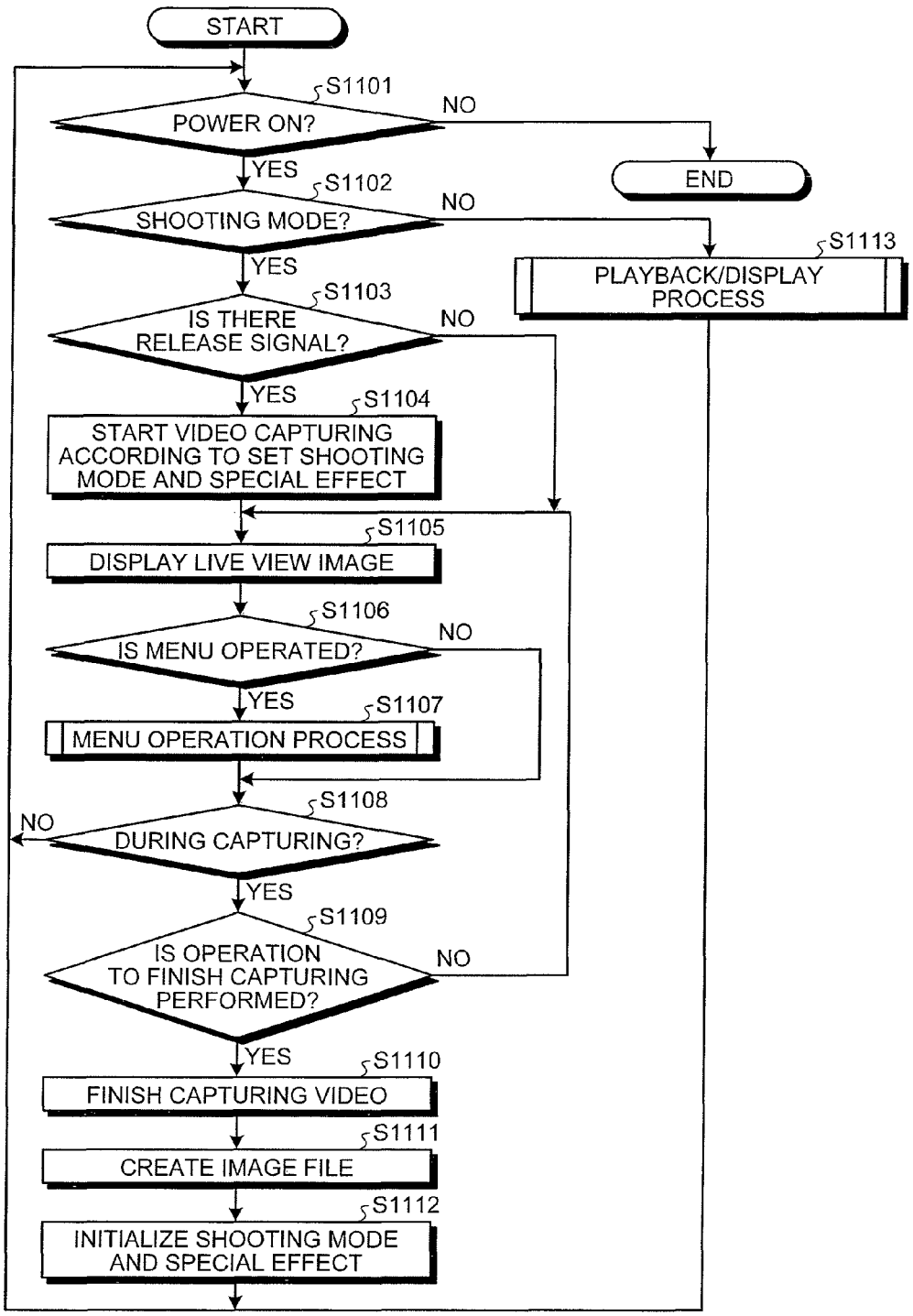
FIG. 32 is a flowchart illustrating an outline of processing performed by an imaging apparatus according to the third embodiment of the present invention.

Processing performed by the imaging apparatus 100 employing the above configuration will be described. FIG. 32 is a flowchart illustrating an outline of processing performed by the imaging apparatus 100. In addition, video capturing will be described below as an example.

In FIG. 32, the control unit 110 first decides whether or not the power source of the imaging apparatus 100 is turned on (step S1101). When the power source of the imaging apparatus 100 is not turned on (step S1101: No), the imaging apparatus 100 finishes the processing. By contrast with this, when the power source of the imaging apparatus 100 is turned on (step S1101: Yes), the imaging apparatus 100 goes to step S1102.

Subsequently, the control unit 110 decides whether or not the imaging apparatus 100 is set to a shooting mode (step S1102). When the imaging apparatus 100 is set to the shooting mode (step S1102: Yes), the control unit 110 decides whether or not a release signal for commanding video capturing is inputted from the release switch 6b (step S1103). When receiving the release signal for commanding video capturing as input (step S1103: Yes), the imaging apparatus 100 starts video capturing according to the set shooting mode and special effect (step S1104). This video capturing is directed to storing, in the image data storing unit 109a, special effect image data obtained by applying a special effect from the special effect image generating unit 110c to image data continuously generated by the imaging unit 2 at a frame rate of the set shooting mode in menu operation process (described below) or image data continuously generated by the imaging unit 2. By contrast with this, when receiving no release signal for commanding video capturing as input (step S1103: No), the imaging apparatus 100 goes to step S1105.

Then, the display control unit 110d controls the display unit 7 to display live view images of an image corresponding to image data continuously generated by the imaging unit 2 (step S1105).

Figure 33:
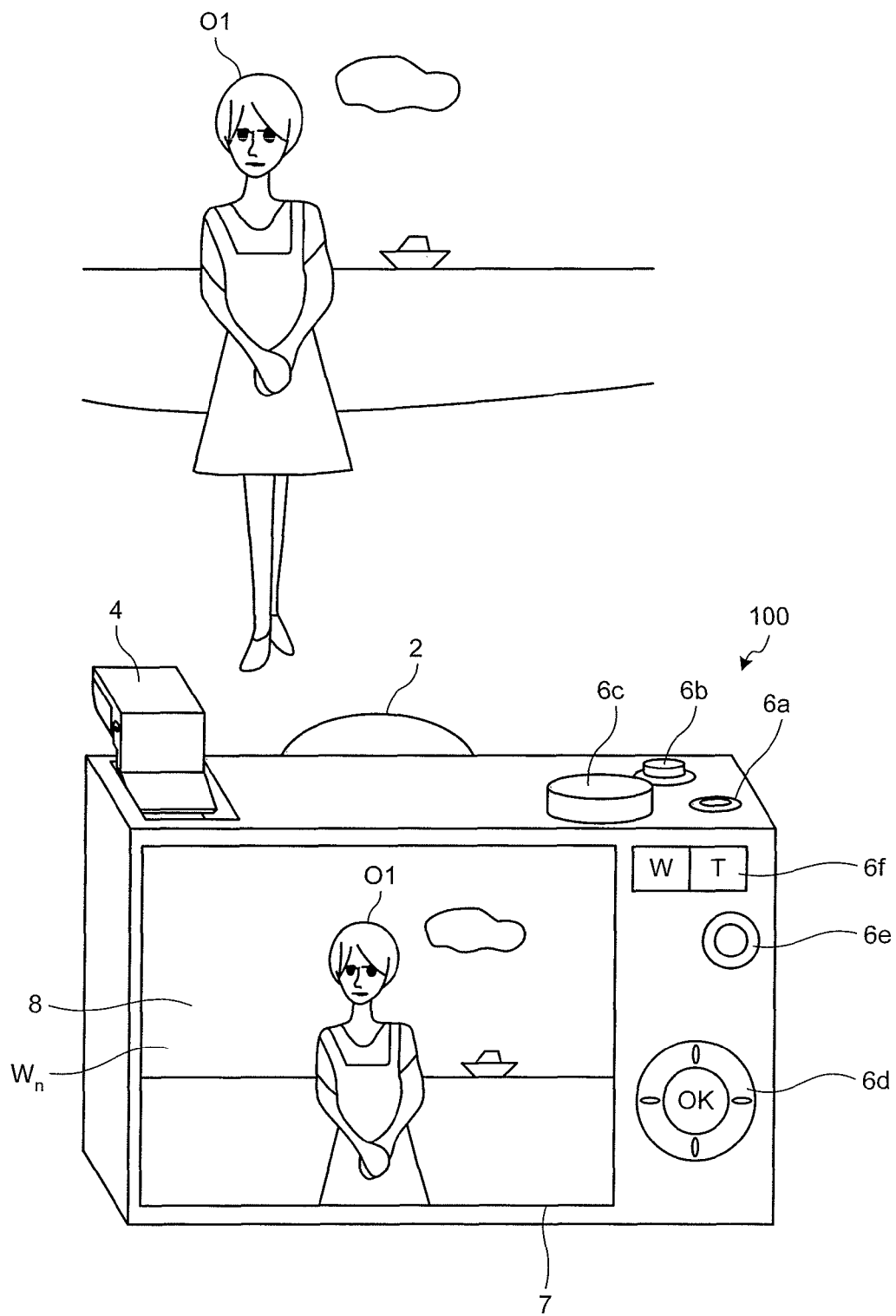
FIG. 33 is a view illustrating an example of a situation when an imaging apparatus captures a subject according to a shooting mode, and an image displayed on a display unit.

FIG. 33 is a view illustrating an example of a situation when the imaging apparatus 100 captures an image of a subject, and an image displayed on the display unit 7. FIG. 33 illustrates one typical image $W_n$ (n=natural number) of live view images sequentially displayed on the display unit 7 in time sequences. As illustrated in FIG. 33, the camera man captures a subject O1 while checking a live view image such as the image $W_n$ displayed on the display unit 7.

In step S1106, when the menu switch 6e is operated, the control unit 110 decides whether or not a command signal for commanding to display an operation menu is inputted from the menu switch 6e. When receiving a command signal for commanding to display an operation menu as input from the menu switch 6e (step S1106: Yes), the imaging apparatus 100 executes menu operation process for setting the shooting mode and special effect of the imaging apparatus 100 (step S1107), and goes to step S1108. By contrast with this, when receiving no command signal for commanding to display an operation menu from the menu switch 6e as input (step S1106: No), the imaging apparatus 100 goes to step S1108.

Subsequently, the control unit 110 decides whether or not the imaging apparatus 100 is capturing an image (step S1108). When the imaging apparatus 100 is not capturing an image (step S1108: No), the imaging apparatus 100 returns to step S1101. By contrast with this, when the imaging apparatus 100 is capturing an image (step S1108: Yes), the control unit 110 decides whether or not an operation to finish capturing is performed (step S1109). More specifically, when the release switch 6b is operated, the control unit 110 decides whether or not a command signal for commanding to finish capturing is inputted from the release signal 6b. When an operation to finish capturing is not performed (step S1109: No), the imaging apparatus 100 returns to step S1105. By contrast with this, when an operation to finish capturing is performed (step S1109: Yes), the imaging apparatus 100 goes to step S1110.

Then, the control unit 110 finishes video capturing of the imaging apparatus 100 (step S1110), and creates an image file of captured image data (step S1111). This image file stores, for example, the captured image data, captured shooting mode information, frame rate information of the captured video, special effect presence/absence information, special effect information, special effect count information and date information.

Subsequently, the control unit 110 initializes the set shooting mode and special effect (step S1112), and the imaging apparatus 100 returns to step S1101. More specifically, the control unit 110 sets various settings of the imaging apparatus 100 set in menu operation process, to the initial state set upon shipping from a manufacturer.

A case (step S1102: No) will be described where, in step S1102, the shooting mode is not set in the imaging apparatus 100. In this case, the imaging apparatus 100 executes playback/display process of playing the captured image data (step S1113), and returns to step S1101.

Figure 34:
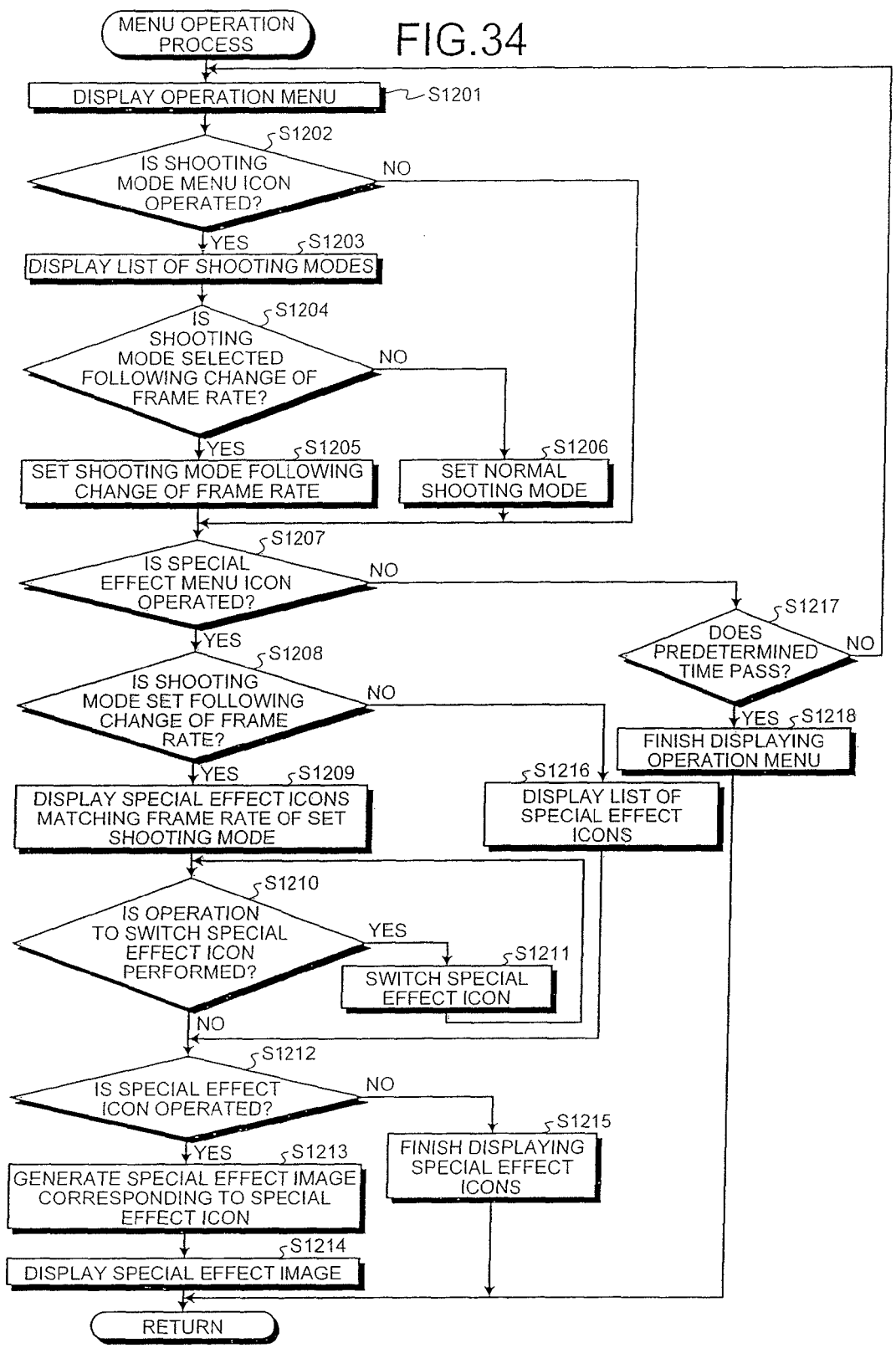
FIG. 34 is a flowchart illustrating an outline of menu operation process illustrated in FIG. 33.

Next, the menu operation process illustrated in FIG. 32 will be described. FIG. 34 is a flowchart illustrating an outline of menu operation process in step S1107 illustrated in FIG. 32.

Figure 35:
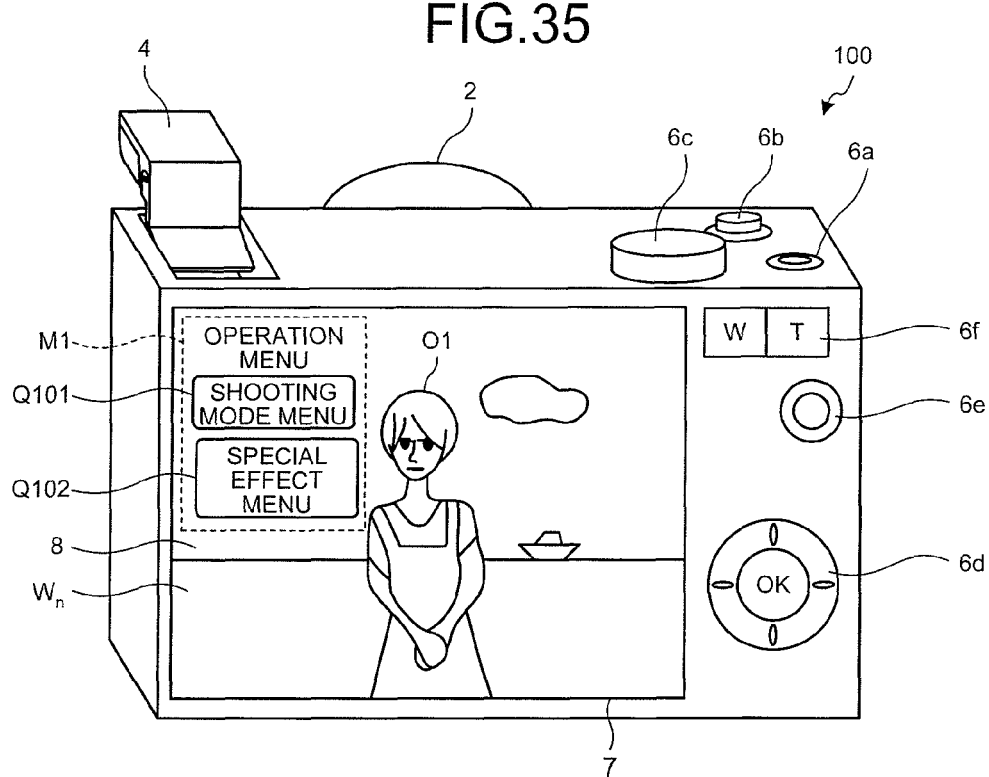
FIG. 35 is a view illustrating an example of an operation menu displayed on a display unit of an imaging apparatus.

As illustrated in FIG. 34, the display control unit 110d first controls the display unit 7 to display an imaging menu (step S1201). More specifically, as illustrated in FIG. 35, the display control unit 110d controls the display unit 7 to display a shooting mode menu icon Q101 and a special effect menu icon Q102 as an operation menu M1. The shooting mode menu icon Q101 receives an input of a command signal for controlling the display unit 7 to display information related to a plurality of shooting modes for which a frame rate of capturing suitable for each capturing scene is set in advance. The special effect menu icon Q102 receives an input of a command signal for controlling the display unit 7 to display information related to a plurality of special effects which are applicable to image data generated by the imaging unit 2. In addition, the display control unit 110d may control the display unit 7 to display an icon corresponding to information related to, for example, a strobe light menu or exposure setting menu as part of the operation menu M1.

After the display control unit 110d controls the display unit 7 to display the operation menu M1, the control unit 110 decides whether or not the shooting mode menu icon Q101 is operated (step S1202). More specifically, as illustrated in FIG. 35, when the user touches the shooting mode menu icon Q101 displayed on the image $W_n$ on the display unit 7, the control unit 110 decides whether or not the shooting mode menu Q101 is operated according to the signal received by the touch panel 8 as input. When the shooting mode menu icon Q101 is not operated (step S1202: No), the imaging apparatus 100 goes to step S1207 (described below). By contrast with this, when the shooting mode menu icon Q101 is operated (step S1202: Yes), the display control unit 110d controls the display unit 7 to display a list of shooting modes (step S1203), and the imaging apparatus 100 goes to step S1204.

In step S1204, the control unit 110 decides whether or not a shooting mode is selected following the change of the frame rate. More specifically, when the user operates the special effect input switch 6d, the control unit 110 decides whether or not the shooting mode is selected from the list of shooting modes displayed on the display unit 7 following the change of the frame rate. When the shooting mode is selected following the change of the frame rate (step S1204: Yes), the shooting mode setting unit 110b sets the shooting mode selected following the change of the selected frame rate, in the imaging apparatus 100 (step S1205), and the imaging apparatus 100 goes to step S1207. By contrast with this, when the shooting mode is not selected following the change of the frame rate after a predetermined time, for example, 30 seconds passes (step S1204: No), the shooting mode setting unit 110b sets a normal shooting mode in the imaging apparatus 100 (step S1206), and the imaging apparatus 100 goes to step S1207. Meanwhile, the normal shooting mode refers to a shooting mode of capturing an image at a frame rate of 30 fps.

Figure 36:
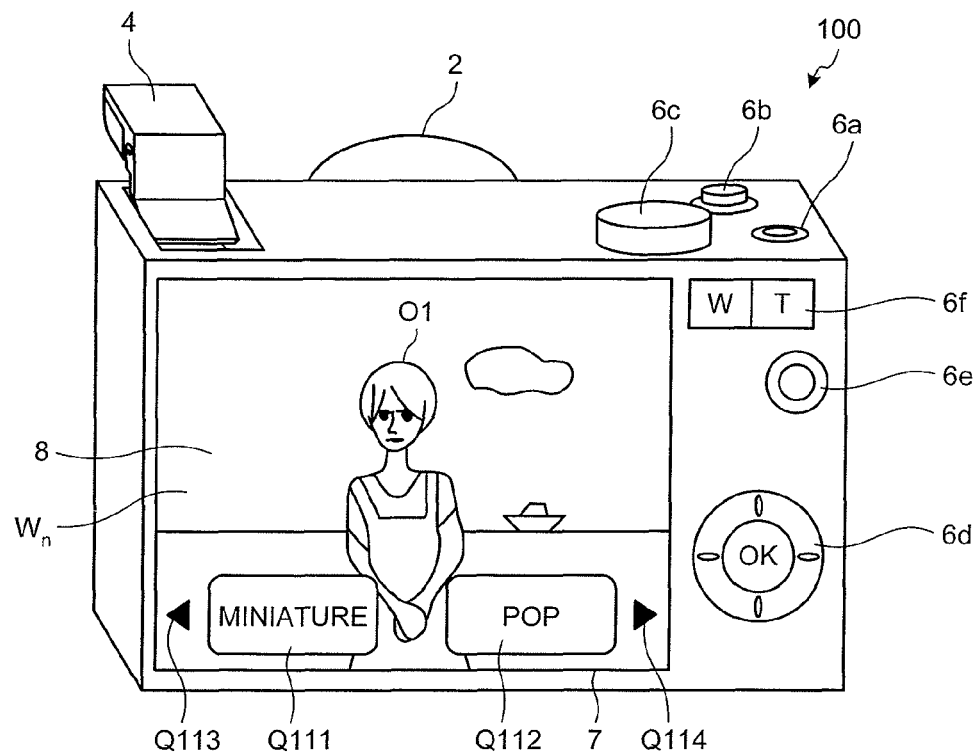
FIG. 36 is a view illustrating an example of an image displayed on a display unit of an imaging apparatus.

Subsequently, the control unit 110 decides whether or not the special effect menu icon Q102 is operated (step S1207). When the special effect menu icon Q102 is operated (step S1207: Yes), the control unit 110 decides whether or not the shooting mode selected following the change of the frame rate is set in the imaging apparatus 100 (step S1208). When the shooting mode selected following the change of the frame rate is set in the imaging apparatus 100 (step S1208: Yes), the display control unit 110d controls the display unit 7 to display information related to a special effect which the special effect image generating unit 110c needs to apply to an image displayed on the display unit 7, in order from the highest advisability corresponding to a combination with the frame rate of the shooting mode set by the shooting mode setting unit 110b, referring to the advisability table stored in the advisability information storing unit 109d (step S1209). More specifically, as illustrated in FIG. 36, the display control unit 110d controls the display unit 7 to display a miniature icon Q111 and a pop icon Q112.

Hereinafter, a method of displaying special effect icons which the display control unit 110d controls the display unit 7 to display will be described with reference to FIG. 37. FIG. 37 is a view illustrating an example of an advisability information table stored by the advisability information storing unit 109d.

As illustrated in FIG. 37, in the advisability table T11, (0 to 2) are written for advisabilities which correspond to combinations of special effects which the special effect image generating unit 110c can apply to image data and frame rates of shooting modes. More specifically, when the shooting mode is "fast forward 2 (4 fps) shooting mode", the advisability is "2" for a combination with a special effect of "miniature", "pop", "sepia" or "black/white". Further, the advisability is "1" for a combination with "fish-eye", "soft" or "sketch". That is, in the advisability information table T11, a higher numerical value is set for a better combination of a frame rate of a shooting mode and a special effect.

Hereinafter, each special effect and the advisability for a combination of a frame rate of a shooting mode and a special effect illustrated in FIG. 37 will be described.

First, each special effect illustrated in FIG. 37 will be described.

Miniature provides an effect of adjusting focus on the center of the screen and decreasing and blurring processing the contrast in the surrounding such as upper and lower parts. More specifically, with miniature, shading adding process and image synthesizing process are performed.

Pop provides an effect of emphasizing a color impressively and colorfully. For example, processing of improving the hue and saturation of image data is performed.

Fish-eye provides an effect of finishing an image by distorting a line in an arc shape as if the line is captured using a fish-eye lens. For example, processing of changing image data to an image distorted by, for example, coordinate conversion is performed.

Soft provides an effect of finishing the entire image softly as if the image was captured using a soft focus lens.

Sepia provides an effect of finishing a sepia and monochrome image. For example, processing of decreasing levels of the white balance and tone curve is performed.

Black/white provides an effect of finishing a black and white image represented by a gray tone. For example, processing of decreasing the level of the white balance is performed.

Sketch provides an effect of finishing a sketchy image in which the profile is drawn by line drawing.

Next, the advisability of a combination of a frame rate of a shooting mode and a special effect will be described. Miniature provides an effect when an actual scenery needs to be finished like a toy world, and the advisability is "2" for the fast-forward 2 shooting mode (4 fps) and fast-forward 3 shooting mode (8 fps). Furthermore, miniature makes a video unnatural upon playback when a frame rate is too high, and therefore the advisability is "1" for a fast-forward 1 shooting mode (2 fps). Furthermore, miniature is a special effect suitable for capturing a still image, and therefore the advisability is "1" for the normal shooting mode "30 fps". Further, miniature takes time to perform processing applied to an image, and therefore the advisability is "0" for a 3D shooting mode (60 fps), a slow motion 1 shooting mode (120 fps) and a slow motion 2 shooting mode (240 fps).

Pop provides an effect when an image is emphasized colorfully and impressively and finished smoothly, and therefore the advisability is "2" for the fast-forward 2 shooting mode, fast-forward 3 shooting mode, normal shooting mode and 3D shooting mode. Further, pop has difficulty in emphasizing an effect at a slow rate, and therefore the advisability is "1" for the slow motion 1 shooting mode and slow motion 2 shooting mode. Furthermore, pop makes a video unnatural upon playback when the tempo is too fast, and therefore the advisability is "1" for the fast-forward 1 shooting mode.

Fish-eye makes it possible to express that a scenery gradually changes when the scenery is captured while walking, and therefore the advisability is "2" for the fast-forward 1 shooting mode. In addition, fish-eye is a special effect suitable for capturing a still image, and therefore the advisability is "1" for the fast-forward 2 shooting mode, fast-forward 3 shooting mode and normal shooting mode. Furthermore, fish-eye takes time to perform processing applied to an image, and therefore the advisability is "0" for the 3D shooting mode, slow motion 1 shooting mode and slow motion 2 shooting mode.

Soft makes it possible to express that an entire image is finished softly and a flashback is more emphasized, and therefore the advisability is "2" for the slow motion 1 shooting mode, slow motion 2 shooting mode and normal shooting mode. Further, soft has difficulty in expressing flashbacks, and therefore the advisability is "1" for the fast-forward 1 shooting mode, fast-forward 2 shooting mode and fast-forward 3 shooting mode. Furthermore, soft has difficulty in making the user recognize a three-dimensional image because the information amount which the left and right eyes can recognize is a little, and therefore the advisability is "1" for the 3D shooting mode.

Sepia and black/white can provide an expression such as an old video, and therefore the advisability is "2" for the fast-forward 2 shooting mode and fast-forward 3 shooting mode. Further, sepia and black/white make it possible to emphasize and display emphasized flashbacks, and therefore the advisability is "2" for the normal shooting mode, slow motion 1 shooting mode and slow motion 2 shooting mode. Furthermore, sepia and black/white have difficulty in making the user recognize a three-dimensional image because the information amount which the left and right eyes can recognize is a little, and therefore the advisability is "1" for the 3D shooting mode. Furthermore, sepia and black/white make a video unnatural upon play, and therefore the advisability is "1" for the fast-forward 1 shooting mode.

Sketch makes it possible to provide an expression like an animation by drawing a profile of a subject by line drawing, and therefore the advisability is "2" for the fast-forward 3 shooting mode. Further, sketch is a special effect suitable to capture a still image, and therefore the advisability is "1" for the fast-forward 1 shooting mode, fast-forward 2 shooting mode, normal shooting mode, slow motion 1 shooting mode and slow motion 2 shooting mode. Furthermore, sketch has difficulty in making the user recognize a three-dimensional image because the information amount which the left and right eyes can recognize is a little, and therefore the advisability is "0" for the 3D shooting mode.

Thus, with the advisabilities in the advisability information table T11, a higher numerical value is set stepwise for a better combination of a frame rate of a shooting mode and a special effect. Further, the advisability in the advisability information table T11 is set to "0" for unsuitable combinations of frame rates of shooting modes and special effects. By this means, when the display control unit 110*d* controls the display unit 7 to display information related to special effects as special effect icons, the display control unit 110*d* controls the display unit 7 to display the information in order from the highest advisability of the combination with the frame rate of the shooting mode set by the shooting mode setting unit 110*b*, referring to the advisability information table T11 stored in the advisability information storing unit 109*d*.

Further, the display control unit 110*d* controls the display unit 7 to display only information related to a special effect which can be used in combination with the frame rate of the shooting mode set by the shooting mode setting unit 110*b*. For example, when the shooting mode setting unit 110*b* sets the slow motion 1 shooting mode, the display control unit 110*d* controls the display unit 7 to display only the special effect icons related to pop, soft, sepia, black/white and sketch. As a result, the imaging apparatus 100 can present, to the user, information which serves as a guide for an optimal combination of special effects for image data generated at the set frame rate of the shooting mode. In addition, the numerical values illustrated in FIG. 37 are only examples and are by no means limited to these, and a numerical value of the advisability can be changed by, for example, the special effect input switch 6*d*. Further, a lower advisability may be set stepwise for a better combination of a special effect and frame rate of the shooting mode.

Figure 38:
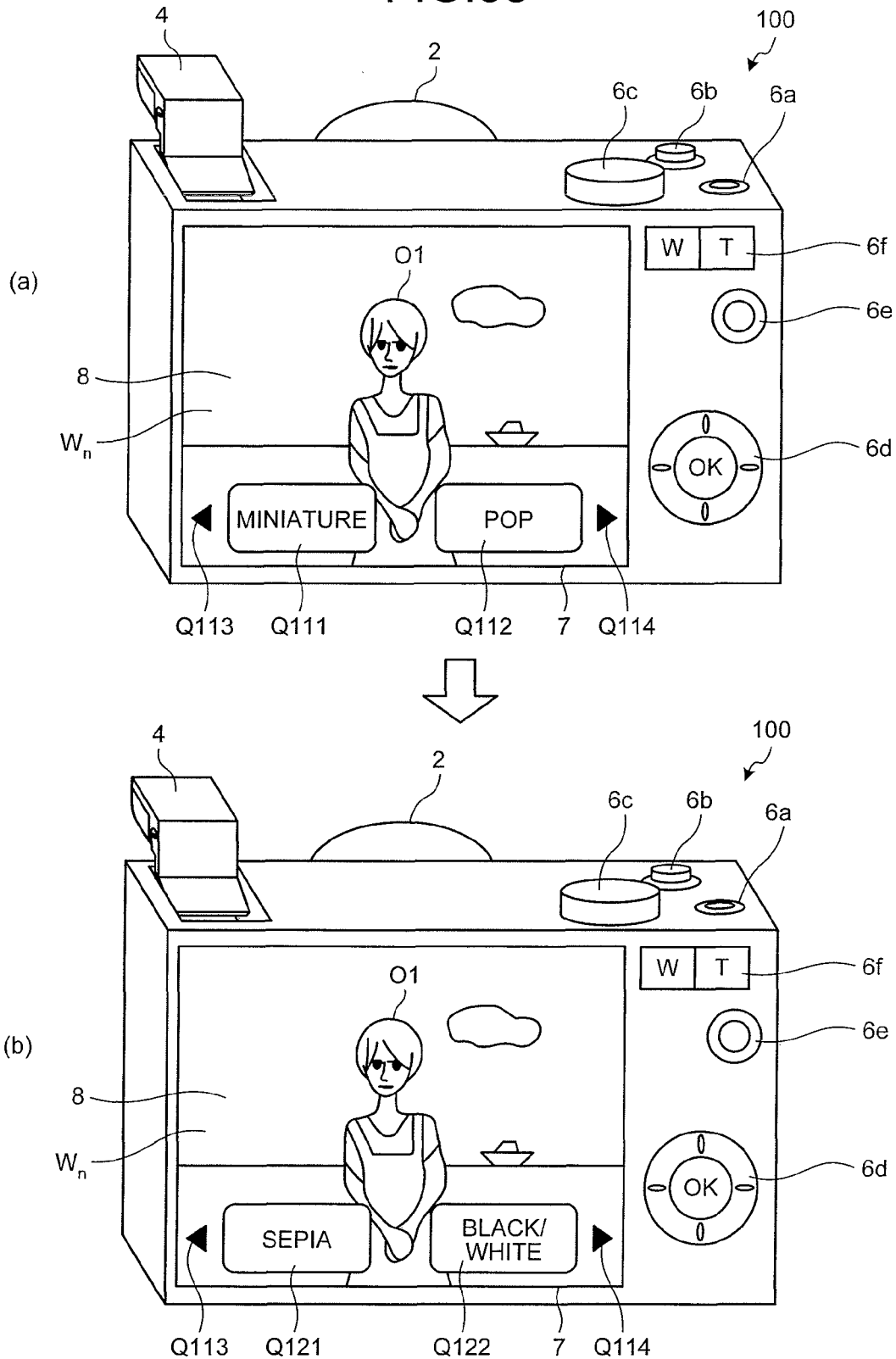
FIG. 38 is a view illustrating an example of an image displayed on a display unit of an imaging apparatus.

Referring back to FIG. 34, in step S1210, the control unit 110 decides whether or not an operation to switch a special effect icon is performed. More specifically, as illustrated in FIG. 36, the control unit 110 decides whether the user touches a switch icon Q113 or a switch icon Q114 which receives an input of a command signal for commanding to switch to a special effect icon of the second highest advisability from the special effect icon currently displayed on the display unit 7. When the user performs the operation to switch the special effect icon (step S1210: Yes), the display control unit 110*d* controls the display unit 7 to switch special effect icons related to the special effect icons of the second highest advisability to display, referring to the advisability information table T11 (step S1211). Then, the imaging apparatus 100 returns to step S1210. More specifically, as illustrated in FIG. 38, the display control unit 110*d* controls display unit 7 to display the miniature icon Q111 and pop icon Q112 to the sepia icon Q121 and black/white icon Q122 ((a)→(b) of FIG. 38). By this means, the user can select a special effect in order from the highest advisability by switching the special effect.

A case (step S1210: No) will be described where, in step S1210, the operation to switch the special effect icon is not performed. In this case, the control unit 110 decides whether or not the special effect icon is operated (step S1212). When the special effect icon is operated (step S1212: Yes), the special effect image generating unit 110*c* generates a special effect image by applying a special effect such as pop corresponding to the special effect icon which the user touches, to image data generated by the imaging unit 2 (step S1213).

Figure 39:
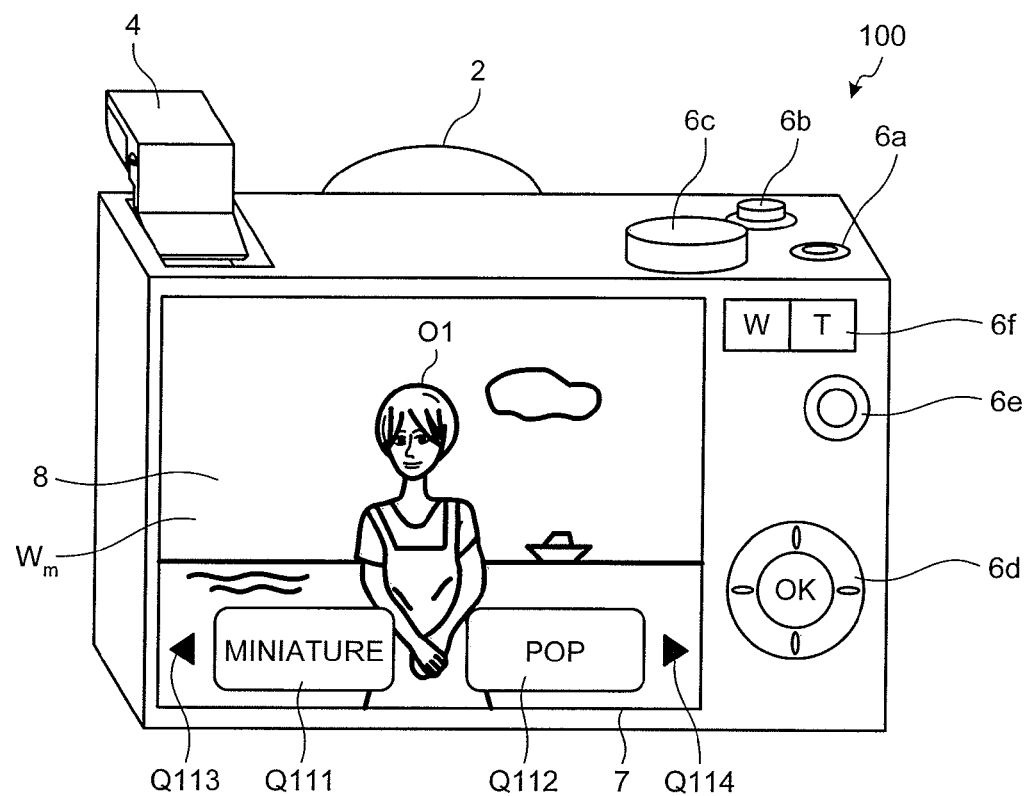
FIG. 39 is a view illustrating an example of an image displayed on a display unit of an imaging apparatus.

Subsequently, the display control unit 110*d* controls the display unit 7 to display a special effect image generated by the special effect image generating unit 110*c* (step S1214). More specifically, as illustrated in FIG. 39, the display control unit 110*d* controls the display unit 7 to display a special effect image $W_m$ (m=integer) by applying a special effect such as pop, to image data by the special effect image generating unit 110*c*. By this means, live view images displayed on the display unit 7 are applied special effects, so that the user can capture images in real time while checking a special effect and composition for capturing. In addition, although, in FIG. 39, an image is expressed by bold lines to show a special effect of pop, this image is only an example. After step S1214, the imaging apparatus 100 returns to the main routine illustrated in FIG. 32.

A case (step S1212: No) will be described where, in step S1212, a special effect icon is not operated within a predetermined time, for example, within 30 seconds. In this case, the display control unit 110*d* controls the display unit 7 to finish displaying the special effect icons displayed on the display unit 7 (step S1215), and the imaging apparatus 100 returns to the main routine illustrated in FIG. 32.

A case (step S1208: No) will be described where, in step S1208, a shooting mode selected following a change of a frame rate is not set in the imaging apparatus 100. In this case, the display control unit 110*d* controls the display unit 7 to display a list of special effect icons related to special effects (step S1216), and the imaging apparatus 100 goes to step S1212.

A case (step S1207: No) will be described where, in step S1207, a special effect menu icon is not operated. In this case, the control unit 110 decides whether or not a predetermined time, for example, 30 seconds passes after the display unit 7 displays the operation menu M1 (step S1217). When a predetermined time does not pass after the display unit 7 displays the operation menu M1 (step S1217: No), the imaging apparatus 100 returns to step S1201. By contrast with this, when a predetermined time passes after the display unit 7 displays the operation menu M1 (step S1217: Yes), the display control unit 110*d* controls the display unit 7 to finish displaying the operation menu M1 displayed on the display unit 7 (step S1218), and the imaging apparatus 100 returns to the main routine illustrated in FIG. 32.

Figure 40:
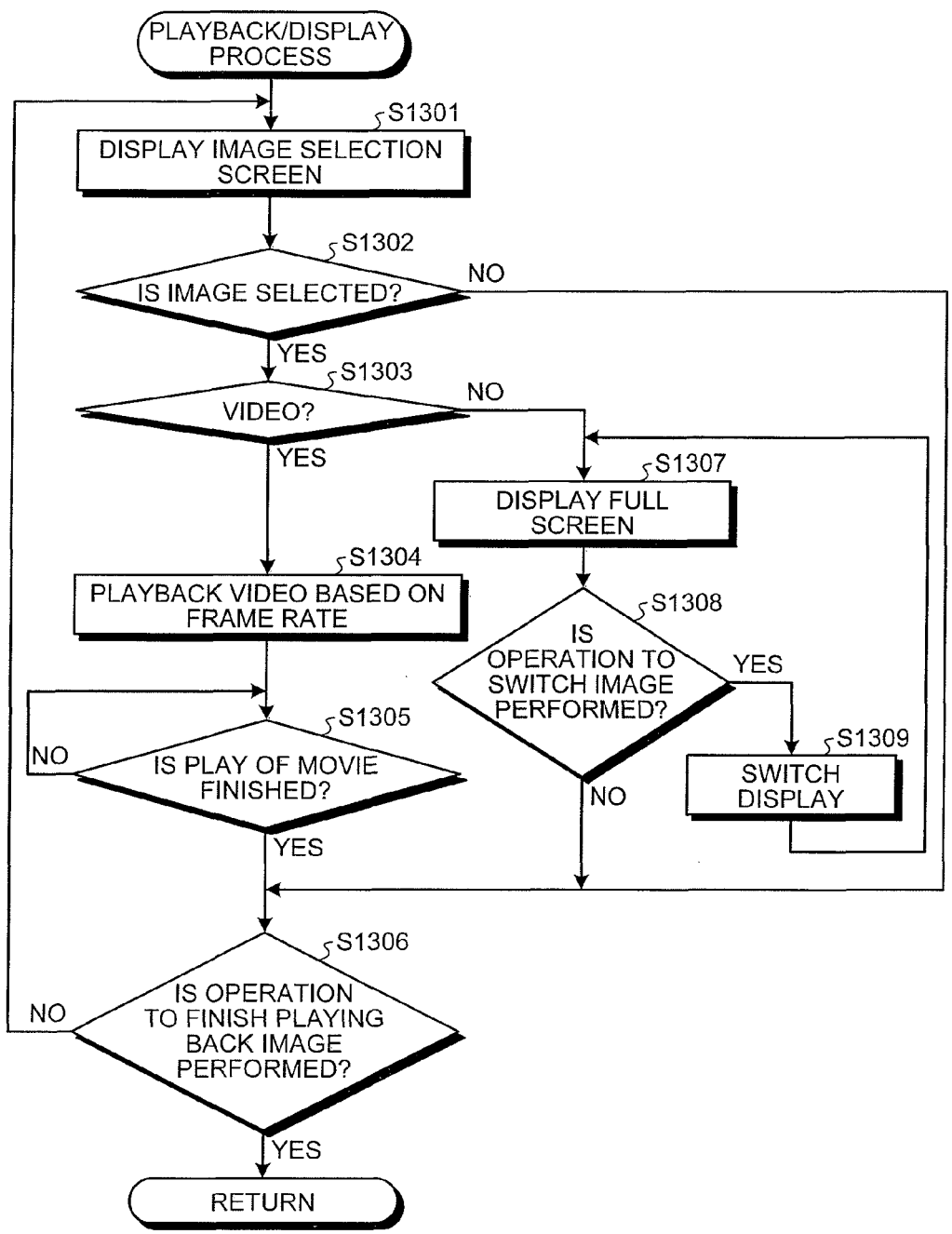
FIG. 40 is a flowchart illustrating an outline of playback/display process illustrated in FIG. 32.

Next, playback/display process in step S1113 illustrated in FIG. 32 will be described. FIG. 40 is a flowchart illustrating an outline of playback/display process illustrated in FIG. 32.

As illustrated in FIG. 40, the display control unit 110*d* first controls the display unit 7 to display an image selection screen collectively displaying a plurality of items of image data stored in the image data storing unit 109*a* (step S1301).

Subsequently, the control unit 110 decides whether or not the user touches the touch panel 8 to select an image from the image selection screen displayed on the display unit 7 (step S1302). When the user does not select an image from the image selection screen after a predetermined time, for example, 30 seconds passes (step S1302: No), the imaging apparatus 100 goes to step S1306 (described below). By contrast with this, when the user selects an image from the image selection screen (step S1302: Yes), the control unit 110 decides whether or not the selected image is a video (step S1303). More specifically, the control unit 110 decides whether or not the image is a video, based on video information, for example, a recording mode, stored in an image file of the selected image. When the selected image is a video (step S1303: Yes), the imaging apparatus 100 goes to step S1304 (described below). By contrast with this, when the selected image is not a video (step S1303: No), the imaging apparatus 100 goes to step S1307 (described below).

A case (step S1303: Yes) will be described where, in step S1303, the selected image is a video. In this case, the display control unit 110*d* plays a video based on the frame rate of the shooting mode stored in the image file of the video (step S1304), and the control unit 110 decides whether or not playback of the video is finished (step S1305). When playback of the video is not finished (step S1305: Yes), the control unit 110 repeats this decision. By contrast with this, when playback of the video is finished (step S1305: Yes), the imaging apparatus 100 goes to step S1306.

Subsequently, the control unit 110 decides whether or not an operation to finish playing the image is performed (step S1306). When the operation to finish playing the image is not performed (step S1306: No), the imaging apparatus 100 returns to step S1301. By contrast with this, when the operation to finish playing the image is performed (step S1306: Yes), the imaging apparatus 100 returns to the main routine illustrated in FIG. 32.

A case (step S1303: No) will be described where, in step S1303, a selected image is not a video. In this case, the display control unit 110*d* controls the display unit 7 to display the selected image on the full screen (step S1307), and the control unit 110 decides whether or not an operation to switch the image is performed (step S1308). More specifically, when the special effect input switch 6*d* is operated, the control unit 110 decides whether or not a command signal for commanding to switch an image displayed on the display unit 7 is inputted from the special effect input switch 6*d*. When the operation to switch the image is performed (step S1308: Yes), the display control unit 110*d* controls the display unit 7 to switch the image currently displayed on the display unit 7 (step S1309), and the imaging apparatus 100 returns to step S1307. By contrast with this, when the operation to switch the image is not performed after the image is displayed on the full screen and a predetermined time, for example, 30 seconds passes (step S1308: No), the imaging apparatus 100 goes to step S1306.

With the third embodiment described above, the display control unit 110*d* controls the display unit 7 to display an image corresponding to image data generated at a frame rate of a shooting mode set by the shooting mode setting unit 110*b*, and controls the display unit 7 to display information related to a special effect which the special effect image generating unit 110c needs to apply to image data, in order from the highest advisability corresponding to a combination with the frame rate of the shooting mode set by the shooting mode setting unit 110b, referring to the advisability information table T11 stored in the advisability information storing unit 109d. By this means, the imaging apparatus 100 can present, to the user, information which serves as a guide for an optimal combination of a special effect for an image generated at the set frame rate of the shooting mode.

Further, with the third embodiment, the display control unit 110d controls the display unit 7 to first display icons of special effects of the highest advisability, so that the user can apply a special effect to an image generated at the set frame rate of the shooting mode without missing a timing to capture an image of the subject due to a user's operation of selecting the special effect.

In addition, although, with the third embodiment, the control unit 110 selects and determines an icon which the user desires, according to a signal received by the touch panel 8 as input when the user touches various icons displayed on the image on the display unit 7, the control unit 110 may select and determine an icon which the user desires, according to a command signal which is received as input from the special effect input switch 6d. Consequently, by operating the special effect input switch 6d, the user can select and determine information related to a shooting mode and information related to a special effect displayed on the display unit 7.

Further, with the third embodiment, the display control unit 110d may control the display unit 7 to emphasize and display an image generated based on the shooting mode set by the shooting mode setting unit 110b, according to a display mode of a changed color and/or size of a special effect icon, in order from the highest advisability of a combination with a special effect, referring to the advisability information table T11 stored in the advisability information storing unit 109d. By this means, the user can more intuitively select an optimal combination of a shooting mode and special effect, based on information which serves as a guide to select a combination of a shooting mode and special effect.

Further, although, with the third embodiment, the display control unit 110d controls the display unit 7 to display only two special effect icons, the display control unit 110d may control the display unit 7 to display special effect icons corresponding to special effects of the same advisability. In this case, the display control unit 110d may control the display unit 7 to display reduced special effect icons in one vertical line or one horizontal line.

Further, with the third embodiment, by connecting the communication unit 10 to an external processing device such as a personal computer or server, the control unit 110 may update or rewrite the advisability information table T11 stored in the advisability information storing unit 109d based on information received through the communication unit 10. By this means, the display control unit 110d can display a special effect icon according to the advisability which takes into account a combination of a newly added special effect and a frame rate of a shooting mode. Further, by storing the advisability of a combination of a newly added special effect and shooting mode in, for example, a storage medium such as a memory card which is attachable to the storing unit 109, the control unit 110 may acquire the advisability from the storage medium and store the advisability in the advisability information storing unit 109 to update or rewrite the advisability information table T11.

Further, although, with the third embodiment, the posture detecting unit 3 detects the posture state of the imaging apparatus 1, by, for example, detecting the acceleration produced when the user taps the display screen of the display unit 7, the posture detecting unit 3 may receive an operation signal of a touch operation to switch various shooting modes and various settings of the imaging apparatus 100, and output this operation signal to the control unit 110.

Further, although, with the third embodiment, when the user touches the switch icon Q113 or Q114, the display control unit 110d switches a special effect icon, the display control unit 110d may switch a special effect icon according to a trajectory which the user touches on the touch panel 8 in an area of a special effect icon displayed on an image on the display unit 7.

Fourth Embodiment

Next, a fourth embodiment will be described. The imaging apparatus according to the fourth embodiment differs from the above embodiments in configurations of a control unit and storing unit. Further, the imaging apparatus according to the fourth embodiment differs from the imaging apparatus according to the above embodiments in the operation. Hence, hereinafter, the configurations of the storing unit and control unit of the imaging apparatus according to the fourth embodiment will be described, and then the operation of the imaging apparatus according to the fourth embodiment will be described. In addition, the same components will be assigned the same reference numerals in the drawings.

Figure 41:
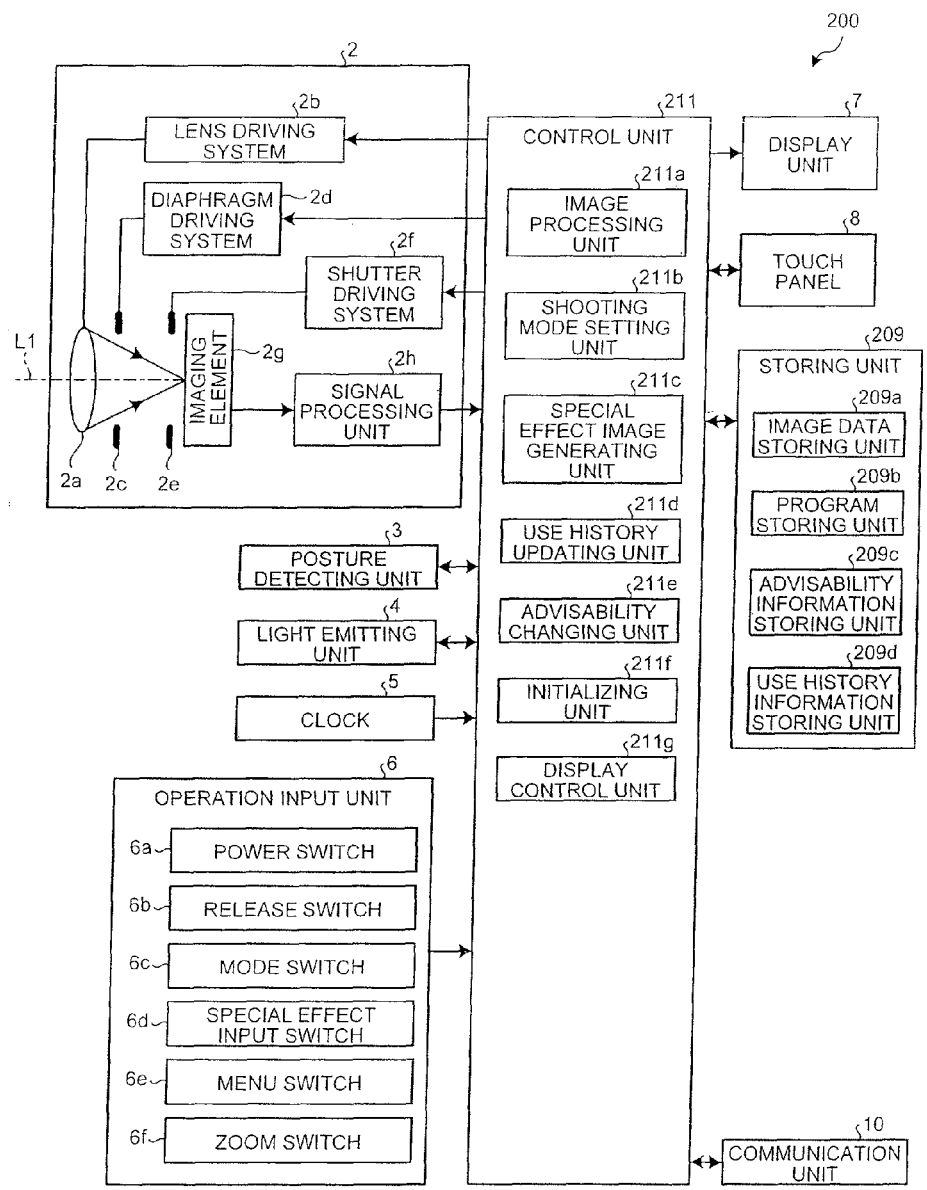
FIG. 41 is a block diagram illustrating a configuration of an imaging apparatus according to a fourth embodiment of the present invention.

FIG. 41 is a block diagram illustrating a configuration of the imaging apparatus according to the fourth embodiment. As illustrated in FIG. 41, an imaging apparatus 200 includes the imaging unit 2, the posture detecting unit 3, the light emitting unit 4, the clock 5, the operation input unit 6, the display unit 7, the touch panel 8, the communication unit 10, a storing unit 209 and a control unit 211.

The storing unit 209 is provided inside the imaging apparatus 200 in a fixed manner, and is formed using a semiconductor memory such as a flash memory or RAM. The storing unit 209 includes an image data storing unit 209a which stores image data captured by the imaging unit 2; a program storing unit 209b which stores various programs executed by the imaging apparatus 200 and capturing programs according to one embodiment; an advisability information storing unit 209c which stores an advisability information table which, when the special effect (art filter) is applied to an image, assigns an advisability corresponding to a combination of a special effect and shooting mode; and a use history information storing unit 209d which stores use history information showing a use history of a combination of a special effect and shooting mode. In addition, the storing unit 209 may have a function of a storage medium interface which reads information stored in the storage medium while storing the information in a storage medium such as a memory card attached from an outside.

The control unit 211 is formed with, for example, a CPU. The control unit 211 reads a program from the program storing unit 209b of the storing unit 209 according to, for example, an operation signal from the operation input unit 6 to execute, and performs overall control of the operation of the imaging apparatus 200 by, for example, commanding each unit forming the imaging apparatus 200 or transferring data. The control unit 211 has an image processing unit 211a, a shooting mode setting unit 211b, a special effect image generating unit 211c, a use history updating unit 211d, an advisability changing unit 211e, an initializing unit 211f and a display control unit 211g.

The image processing unit 211a applies various image processings to image data outputted from the signal processing unit 2h to output to the storing unit 209. More specifically, the image processing unit 211a applies processings such as edge enhancement, color correction and γ correction to image data outputted from the signal processing unit 2h.

The shooting mode setting unit 211b sets in the imaging apparatus 200 one of a plurality of shooting modes for which a capturing condition suitable for each capturing scene is set in advance. More specifically, the shooting mode setting unit 211b sets the shooting mode of the imaging apparatus 200 based on an operation signal inputted from, for example, the mode switch 6c and the menu switch 6e, or characteristics of image data generated by the imaging unit 2. Meanwhile, the capturing condition is parameter information including, for example, an aperture value, shutter speed, ISO sensitivity, white balance and saturation. Further, characteristics of image data include, for example, contrast, saturation and an occupation area which a main subject occupies in an image included image data.

The special effect image generating unit 211c generates a special effect image by applying special effect corresponding to information received by the touch panel 8 as input, to an image corresponding to image data generated by the imaging unit 2. More specifically, the special effect image generating unit 211c generates a special effect image by applying to image data generated by the imaging unit 2 a special effect obtained by using various optical filters such as a color conversion filter or contrast adjustment filter in the front surface of the lens unit 2a of the imaging unit 2, or the same effect as a special effect obtained by using a shooting lens for a specific use such as a fish-eye lens or a tilt-shift mechanism attached shooting lens. For example, the special effect image generating unit 211c applies, to image data, processing including one of a plurality of image processings, tone curve processing, blurring process, shading adding process, image synthesizing process, noise superimposing process, and saturation adjusting process. In addition, the special effect image generating unit 211c may generate a special effect image by applying two or more special effects of different effects to image data generated by the imaging unit 2. Further, the special effect image generating unit 211c may continuously generate special effect images by sequentially applying special effects to image data continuously generated by the imaging unit 2.

The use history updating unit 211d updates use history information stored in the use history information storing unit 209d every time the special effect image generating unit 211c generates a special effect image.

The advisability changing unit 211e changes the advisability of a combination used a number of times more than a predetermined number of times among combinations of special effects and shooting modes included in the advisability information table stored in the advisability information storing unit 209c based on use history information stored in the use history information storing unit 209d.

The initializing unit 211f initializes the advisability of the advisability information table changed by the advisability changing unit 211e. More specifically, the initializing unit 211f initializes the advisability information table set upon shipping of the imaging apparatus 200 from a manufacturer, according to an operation signal from the menu switch 6e.

The display control unit 211g controls the display unit 7 to perform display. The display control unit 211g controls the display unit 7 to display an image corresponding to image data generated by the imaging unit 2 according to the shooting mode set by the shooting mode setting unit 211b, and controls the display unit 7 to display information related to a special effect which the special effect image generating unit 211c needs to apply to an image, in order from the highest advisability corresponding to a combination with a shooting mode, referring to the advisability information table stored in the advisability information storing unit 209c. The display control unit 211g controls the display unit 7 to display information related to special effects by means of icons. More specifically, the display control unit 211g controls the display unit 7 to display special effect icons corresponding to special effects in order from the highest advisability corresponding to the combination with the shooting mode, referring to advisability information table.

Figure 42:
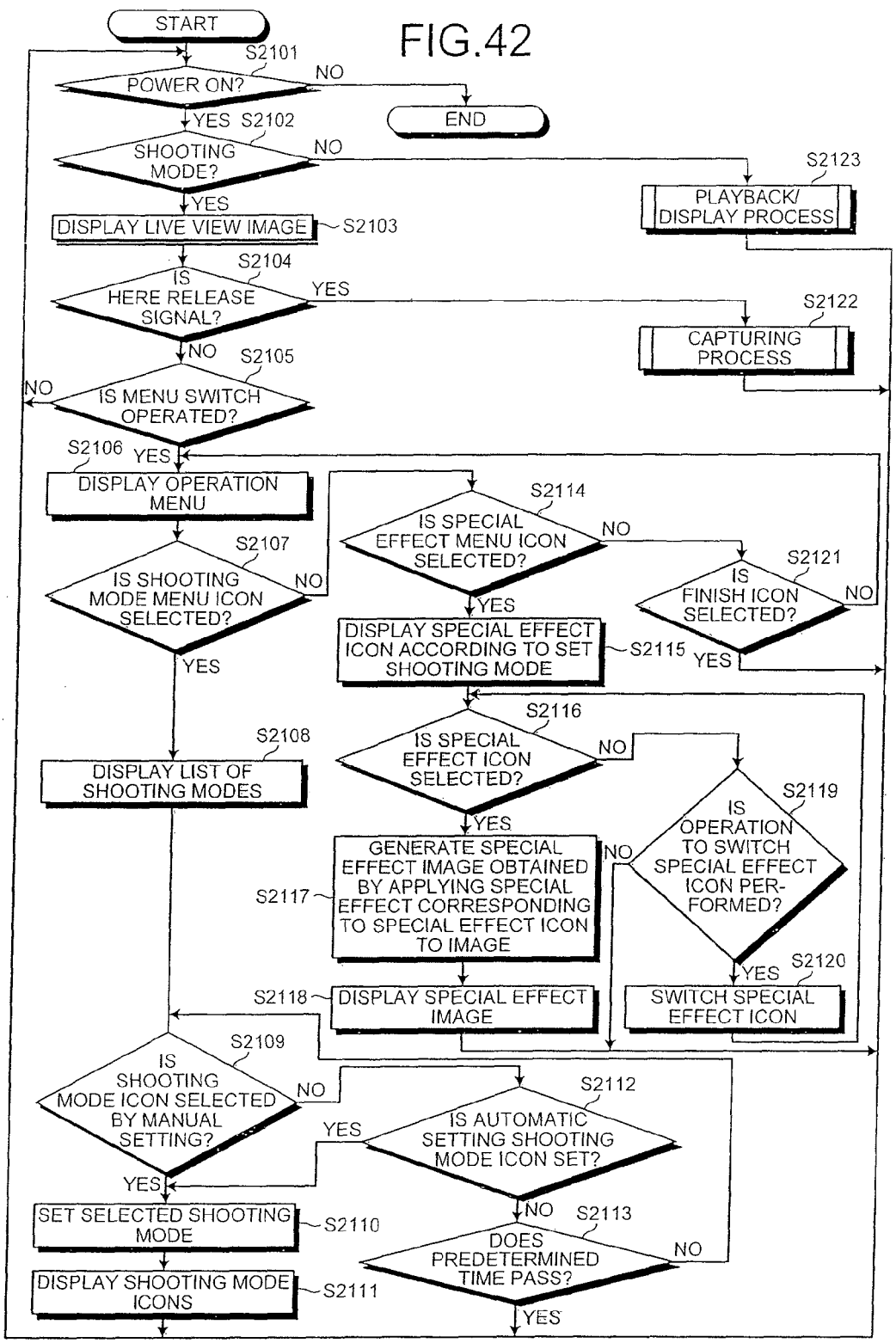
FIG. 42 is a flowchart illustrating an outline of processing performed by an imaging apparatus according to the fourth embodiment of the present invention.

Processing performed by the imaging apparatus 200 employing the above configuration will be described. FIG. 42 is a flowchart illustrating an outline of processing performed by the imaging apparatus 200. In addition, although an example will be described below where a still image is captured, the imaging apparatus 200 is applicable to video capturing.

In FIG. 42, the control unit 211 first decides whether or not the power source of the imaging apparatus 200 is turned on (step S2101). When the power source of the imaging apparatus 200 is turned on (step S2101: Yes), the imaging apparatus 200 goes to step S2102. By contrast with this, when the power source of the imaging apparatus 200 is not turned on (step S2101: No), the imaging apparatus 200 finishes the processing.

Subsequently, the control unit 211 decides whether or not the imaging apparatus 200 is set to a shooting mode (step S2102). When the imaging apparatus 200 is set to the shooting mode (step S2102: Yes), the imaging apparatus 200 goes to step S2103 (described below). By contrast with this, when the imaging apparatus 200 is not set to the shooting mode (step S2102: No), the imaging apparatus 200 goes to step S2123 (described below).

A case (step S2102: Yes) will be described where, in step S2102, the imaging apparatus 200 is set to the shooting mode. In this case, the display control unit 211g controls the display unit 7 to display live view images of an image corresponding to image data continuously generated by the imaging unit 2 at constant and very short time intervals (step S2103). As illustrated in FIG. 33, the camera man captures a subject O1 while checking a live view image such as the image $W_n$ displayed by, for example, the display unit 7.

In step S2104, the control unit 211 decides whether or not a release signal for commanding to capture an image is inputted from the release switch 6b. When a release signal for commanding to capture an image is not inputted (step S2104: No), the control unit 211 decides whether or not a command signal for commanding to display an operation menu is inputted from the menu switch 6e when the user operates the menu switch 6e (step S2105). When receiving no command signal for commanding to display an operation menu as input from the menu switch 6e (step S2105: No), the imaging apparatus 200 goes to step S2101. By contrast with this, when receiving a command signal for commanding to display an operation menu as input from the menu switch 6e (step S2105: Yes), the imaging apparatus 200 goes to step S2106.

Figure 43:
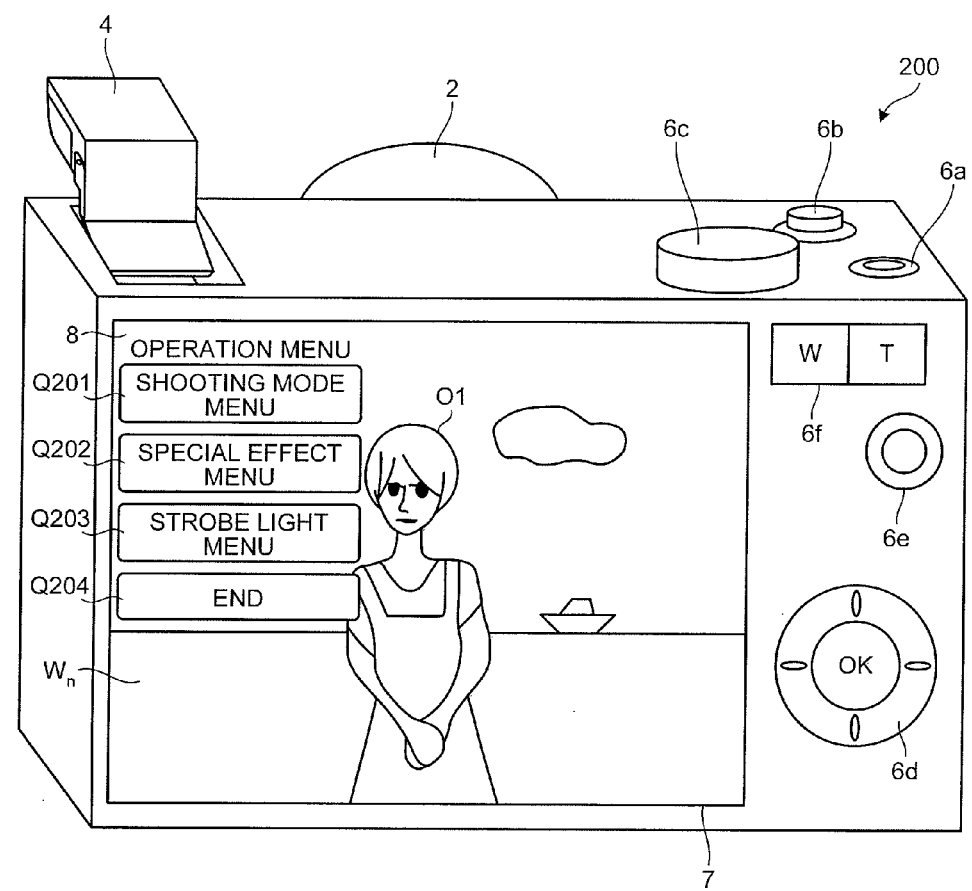
FIG. 43 is a view illustrating an example of an operation menu displayed on a display unit of an imaging apparatus.

Subsequently, the display control unit 211g controls the display unit 7 to display the operation menu on the image $W_n$ displayed on the display unit 7 (step S2106). More specifically, as illustrated in FIG. 43, the display control unit 211g displays a shooting mode menu icon Q201, a special effect menu icon Q202, a strobe light menu icon Q203 and an end icon Q204 on the image $W_n$.

Hereinafter, various icons which the display control unit 211g controls the display unit 7 to display illustrated in FIG.

43 will be described. The shooting mode menu icon Q201 receives an input of a command signal for controlling the display unit 7 to display information related to a plurality of shooting modes for which a capturing condition suitable for each capturing scene is set in advance. The special effect menu icon Q202 receives an input of a command signal for controlling the display unit 7 to display information related to a plurality of special effects which are applicable to image data generated by the imaging unit 2. The strobe light menu icon Q203 receives an input of a command signal for commanding the display unit 7 to display detailed parameters of a strobe light operation condition of strobe light (flash). As the detailed parameters of the strobe light operation condition, parameters such as automatic light emission, light emission prohibition, red-eye light emission and forced light emission are displayed. The end icon Q204 receives an input of a command signal for finishing displaying an operation menu.

After the display control unit 211g controls the display unit 7 to display the operation menu on the image $W_n$ displayed on the display unit 7, the control unit 211 decides whether or not the shooting mode menu icon Q201 is selected (step S2107). More specifically, as illustrated in FIG. 43, when the user touches the shooting mode menu icon Q201 displayed on the image $W_n$ on the display unit 7, the control unit 211 decides whether or not the shooting mode menu icon Q201 is selected according to the signal received by the touch panel 8 as input. When the shooting mode menu icon Q201 is selected (step S2107: Yes), the imaging apparatus 200 goes to step S2108 (described below). By contrast with this, when the shooting mode menu icon Q201 is not selected (step S2107: No), the imaging apparatus 200 goes to step S2114 (described below).

Figure 44:
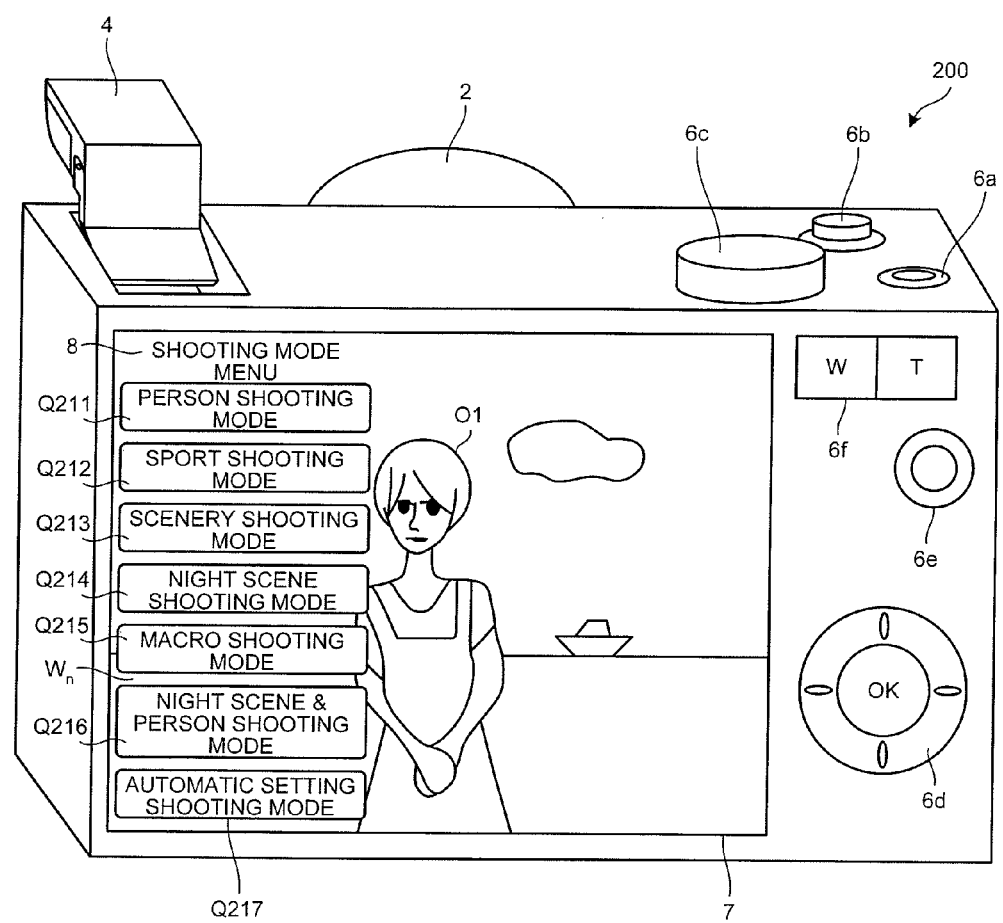
FIG. 44 is a view illustrating an example of a shooting mode menu displayed on a display unit of an imaging apparatus.

In step S2107, after the shooting mode menu icon Q201 is selected, the display control unit 211g controls the display unit 7 to display a list of shooting modes on the image $W_n$ (step S2108). More specifically, as illustrated in FIG. 44, the display control unit 211g controls the display unit 7 to display on the image $W_n$ displayed on the display unit 7 a person shooting mode icon Q211, a sport shooting mode icon Q212, a scenery shooting mode icon Q213, a night scene shooting mode icon Q214, a macro shooting mode icon Q215, a night scene and person shooting mode icon Q216, and an automatic setting shooting mode icon Q217.

Hereinafter, each shooting mode illustrated in FIG. 44 will be described.

With the person shooting mode, a capturing condition suitable to capture an image of a person is set.

With the sport shooting mode, a capturing condition suitable to capture an image of a moving subject is set.

With the scenery shooting mode, a capturing condition suitable to capture an image of the scenery is set.

With the night scene shooting mode, the capturing condition suitable to capture an image of a night scene is set.

With the macro shooting mode, a capturing condition suitable to perform macro (close-up) capturing is set.

With the night scene and person shooting mode, a capturing condition suitable to capture an image of a person in the night scene is set.

The automatic setting capturing refers to automatically deciding a capturing scene based on image data generated by the imaging unit 2, and automatically setting a capturing condition suitable for the decided capturing scene.

The above person shooting mode, sport shooting mode, scenery shooting mode, night scene shooting mode, macro shooting mode and night scene and person shooting mode are manually set by the user by deciding the capturing scene.

Referring back to FIG. 42, in step S2109, the control unit 211 decides whether or not a shooting mode is selected according to a manual setting. More specifically, the control unit 211 decides which one of the person shooting mode icon Q211, sport shooting mode icon Q212, scenery shooting mode icon Q213, night scene shooting mode icon Q214, macro shooting mode icon Q215, and night scene and person shooting mode icon Q216, is selected. When the shooting mode icon is selected according to the manual setting (step S2109: Yes), the shooting mode setting unit 211b sets a shooting mode corresponding to the selected shooting mode icon, in the imaging apparatus 200 (step S2110).

Figure 45:
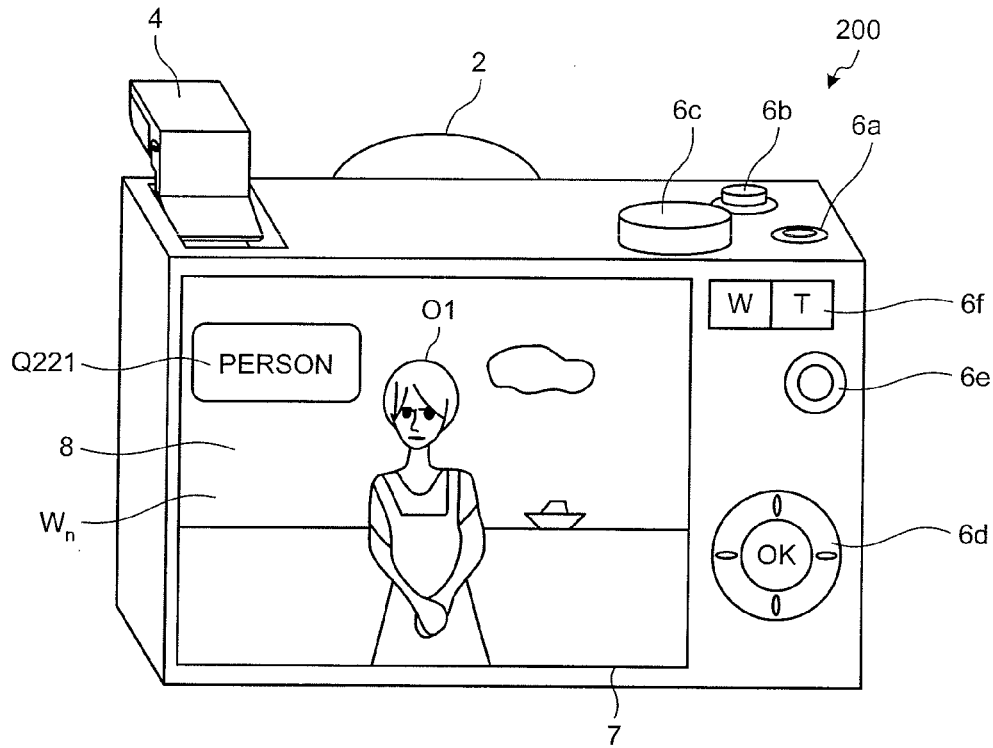
FIG. 45 is a view illustrating an example of an image displayed on a display unit of an imaging apparatus.

Subsequently, the display control unit 211g controls the display unit 7 to display the shooting mode icons corresponding to the shooting mode set by the shooting mode setting unit 211b, on the image $W_n$ displayed on the display unit 7 (step S2111), and the imaging apparatus 200 returns to step S2101. More specifically, as illustrated in FIG. 45, the display control unit 211g controls the display unit 7 to display the person icon Q221 corresponding to the person shooting mode, on the image $W_n$ displayed on the display unit 7.

A case (step S2109: No) will be described where, in step S2109, a shooting mode is selected by a manual setting. In this case, the control unit 211 decides whether or not the automatic setting shooting mode icon Q217 which automatically decides the capturing scene is selected (step S2112). When the automatic setting shooting mode icon Q217 is selected (step S2112: Yes), the imaging apparatus 200 goes to step S2110. By contrast with this, when the automatic setting shooting mode icon Q217 is not selected (step S2112: No), the control unit 211 decides whether or not a predetermined time, for example, 30 seconds passes after a list of shooting modes is displayed (step S2113). When a predetermined time does not pass after the list of the shooting modes is displayed (step S2113: No), the imaging apparatus 200 returns to step S2109. By contrast with this, when a predetermined time passes after the list of the shooting modes is displayed (step S2113: Yes), the imaging apparatus 200 returns to step S2101.

A case (step S2107: No) will be described where, in step S2107, the shooting mode menu icon Q201 is not selected. In this case, the control unit 211 decides whether or not the special effect menu icon Q202 is selected (step S2114). When the special effect menu icon Q202 is not selected (step S2114: No), the imaging apparatus 200 goes to step S2121 (described below). By contrast with this, when the special effect menu icon Q202 is selected (step S2114: Yes), the imaging apparatus 200 goes to step S2115 (described below).

Figure 46:
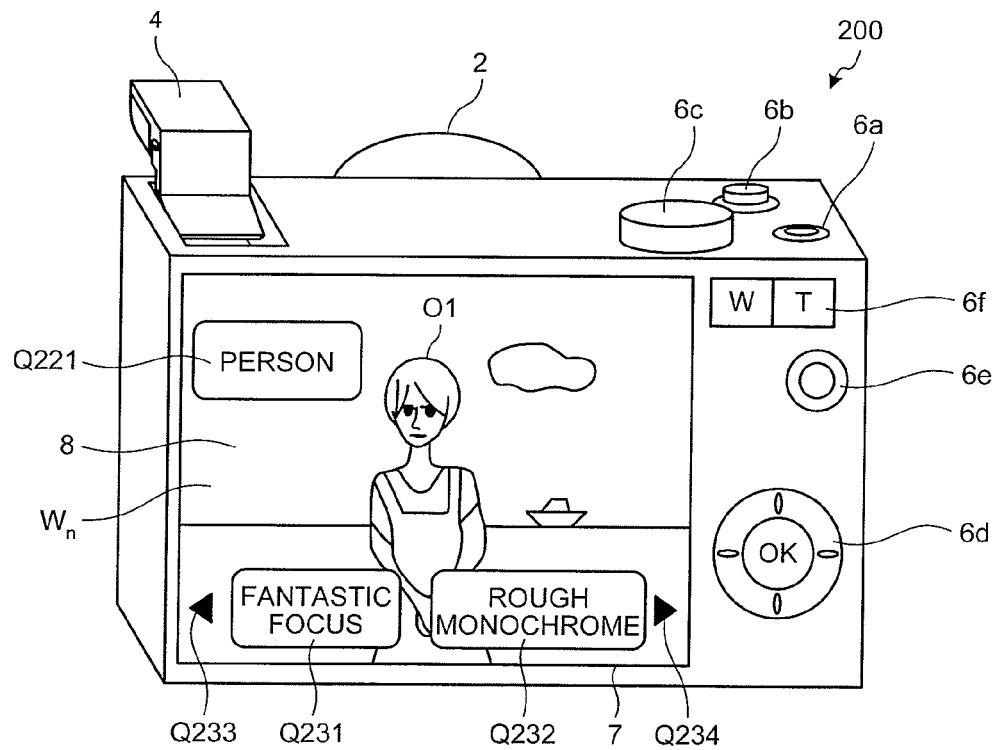
FIG. 46 is a view illustrating an example of an image displayed on a display unit of an imaging apparatus.

In step S2115, the display control unit 211g controls the display unit 7 to display information related to a special effect which needs to be applied to an image displayed on the display unit 7, in order from the advisability corresponding to a combination with the shooting mode set by the shooting mode setting unit 211b, referring to the advisability information table stored in the advisability information storing unit 209c. More specifically, as illustrated in FIG. 46, the display control unit 211g controls the display unit 7 to display a fantastic focus icon Q231 and a rough monochrome icon Q232 on the image $W_n$ displayed on the display unit 7.

Hereinafter, a method of displaying special effect icons which the display control unit 211g controls the display unit 7 to display will be described with reference to FIG. 47. FIG. 47 is a view illustrating an example of an advisability information table stored by the advisability information storing unit 209c.

As illustrated in FIG. 47, in the advisability table T21, (0 to 2) are written for advisabilities which match combinations of special effects which the special effect image generating unit 211c can apply to image data and shooting modes. More specifically, when the shooting mode is "person shooting mode", the advisability is "2" for a combination with "fantastic focus", "rough monochrome", "day dream", "light tone", "HDR", "sketch" and "dramatic tone" of special effects. Further, the advisability is "1" for the combination with "toy photo", and the advisability is "0" for the combination with "pop art".

Hereinafter, each special effect and the advisability for a combination of a shooting mode and a special effect illustrated in FIG. 47 will be described.

First, each special effect illustrated in FIG. 47 will be described.

Pop art provides an effect of colorfully and vividly finishing a captured image of vigorous colors.

Fantastic focus provides an effect of fantastically finishing a captured image unique to soft focus.

Rough monochrome provides an effect of finishing a captured image by emphasizing strength and roughness unique to a monochrome picture.

Toy photo provides an effect of finishing a captured image by dimming the surrounding of the image as if the image is captured by toy photo.

Day dream provides an effect of finishing a captured image of a trip filled with blue soft light.

Light tone refers to special effect processing of expressing brightness and darkness of an image softly.

HDR provides an effect of finishing a captured image with a dynamic range of actual scenery.

Sketch provides an effect of finishing a captured image by drawing the profile by line drawing and emphasizing the profile.

Dramatic tone provides an effect of finishing a captured image by showing like a fiction an actual space by means of brightness and darkness which are created from the change of a local contrast and which are unrealistic.

Next, the advisability of a combination of a shooting mode and a special effect will be described. Pop art is unsuitable to capture an image of a person because capturing is performed by increasing the saturation very high. Further, pop art requires multiple portions having colors, and therefore is unsuitable for the night scene. Hence, the advisability is "0" for the person shooting mode, and the advisability is "1" for the night scene shooting mode and night scene and person shooting mode.

Fantastic focus is a little unsuitable to capture an image of a moving person because a hard motion image and a fantastic image contradicts, thereby decreasing an effect. Hence, the advisability is "1" for the sport shooting mode.

Rough monochrome is a little unsuitable to capture the image of the night scene because the night scene is captured by monochromatically. Hence, the advisability is "1" for the night scene shooting mode and night scene and person shooting mode.

Toy photo is unsuitable to capture the image of the night scene because the surrounding portion is dimmed, thereby making it difficult to recognize whether or not the night scene is dimmed when the sky is dark like the night scene. Further, toy photo is a little unsuitable to capture an image of a person or a moving person because the scenery is assumed. Hence, the advisability is "0" for the night scene shooting mode and night scene and person shooting mode, and the advisability is "1" for the person shooting mode and sport shooting mode.

Day dream is unsuitable to capture the image of the night scene because the black level of the pixels is decreased, thereby losing the atmosphere of the night scene. Hence, the advisability is "0" for the night scene shooting mode, and the advisability is "1" for the night scene and person shooting mode.

Light tone is a little unsuitable to capture an image of a night scene because brightness and darkness of the image are finished softly. Hence, the advisability is "1" for the night scene shooting mode and night scene and person shooting mode.

HDR is unsuitable to capture an image of a moving subject or a close subject because shaking needs to be prevented to overlay a plurality of images. Hence, the advisability is "0" for the sport shooting mode, and the advisability is "1" for the macro shooting.

Sketch is unsuitable to capture an image of a night scene because the profile is drawn by line drawing and emphasized. Further, sketch is a little unsuitable to capture scenery because the scenery including, for example, sky or snow becomes plain. Hence, the advisability is "0" for the night shooting mode, and the advisability is "1" for the scenery shooting mode and night scene and person shooting mode.

Dramatic tone is a little unsuitable to capture an image of a night scene because shading is emphasized. Hence, the advisability is "1" for the night scene shooting mode and night scene and person shooting mode.

Thus, with the advisabilities in the advisability information table T21, a higher numerical value is set stepwise for a better combination of a special effect and a shooting mode. Further, the advisability in the advisability information table T21 is set to "0" for unsuitable combinations of special effects and shooting modes. By this means, when the display control unit 211g controls the display unit 7 to display information related to a special effect as a special effect icon, the display control unit 211g controls the display unit 7 to display the information in order from the highest advisability of the combination with the shooting mode set by the shooting mode setting unit 211b, referring to the advisability information table T21 stored in the advisability information storing unit 209c. For example, as illustrated in FIG. 46, when the display control unit 211g controls the display unit 7 to display the person icon Q221 indicating the person shooting mode, on the image $W_n$ currently displayed on the display unit 7, the display control unit 211g controls the display unit 7 to display the fantastic focus icon Q231 and rough monochrome icon Q232 as special effect icons.

Further, the display control unit 211g controls the display unit 7 to display only information related to a special effect which can be used in combination with a shooting mode set by the shooting mode setting unit 211b. For example, when the shooting mode setting unit 211b sets the person shooting mode, the display control unit 211g controls the display unit 7 to display only special effect icons related to fantastic focus, rough monochrome, toy photo, day dream, light tone, HDR, sketch and dramatic tone which can be used in combination with the person shooting mode. As a result, the imaging apparatus 200 can present, to the user, information which serves as a guide for an optimal combination of special effects for image generated by the imaging unit 2 according the set shooting mode. In addition, the numerical values illustrated in FIG. 47 are only examples and by no means limited to these, and a numerical value of the advisability may be changed by, for example, the special effect input switch 6d. Further, a lower advisability may be set stepwise for a better combination of a special effect and a shooting mode.

Referring back to FIG. 42, in step S2116, the control unit 211 decides whether or not a special effect icon is selected. More specifically, as illustrated in FIG. 46, the control unit 211 decides whether or not the user touches the fantastic focus icon Q231 or rough monochrome icon Q232 displayed on the screen of the display unit 7. When the special effect icon is selected (step S2116: Yes), the special effect image generating unit 211c generates a special effect image by applying a special effect such as fantastic focus corresponding to the special effect icon which the user touches, to image data currently displayed on the display unit 7 (step S2117).

Figure 48:
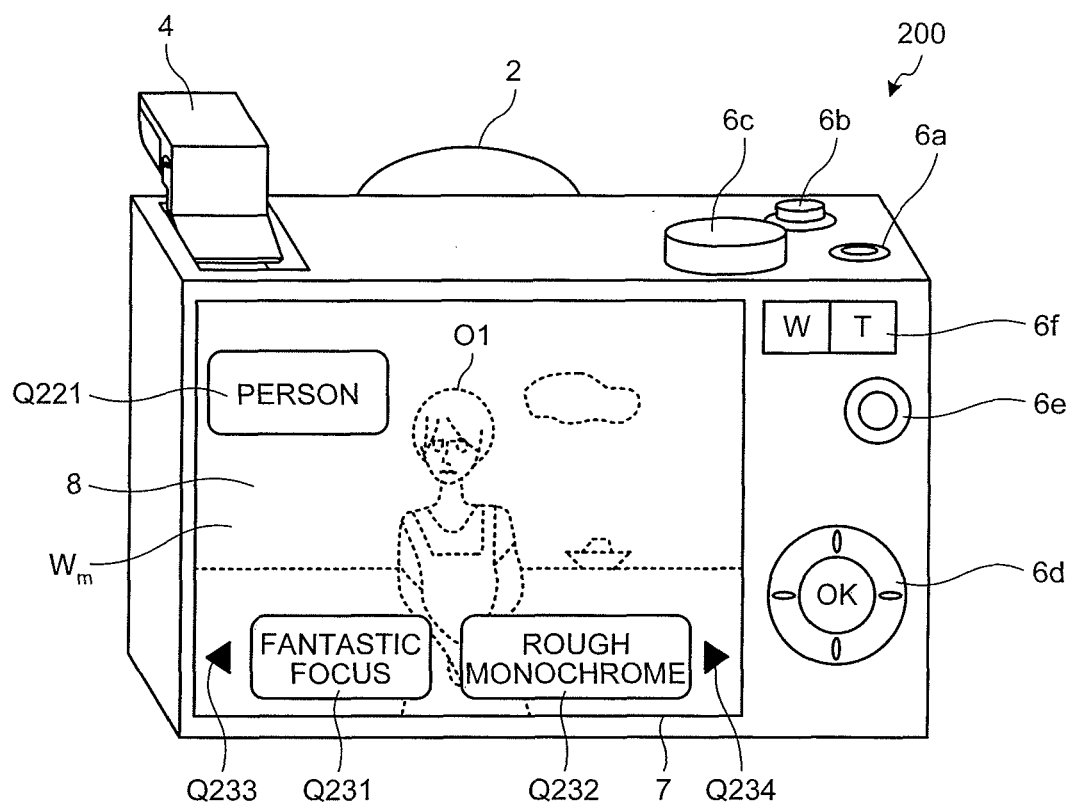
FIG. 48 is a view illustrating an example of an image displayed on a display unit of an imaging apparatus.

Subsequently, the display control unit 211g controls the display unit 7 to display the special effect image generated by the special effect image generating unit 211c (step S2118), and the imaging apparatus 200 returns to step S2101. More specifically, as illustrated in FIG. 48, the display control unit 211g controls the display unit 7 to display a special effect image $W_m$ (m=natural number) by applying a special effect such as fantastic focus, to the image by the special effect image generating unit 211c. By this means, live view images displayed on the display unit 7 are applied special effects, so that the user can capture images while checking a shooting mode and special effect. In addition, although, in FIG. 48, an image is expressed by dotted lines to show a special effect of fantastic focus, this image is only an example.

A case (step S2116: No) will be described where, in step S2116, the user does not select a special effect icon. In this case, the control unit 211 decides whether or not the user performs an operation to switch a special effect icon (step S2119). More specifically, as illustrated in FIG. 46, the control unit 211 decides whether the user touches the switch icon Q233 or switch icon Q234 which receives an input of a command signal for commanding to switch to a special effect icon of the second highest advisability from the special effect icon currently displayed on the display unit 7. When the user does not perform an operation to switch the special effect icon within a predetermined time, for example, within 30 seconds (step S2119: No), the imaging apparatus 200 returns to step S2101. By contrast with this, when the user performs an operation to switch a special effect icon (step S2119: Yes), the imaging apparatus 200 goes to step S2120.

Figure 49:
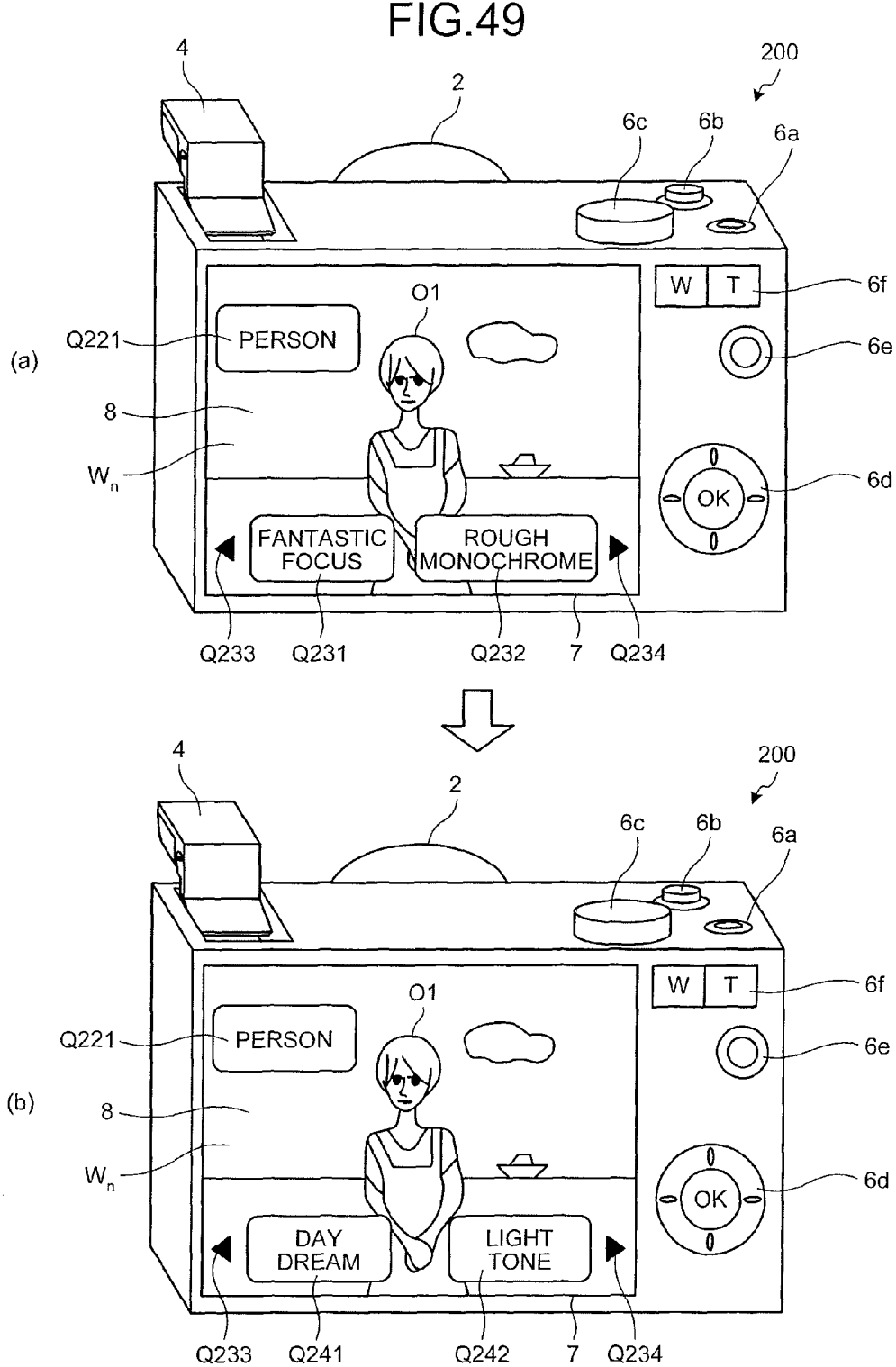
FIG. 49 is a view illustrating an example of an image displayed on a display unit of an imaging apparatus.

Subsequently, the display control unit 211g controls the display unit 7 to display a special effect icon of the second highest advisability, referring to the advisability information table T21 (step S2120), and the imaging apparatus 200 returns to step S2116. More specifically, as illustrated in FIG. 49, the display control unit 211g controls the display unit 7 to display the fantastic focus icon Q231, rough monochrome icon Q232 to day dream icon Q241 and light tone icon Q242 ((a)→(b) of FIG. 49). By this means, the user can adequately select a desired special effect.

A case (step S2114: No) will be described where, in step S2114, the shooting mode menu icon Q201 and special effect menu icon Q202 are not selected. In this case, the control unit 211 decides whether or not the end icon Q204 is selected (step S2121). When the end icon Q204 is not selected (step S2121: No), the imaging apparatus 200 returns to step S2106. By contrast with this, when the end icon Q204 is selected (step S2121: Yes), the imaging apparatus 200 returns to step S2101.

A case (step S2104: Yes) will be described where, in step S2104, a release signal for commanding to capture an image is inputted from the release switch 6b. In this case, the imaging apparatus 200 executes capturing process of capturing a subject (step S2122), and the imaging apparatus 200 returns to step S2101.

A case (step S2102: No) will be described where, in step S2102, the imaging apparatus 200 is not set to the shooting mode. In this case, the imaging apparatus 200 executes playback/display process of playing captured image data (step S2123), and the imaging apparatus 200 returns to step S2101.

Figure 50:
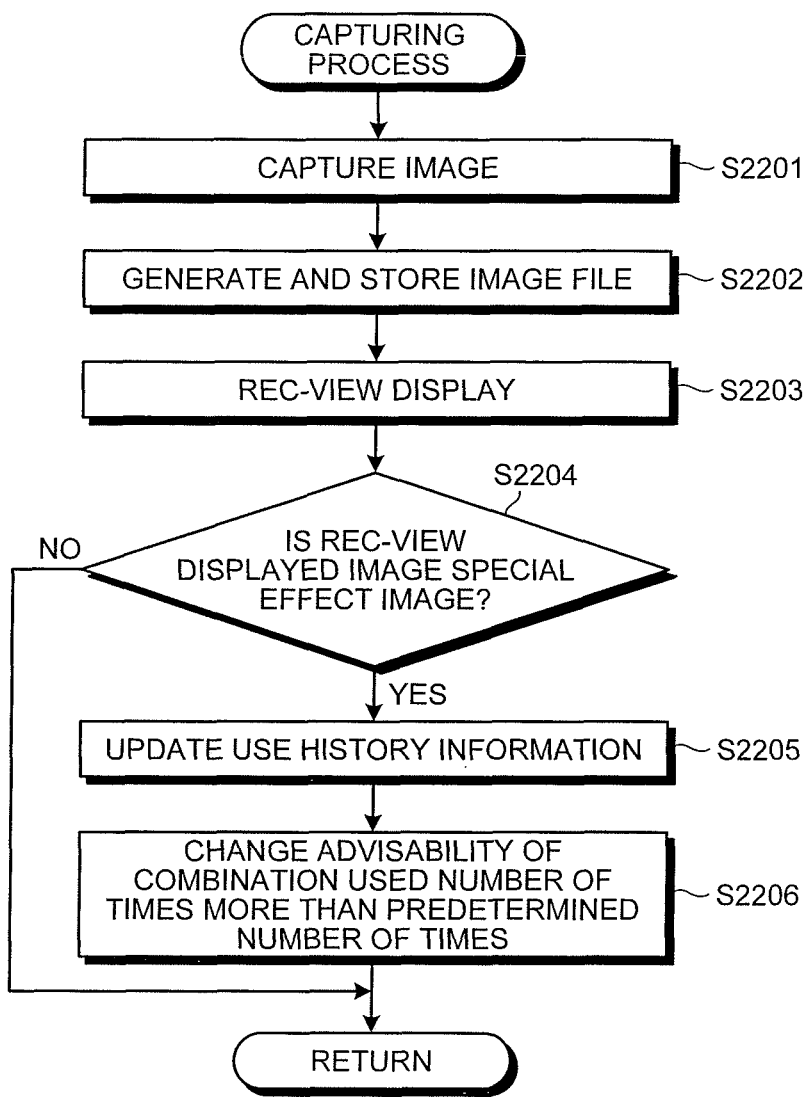
FIG. 50 is a flowchart illustrating an outline of capturing process illustrated in FIG. 42.

Next, capturing process in step S2122 illustrated in FIG. 42 will be described. FIG. 50 is a flowchart illustrating an outline of capturing process.

As illustrated in FIG. 50, the imaging apparatus 200 captures the subject (step S2201). In addition, this capturing includes a special effect image generated by applying a special effect from the special effect image generating unit 211c, to an image corresponding to image data generated by the imaging unit 2 according to the shooting mode set by the shooting mode setting unit 211b.

Subsequently, the control unit 211 generates an image file of the captured image data and controls the image data storing unit 209a to store the captured image data (step S2202). In case of a still image, this image file stores at least the image data, presence/absence information of a special effect applied to the image data, type information of the special effect applied to the image data, shooting mode information and date information. Further, in case of video capturing, this image file stores at least image data, presence/absence information of a special effect applied to the image data, type information of the special effect, use count information of the special effect, shooting mode information and date information.

Then, the display control unit 211g controls the display unit 7 to REC-view display an image corresponding to the captured image data only for a predetermined time, for example, 30 seconds (step S2203).

After the display unit 7 REC-view displays the captured image, the control unit 211 decides whether or not the REC-view displayed image is a special effect image (step S2204). More specifically, the control unit 211 decides whether or not a special effect is applied to the REC-view displayed image, based on information included in the image file of the REC-view displayed image. When a special effect is not applied to the REC-view displayed image (step S2204: No), the imaging apparatus 200 returns to the main routine illustrated in FIG. 42. By contrast with this, when a special effect is not applied to the REC-view displayed image (step S2204: Yes), the imaging apparatus 200 goes to step S2205.

Subsequently, the use history updating unit 211d updates a use history of a combination of a special effect applied to the REC-view displayed image and a shooting mode, for use history information stored in the use history information storing unit 209d (step S2205).

Then, the advisability changing unit 211e changes the advisability of a combination used a number of times more than a predetermined number of times among combinations of special effects and shooting modes included in the advisability information table T21 stored in the advisability information storing unit 209c based on use history information stored in the use history information storing unit 209d (step S2206), and the imaging apparatus 200 returns to the main routine illustrated in FIG. 42. More specifically, the advisability changing unit 211e changes the advisability from "1" to "2" for a combination used a number of times more than a predetermined number of times, for example, 100 times, for example, a combination of "toy photo" and "person shooting mode" among combinations of special effects and shooting modes included in the advisability information table T21 stored in the advisability information storing unit 209c (see FIG. 47). By this means, the imaging apparatus 200 can present, to the user, information which serves as a guide for a combination of a special effect and shooting mode taking into account a use situation of the user.

Figure 51:
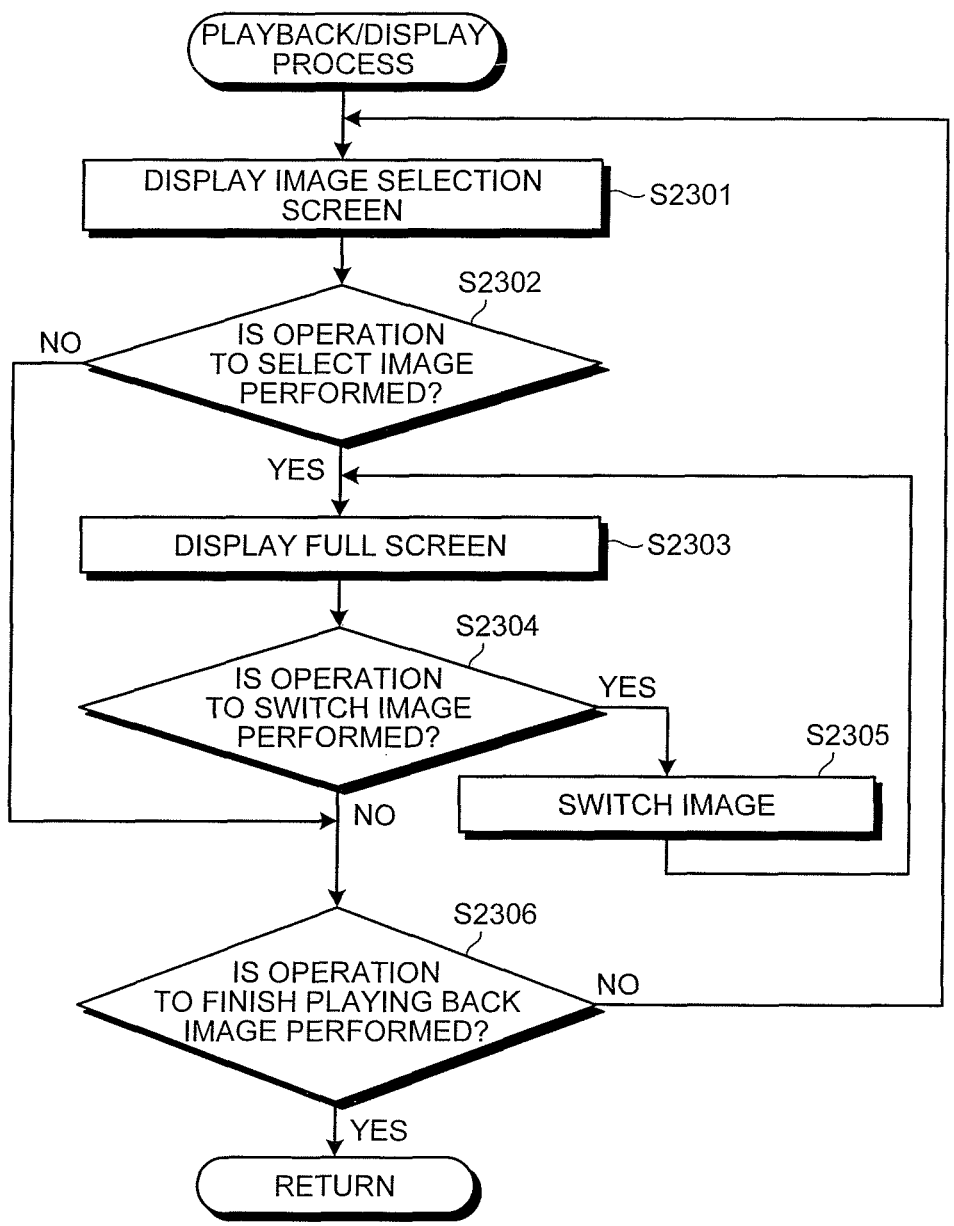
FIG. 51 is a flowchart illustrating an outline of playback/display process illustrated in FIG. 42.

Next, playback/display process illustrated in FIG. 42 will be described. FIG. 51 is a flowchart illustrating an outline of playback/display process illustrated in FIG. 42.

As illustrated in FIG. 51, the display control unit 211g first controls the display unit 7 to display an image selection screen collectively displaying a plurality of images stored in the image data storing unit 209a (step S2301).

Subsequently, the control unit 211 decides whether or not the user touches the touch panel 8 to select an image on the image selection screen displayed on the display unit 7 (step S2302). When the user does not select an image from the image selection screen after a predetermined time, for example, 3 seconds passes (step S2302: No), the imaging apparatus 200 goes to step S2306 (described below). By contrast with this, when the user selects an image on the image selection screen (step S2302: Yes), the display control unit 211g controls the display unit 7 to display the image selected by the user on the full screen (step S2303), and the imaging apparatus 200 goes to step S2304.

In step S2304, when the user operates the special effect input switch 6d, the control unit 211 decides whether or not a command signal for commanding to switch an image displayed on the display unit 7 is inputted from the special effect input switch 6d. When receiving a command signal for commanding to switch the image as input (step S2304: Yes), the display control unit 211g switches the image currently displayed on the display unit 7 (step S2305), and the imaging apparatus 200 returns to step S2303. By contrast with this, when a command signal for commanding to switch the image is not inputted (step S2304: No), the control unit 211 decides whether or not an operation to finish playing the image is performed (step S2306). More specifically, when the user operates the mode switch 6c, the control unit 211 decides whether or not the imaging apparatus 200 is switched from the playback mode to the shooting mode. When the operation to finish playing the image is not performed (step S2306: No), the imaging apparatus 200 returns to step S2301. By contrast with this, when the operation to finish playing the image is performed (step S2306; Yes), the imaging apparatus 200 returns to the main routine illustrated in FIG. 42.

With the fourth embodiment described above, the display control unit 211g controls the display unit 7 to display image data generated according to the shooting mode set by the shooting mode setting unit 211b, and controls the display unit 7 to display information related to a special effect which the special effect image generating unit 211c needs to apply to the image generated by the imaging unit 2, in order from the highest advisability of a combination with the shooting mode set by the shooting mode setting unit 211b, referring to the advisability information table T21 stored in the advisability information storing unit 209c. By this means, the imaging apparatus 200 can present, to the user, information which serves as a guide for a combination of a special effect for image data generated according to the set shooting mode.

Further, with the fourth embodiment, the display control unit 211g controls the display unit 7 to first display icons of special effects of the highest advisability, so that the user can obtain a special effect image by applying a special effect to image data generated at the set shooting mode without missing a timing to capture an image of the subject due to an operation of selecting the special effect.

Furthermore, with the fourth embodiment, the advisability changing unit 211e changes the advisability of a combination used a number of times more than a predetermined number of times among combinations of special effects and shooting modes included in the advisability information table T21 stored in the advisability information storing unit 209c, based on use history information stored in the use history information storing unit 209d. By this means, the imaging apparatus 200 can present, to the user, information which serves as a guide for a combination of a special effect and shooting mode taking into account a use situation of the user.

In addition, although, with the fourth embodiment, the control unit 211 selects and determines an icon which the user desires according to a signal received by the touch panel 8 as input when various icons displayed on the image by the display unit 7 are touched, the control unit 211 may select and determine an icon which the user desires, according to a command signal inputted from the special effect input switch 6d. Consequently, by operating the special effect input switch 6d, the user can select and determine information related to a shooting mode and information related to a special effect displayed on the display unit 7.

Further, with the fourth embodiment, the display control unit 211g may control the display unit 7 to display image data generated according to the shooting mode set by the shooting mode setting unit 211b, by changing a color and/or size of a special effect icon, in order from the highest advisability of a combination with a special effect, referring to the advisability information table T21 stored in the advisability information storing unit 209c. By this means, the user can more intuitively check information which serves as a guide to select a combination of a shooting mode and special effect.

Further, although, with the fourth embodiment, the display control unit 211g controls the display unit 7 to display only two special effect icons, the display control unit 211g may control the display unit 7 to display special effect icons corresponding to special effects of the same advisability. In this case, the display control unit 211g may control the display unit 7 to display reduced special effect icons in one vertical line or one horizontal line.

Figure 52:
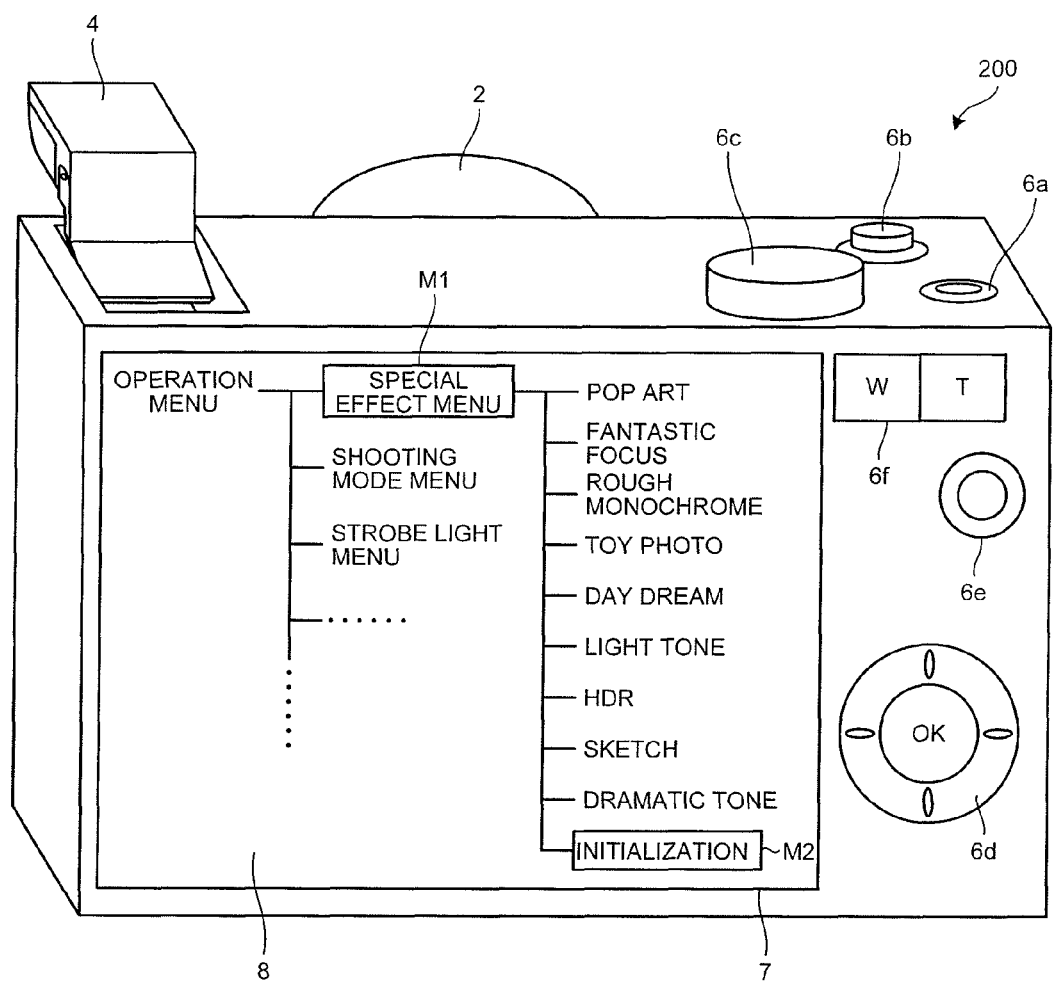
FIG. 52 is a view illustrating an example of a special effect menu displayed on a display unit of an imaging apparatus.

Further, with the fourth embodiment, when receiving a command signal for commanding to display an operation menu as input from the menu switch 6e, the display control unit 211g may control the display unit 7 to align and display special effects in one vertical line in order from the highest advisability of combinations with special effects for an image generated according to a shooting mode set by the shooting mode setting unit 211b, referring to the advisability information table T21 stored in the advisability information storing unit 209c. More specifically, as illustrated in FIG. 52, when the user operates the special effect input switch 6d, the display control unit 211g may control the display unit 7 to display a list of the special effect menu M1 in case where a command signal for commanding to select the special effect menu M1 is inputted from the special effect input switch 6d. In this case, when the user operates the special effect input switch 6d and selects initialization M2, the initializing unit 211f initializes the advisabilities of the advisability information table T21 changed by the advisability changing unit 211e. By this means, the imaging apparatus 200 can have the initialized advisability information table T21 set upon shipping from a manufacturer.

Figure 53:
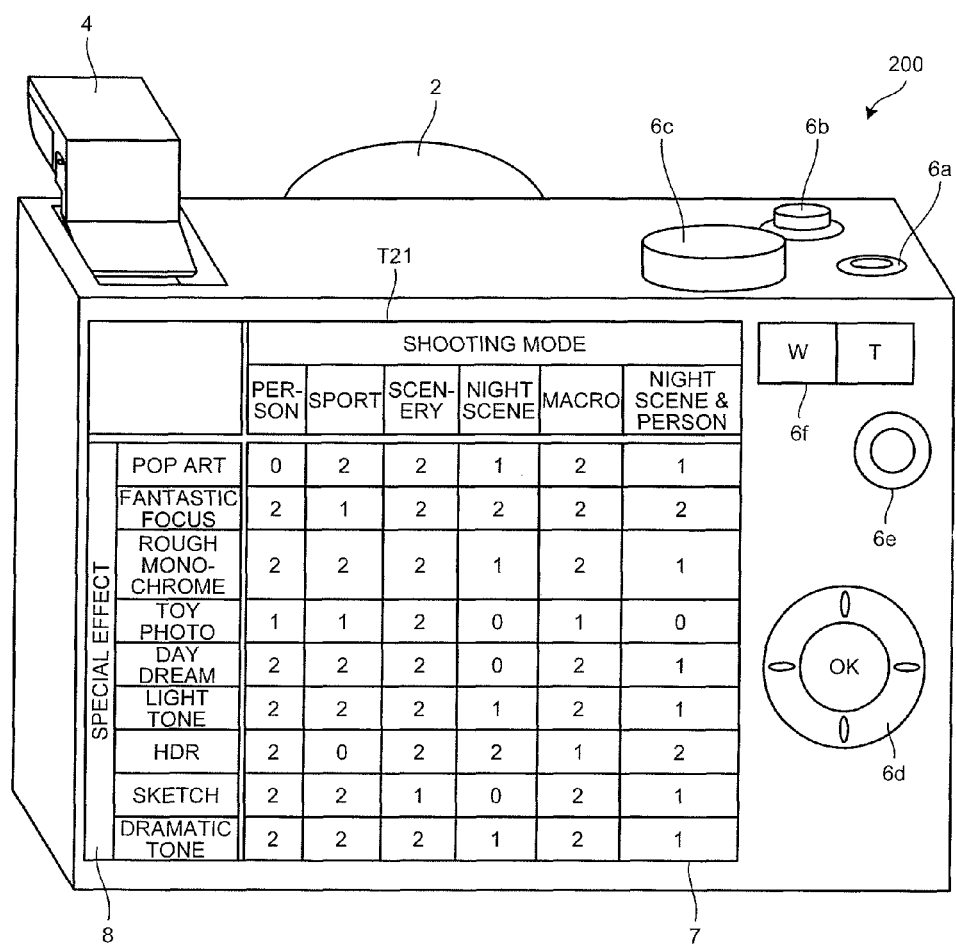
FIG. 53 is a view illustrating an example of an image displayed on a display unit of an imaging apparatus.

Further, with the fourth embodiment, when the user inputs a command signal for commanding to display the advisability information table T21 stored in the advisability information storing unit 209c through the menu switch 6e, the display control unit 211g may control the display unit 7 to display the advisability information table T21. More specifically, as illustrated in FIG. 53, the display control unit 211g may control the display unit 7 to display the advisability information table T21. In this case, the user may change the advisability written in the advisability information table T21 by operating the special effect input switch 6d. By this means, the user can change the advisability while checking the advisability which serves as a guide for a combination of a shooting mode and special effect.

Figure 54:
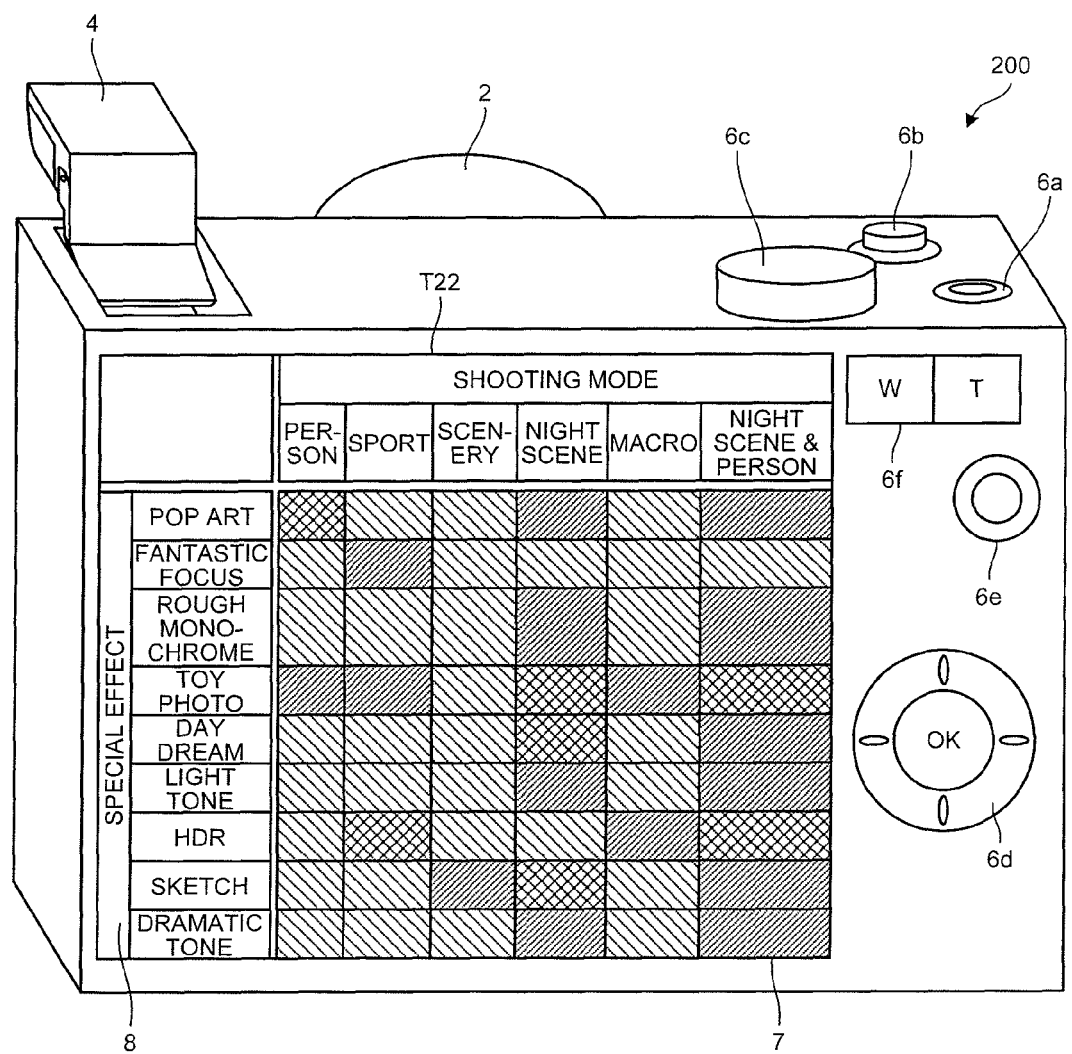
FIG. 54 is a view illustrating an example of an image displayed on a display unit of an imaging apparatus.

Further, the above method of displaying the advisability information table displayed on the display unit 7 may adopt another display method. As illustrated in FIG. 54, the display control unit 211g may control the display unit 7 to display the advisability information table T22, and control the display unit 7 to display a color corresponding to the advisability written in the advisability information table T22. By this means, the user can more intuitively check the advisability which serves as a guide for a combination of a shooting mode and special effect. In addition, in FIG. 54, the colors are expressed by patterns. Further, when the advisabilities are shown by colors, the display control unit 211g may control the display unit 7 to sequentially display the distinctive colors in order from the highest advisability, for example, red, green and black in order. Further, the display control unit 211g may control the display unit 7 to display the advisabilities with patterns.

Figure 55:
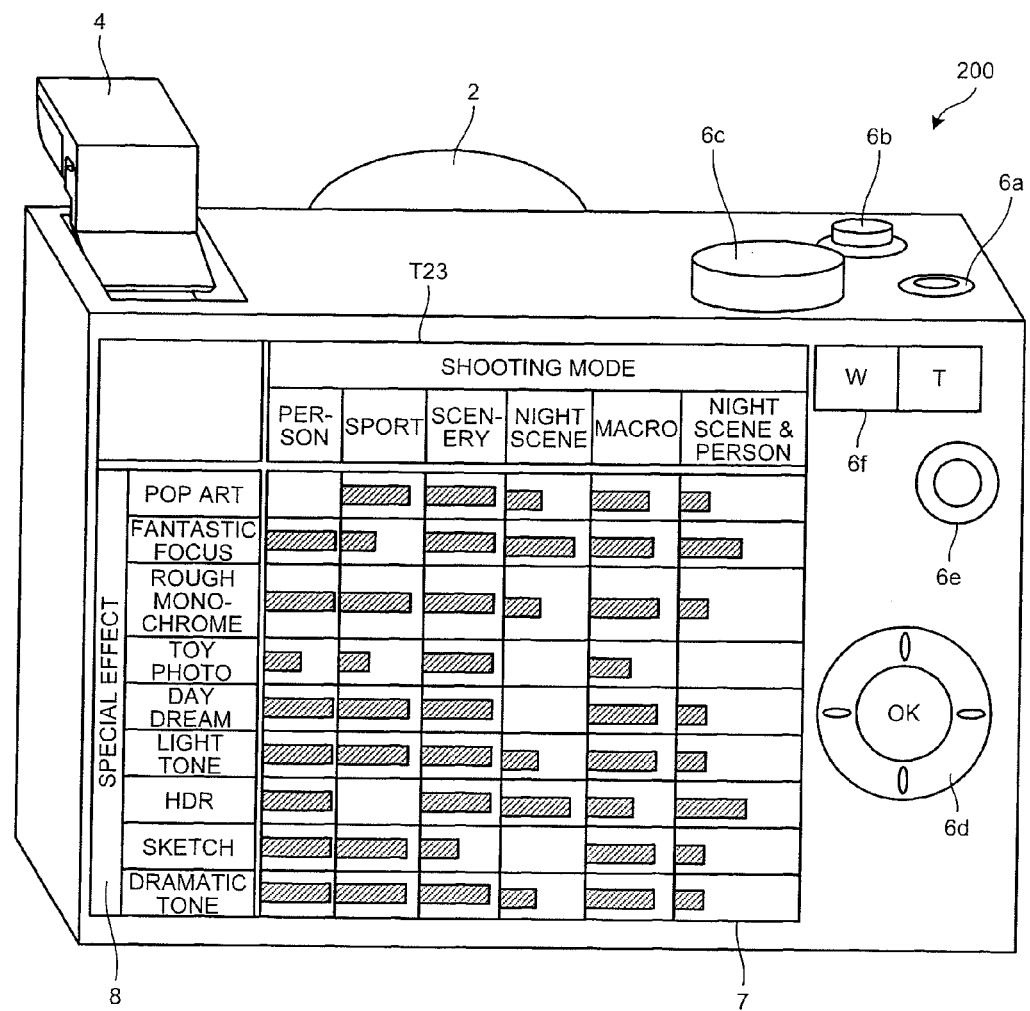
FIG. 55 is a view illustrating an example of an image displayed on a display unit of an imaging apparatus.

Further, the above method of displaying the advisability information table displayed on the display unit 7 may adopt another display method. As illustrated in FIG. 55, the display control unit 211g may control the display unit 7 to display an advisability information table T23, and may control the display unit 7 to change and display the advisabilities written in the advisability information table T23 to bar charts. Further, the display control unit 211g may change lengths of bar charts according to the number of times of use by the user. Furthermore, the display control unit 211g may control the display unit 7 to display the number of times of use by the user together with the bar charts. By this means, the user can more intuitively check the advisability which serves as a guide for a combination of a shooting mode and special effect.

Further, with the fourth embodiment, the advisability information storing unit 209c may store a plurality of advisability information tables. For example, as illustrated in FIG. 56, the advisability information storing unit 209c may store an advisability information table T24. Special effects different from the advisability information table T21 are written in the advisability information table T24. More specifically, the special effects include shading, cross, frame, noise, flare, blur, white out, illumination and soap bubble. Hereinafter, each special effect illustrated in FIG. 56 will be described. Shading provides an effect of making surrounding portions of end portions of an image black. Cross provides an effect of adding a star-shaped icon to an image. Frame provides an effect of adding a frame to an image. Noise provides an effect of adding noise to the entire image. Flare provides an effect of adding hatching to an image. Blur provides an effect of blurring process to the entire image. White out provides an effect of making surroundings of end portions of an image white. Illumination provides an effect of applying a color filter to the entire image. Soap bubble provides an effect of adding an icon of soap bubbles to an image. According to soap bubble, an imaging apparatus in which a plurality of zoom optical systems of different zoom magnifications, and the imaging element 2g are built in may perform image processing of changing the size of soap bubbles according to a zoom magnification or may perform image processing of adjusting the frame in the horizontal direction according to the detection result of the posture detecting unit 3. Further, types of special effects are by no means limited to the content of the advisability information tables T21 and T24, and, for example, art, ball, color mask, cube, mirror, mosaic, sepia, black/white, wave, ball frame and balloon effect may be added. Further, when the display unit 7 displays the advisability information table T21, if a command signal for commanding to switch to another advisability information table is inputted from the special effect input switch 6d, the display control unit 211g may control the display unit 7 to display the advisability information table T24.

Further, with the fourth embodiment, when the display unit 7 displays the advisability information table T25, if the user touches the touch panel 8, the display control unit 211g may control the display unit 7 to display the advisability information table T25 near the touched area.

Figure 57:
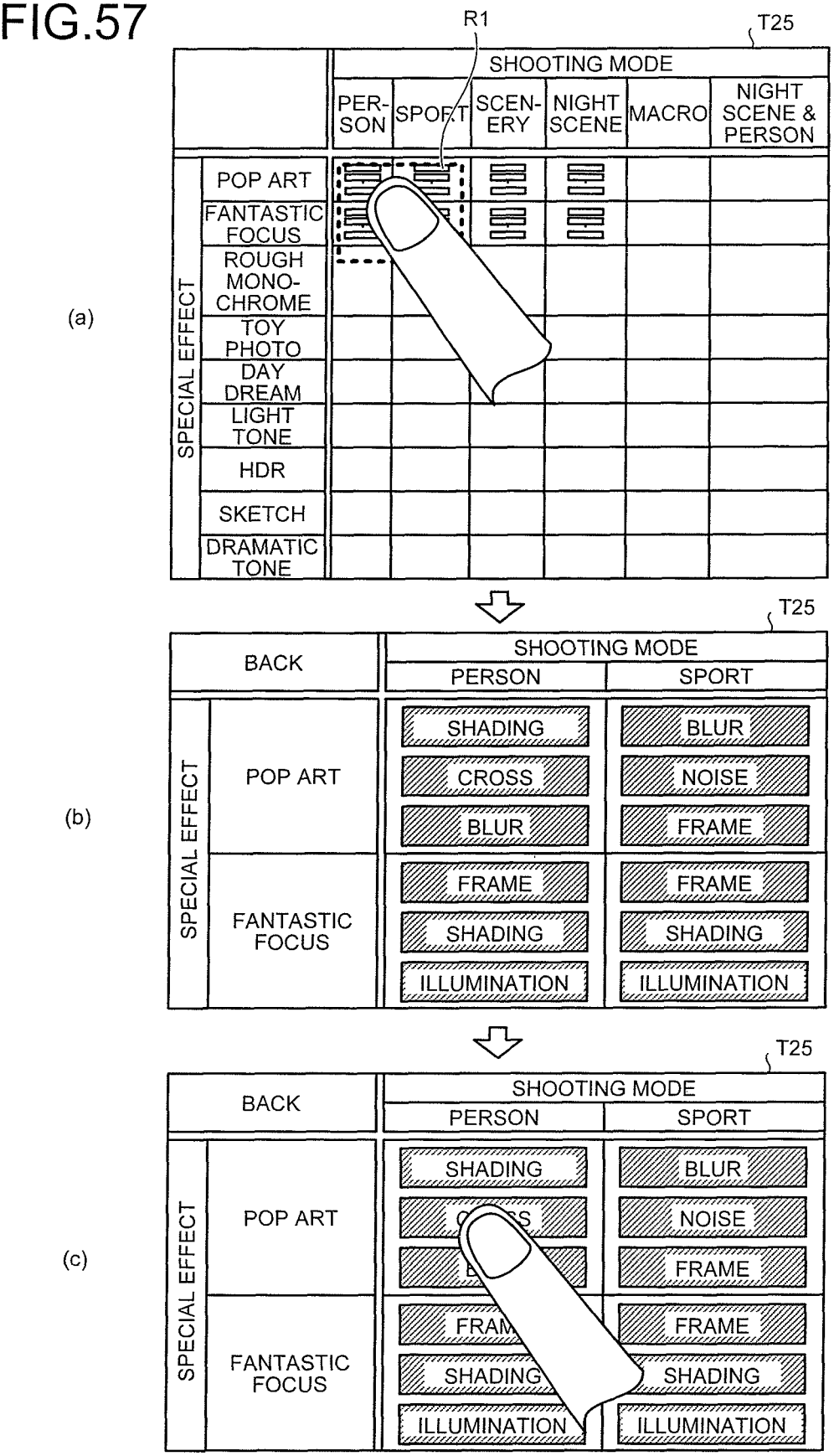
FIG. 57 is a view describing enlarged display near an area of a touch panel touched by the user.

FIG. 57 is a view describing enlarged display near an area of the touch panel 8 which the user touches. As illustrated in FIG. 57, when an area R1 on the advisability information table T25 displayed on the display unit 7 is touched ((a) of FIG. 57), the display control unit 211g controls the display unit 7 to enlarge and display the advisability information table T25 near the touched area R1 ((b) of FIG. 57). Further, the display control unit 211g controls the display unit 7 to display icons related to special effects which can cause an auxiliary visual effect with respect to each special effect. More specifically, as illustrated in (b) of FIG. 57, when the shooting mode is "person" and the special effect is "pop art", "shading", "cross" and "blur" which are special effects which can cause auxiliary visual effects are displayed as icons.

Then, by selecting and touching a desired icon ((c) of FIG. 57), the user can make a setting to add a special effect corresponding to the touched icon. Further, the display control unit 211g may control the display unit 7 to add and display colors of icons corresponding to combinations of special effects and special effects which can cause auxiliary visual effects with respect to the above special effects. Furthermore, when the advisabilities are shown by colors, the display control unit 211g may control the display unit 7 to sequentially display the distinctive colors in order from the highest advisability, for example, red, green and black in order. Further, the display control unit 211g may control the display unit 7 to display as icons only special effects which can cause auxiliary visual effects with respect to special effects. In addition, in FIG. 57, the colors are expressed by patterns.

Further, with the fourth embodiment, by connecting the communication unit 10 to an external processing device such as a personal computer or server, the advisability changing unit 211e may update or rewrite the advisability information table T21 stored in the advisability information storing unit 209c, based on information received through the communication unit 10. By this means, the display control unit 211g can display special effect icons according to the advisability which takes into account combinations of newly added special effects and shooting modes. Further, by storing the advisability of a combination of a newly added special effect and shooting mode in, for example, a storage medium such as a memory card which is attachable to the storing unit 209, the control unit 211 may acquire the advisability of a combination of the newly added special effect and shooting mode from the storage medium and the advisability changing unit 211e may store the advisability in the advisability information storing unit 209c to update or rewrite the advisability information table.

Further, although, with the fourth embodiment, the posture detecting unit 3 detects the posture state of the imaging apparatus 200, the posture detecting unit 3 may receive an operation signal of a touch operation of switching various shooting modes or various settings of the imaging apparatus 200 by detecting an acceleration produced when the user taps the display screen of the display unit 7, and output this operation signal to the control unit 211.

Further, although, with the fourth embodiment, when the user touches the switch icons Q233 and Q234, the display control unit 211g switches a special effect icon, the display control unit 211g may switch to a special effect icon according to a trajectory which the user touches on the touch panel 8 in an area of a special effect icon displayed on an image on the display unit 7.

Other Embodiment

Further, although, with the above embodiments of the present invention, an image processing unit and control unit are integrally formed, the image processing unit (image processing engine) may be provided individually in the imaging apparatus, and the control unit may transfer, for example, various commands and data to this image processing unit. It naturally follows that two or more image processing units may be provided in the imaging apparatus. Further, similarly, the special effect image generating unit may also be provided individually in the imaging apparatus. Further, the special effect image generating unit, image synthesizing unit and image processing unit may be integrally formed (image engine).

Further, although, with the above embodiments of the present invention, the imaging apparatus has been described as a digital camera, the imaging apparatus is applicable to various electronic devices having capturing functions such as single-lens digital still cameras, digital video cameras, camera-equipped mobile telephones or mobile multi-function terminals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   an imaging unit that captures an image of a subject to continuously generate electronic image data of the subject;
   an image data storing unit that stores the image data generated by the imaging unit;
   a display unit that displays the image corresponding to the image data generated by the imaging unit;
   a shooting mode setting unit that sets a shooting mode to either one of a normal shooting mode and a slow motion shooting mode whose frame rate is higher than that of the normal shooting mode;
   a display control unit that controls the display unit to sequentially display, at a frame rate of the shooting mode set by the shooting mode setting unit, the images corresponding to the image data generated by the imaging unit in time sequence and display information related to a special effect which can be combined with the shooting mode set by the shooting mode setting unit;
   a special effect image generating unit that generates a special effect image by applying the special effect to the image; and
   an advisability information storing unit that stores advisability information for assigning an advisability corresponding to a combination of the special effect which the special effect image generating unit applies to the image and the shooting mode;
   wherein the display control unit controls the display unit to display information related to the special effect which the special effect image generating unit needs to apply to the image in accordance with the advisability information stored in the advisability information storing unit.

2. The imaging apparatus according to claim 1, wherein the shooting mode setting unit can set the shooting mode further to a 3D shooting mode, and
   the display control unit controls the display unit to display the image sequentially generated in the shooting mode set by the shooting mode setting unit and controls the display unit to display the information related to the special effect by superimposing on the image.

3. The imaging apparatus according to claim 2, further comprising:
   a touch panel that is provided on a display screen of the display unit and which receives a signal corresponding to a position of a contacting object from an outside, wherein
   the display control unit controls the display unit to display information related to the special effect by means of an icon, and
   the special effect image generating unit generates the special effect image by applying to the image, the special effect corresponding to the icon which the touch panel receives as input in a contact area positioned on a display area of the icon.

4. An imaging apparatus comprising:
   an imaging unit that captures an image of a subject to continuously generate electronic image data of the subject;
   an image data storing unit that stores the image data generated by the imaging unit;
   a display unit that displays the image corresponding to the image data generated by the imaging unit;
   a shooting mode setting unit that sets a shooting mode to either one of a normal shooting mode and a slow motion shooting mode whose frame rate is higher than that of the normal shooting mode;
   a display control unit that controls the display unit to sequentially display, at a frame rate of the shooting mode set by the shooting mode setting unit, the images corresponding to the image data generated by the imaging unit in time sequence and display information related to a special effect which can be combined with the shooting mode set by the shooting mode setting unit;
   a special effect image generating unit that generates a special effect image by applying the special effect to the image; and
   an advisability information storing unit that stores advisability information for assigning an advisability corresponding to a combination of the special effect which the special effect image generating unit applies to the image, and the shooting mode, wherein
   the display control unit controls the display unit to display information related to the special effect which the special effect image generating unit needs to apply to the image, in order from the highest advisability corresponding to a combination with the shooting mode set by the shooting mode setting unit, referring to the advisability information stored in the advisability information storing unit.

5. The imaging apparatus according to claim 3, wherein the display control unit controls the display unit to display a plurality of icons in one vertical line or one horizontal line.

6. An imaging method executed by an imaging apparatus including an imaging unit that captures an image of a subject to continuously generate electronic image data of the subject, an image data storing unit that stores the image data generated by the imaging unit, and a display unit that displays the image corresponding to the image data generated by the imaging unit, the imaging method comprising:

setting a shooting mode to either one of a normal shooting mode and slow motion shooting mode whose frame rate is higher than that of the normal shooting mode;

controlling the display unit to sequentially display, at a frame rate of the set shooting mode, the images corresponding to the image data generated by the imaging unit in time sequence and display information related to a special effect which can be combined with the set shooting mode;

generating a special effect image by applying the special effect to the image;

storing advisability information for assigning an advisability corresponding to a combination of the special effect applied to the image and the shooting mode; and controlling the display unit to display information related to the special effect applied to the image in accordance with the advisability information.

7. A non-transitory computer-readable recording medium with an executable program stored thereon, wherein the program instructs a processor of an imaging apparatus including an imaging unit that captures an image of a subject to continuously generate electronic image data of the subject, an image data storing unit that stores the image data generated by the imaging unit, and a display unit that displays the image corresponding to the image data generated by the imaging unit, to perform:

setting a shooting mode to either one of a normal shooting mode and a slow motion shooting mode whose frame rate is higher than that of the normal shooting mode;

controlling the display unit to sequentially display, at a frame rate of the set shooting mode, the images corresponding to the image data generated by the imaging unit in time sequence and display information related to a special effect which can be combined with the set shooting mode;

generating a special effect image by applying the special effect to the image;

storing advisability information for assigning an advisability corresponding to a combination of the special effect applied to the image and the shooting mode; and controlling the display unit to display information related to the special effect applied to the image in accordance with the advisability information.

8. An imaging apparatus comprising:

an imaging unit that captures an image of a subject to continuously generate electronic image data of the subject;

an image data storing unit that stores the image data generated by the imaging unit;

a display unit that displays the image corresponding to the image data generated by the imaging unit;

a shooting mode setting unit that sets a shooting mode to either one of a normal shooting mode and a slow motion shooting mode whose frame rate is higher than that of the normal shooting mode; and a display control unit that controls the display unit to display information related only to a special effect which can be combined with the shooting mode set by the shooting mode setting unit;

a special effect image generating unit that generates a special effect image by applying the special effect to the image; and an advisability information storing unit that stores advisability information for assigning an advisability corresponding to a combination of the special effect, which the special effect image generating unit applies to the image, and the shooting mode;

wherein the display control unit controls the display unit to display information related to the special effect which the special effect image generating unit needs to apply to the image, in order from the highest advisability corresponding to a combination with the shooting mode set by the shooting mode setting unit, referring to the advisability information stored in the advisability information storing unit.

* * * * *